Nov. 6, 1956 J. W. CROWNOVER ET AL 2,769,867

DIELECTROSTRICTIVE SIGNAL AND ENERGY TRANSDUCERS

Filed Sept. 9, 1947 26 Sheets-Sheet 1

INVENTORS
J.W. CROWNOVER
H.W. KOREN
BY [signature]
ATTORNEY

DIELECTROSTRICTIVE SIGNAL AND ENERGY TRANSDUCERS
Filed Sept. 9, 1947 26 Sheets-Sheet 2
Fig 1-A
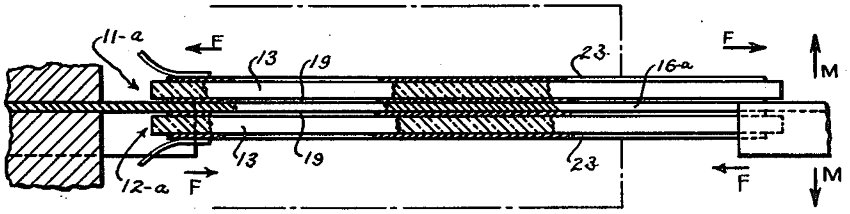
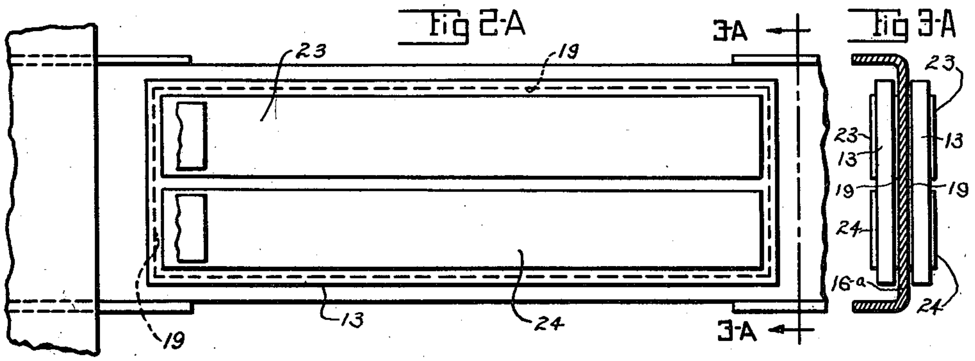
Fig 2-A, Fig 3-A
Fig 4-A
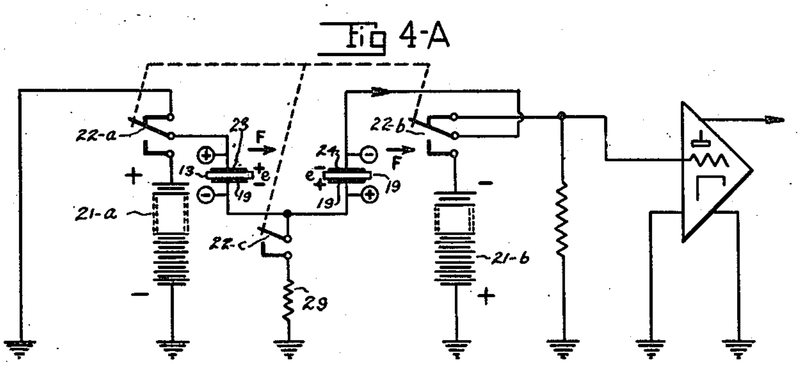
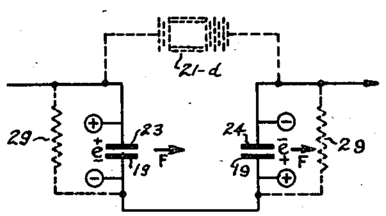
Fig 4-AB
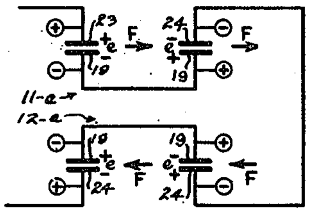
Fig 4-AC
INVENTORS
J. W. CROWNOVER
H. W. KOREN
BY [signature]
ATTORNEY

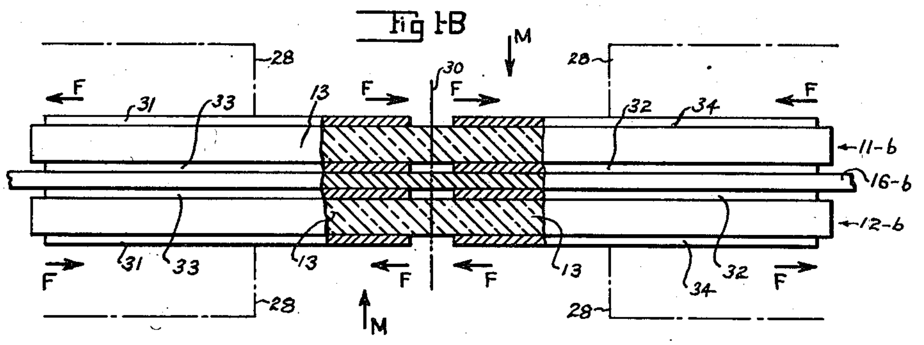
Fig 1-B
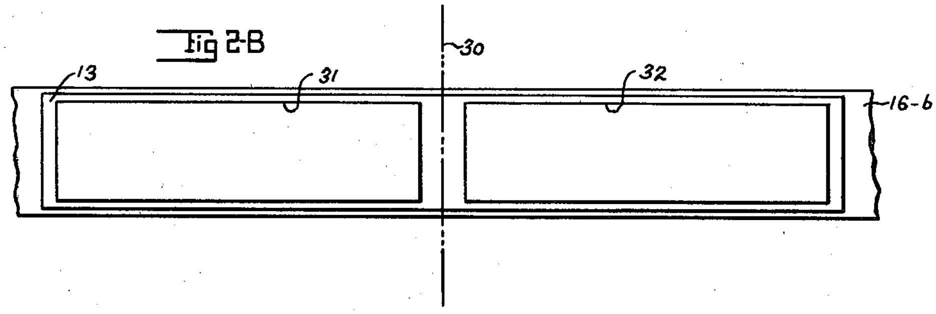
Fig 2-B
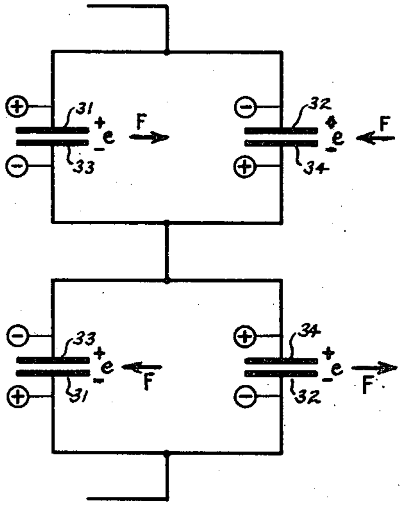
Fig 4-B
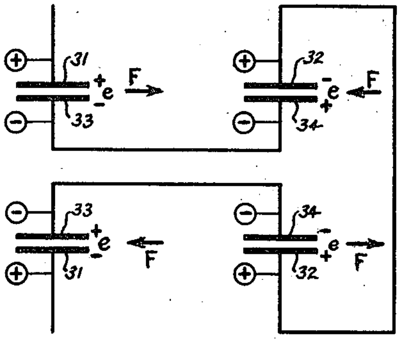
Fig 4-BC
INVENTORS
J.W. CROWNOVER
H.W. KOREN
BY
[signature]
ATTORNEY DIELECTROSTRICTIVE SIGNAL AND ENERGY TRANSDUCERS
Filed Sept. 9, 1947
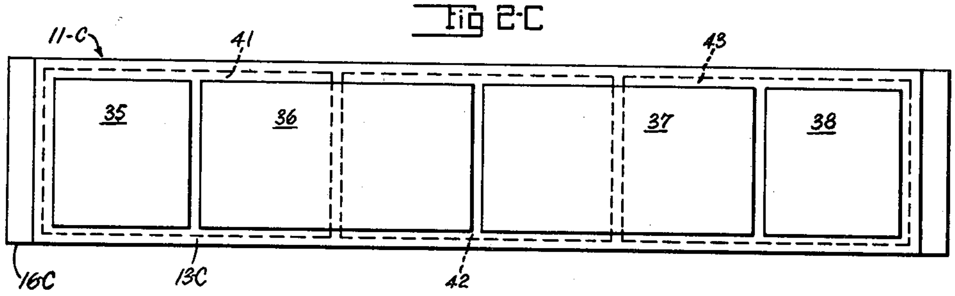
Fig 2-C
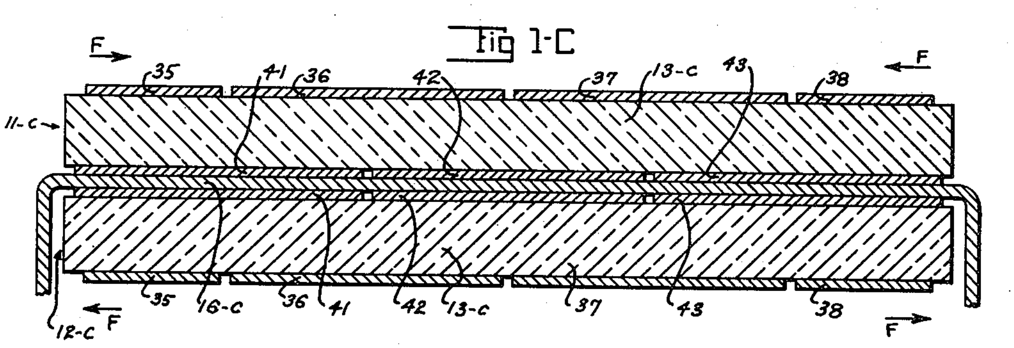
Fig 1-C
Fig 4-C
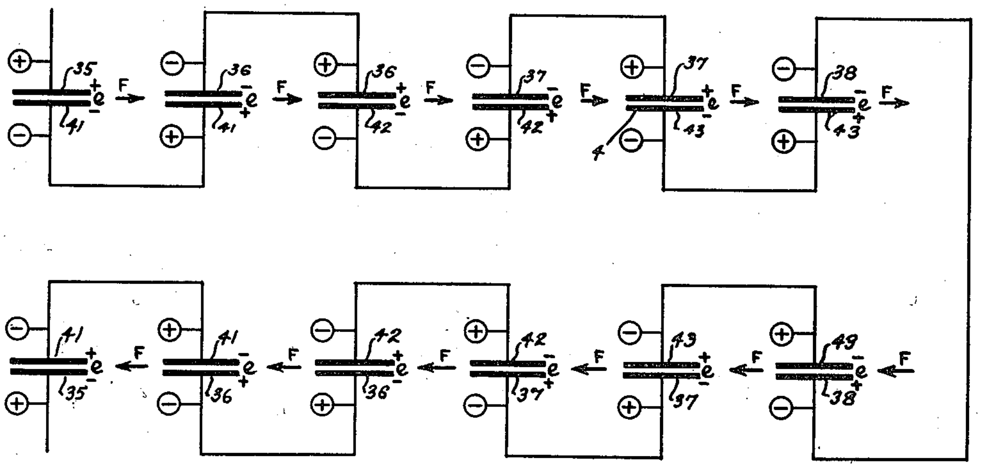
INVENTORS
J. W. CROWNOVER
H. W. KOREN
BY AD Pineles
ATTORNEY Fig 2-D
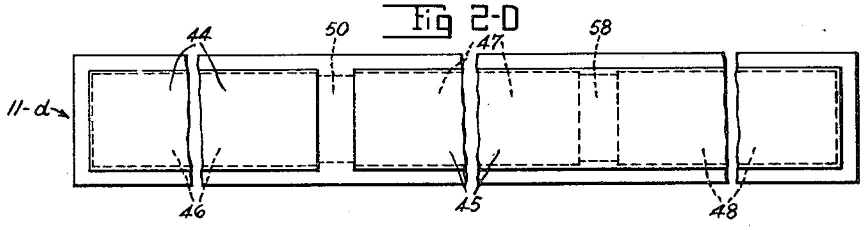
Fig 1-D
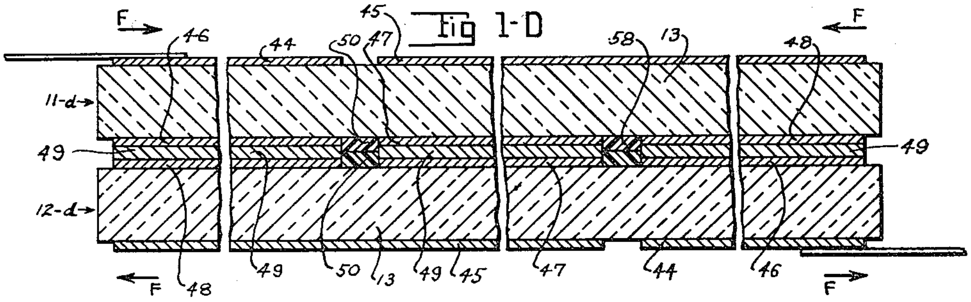
Fig 2-DE
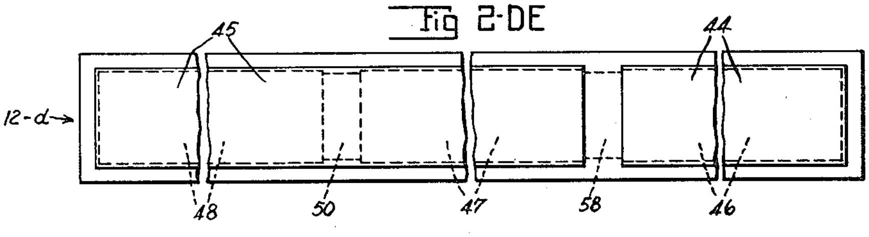
Fig 4-D
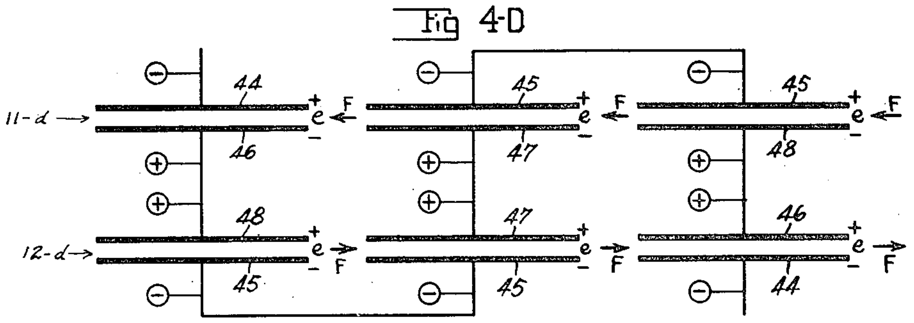
INVENTORS
J.W. CROWNOVER
H.W. KOREN
BY [signature]
ATTORNEY

INVENTORS

BY Michael S. Pineles
ATTORNEY

DIELECTROSTRICTIVE SIGNAL AND ENERGY TRANSDUCERS
Filed Sept. 9, 1947 26 Sheets-Sheet 7
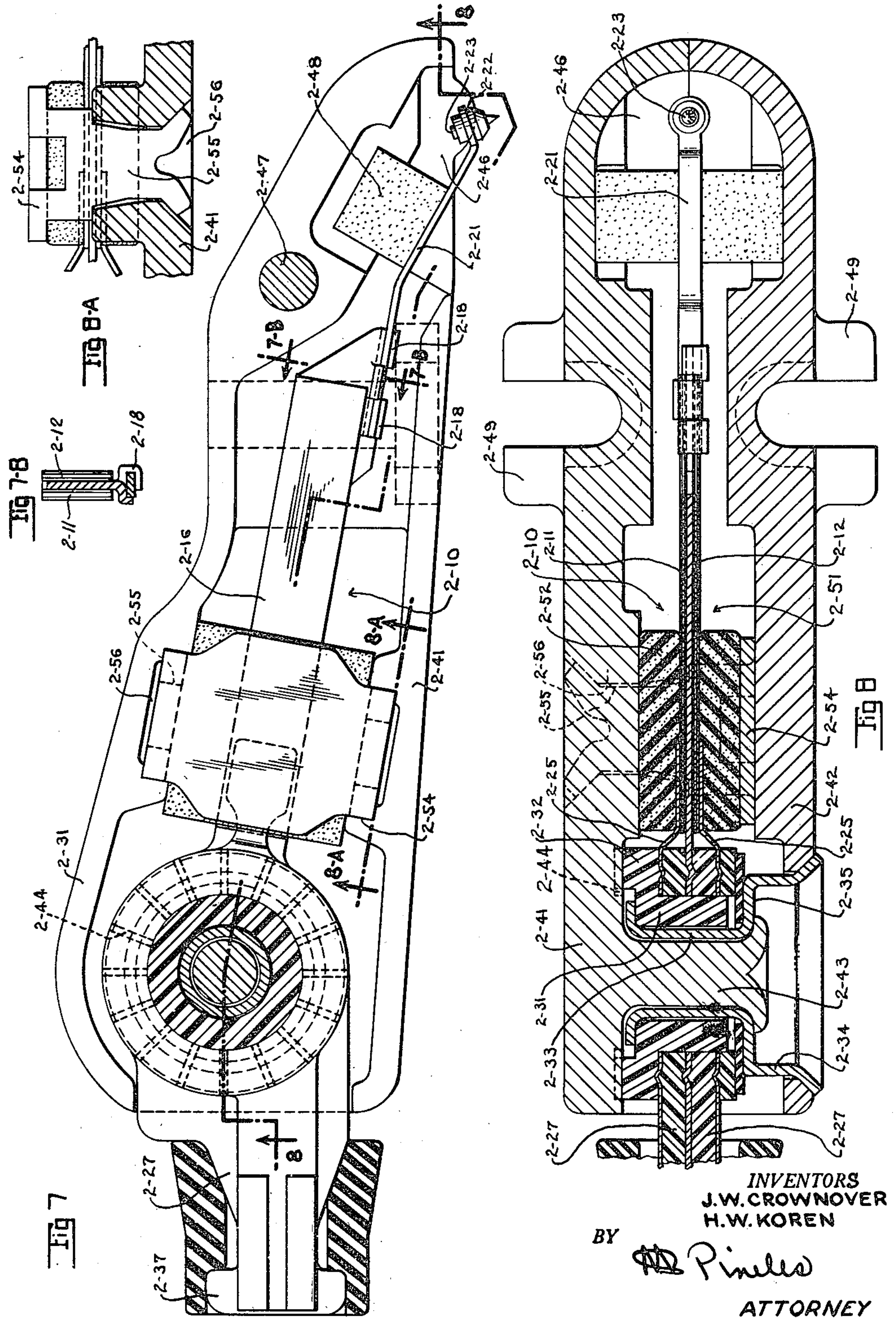
Fig 8-A, Fig 7-B, Fig 7, Fig 8
INVENTORS
J. W. CROWNOVER
H. W. KOREN
BY
[signature]
ATTORNEY

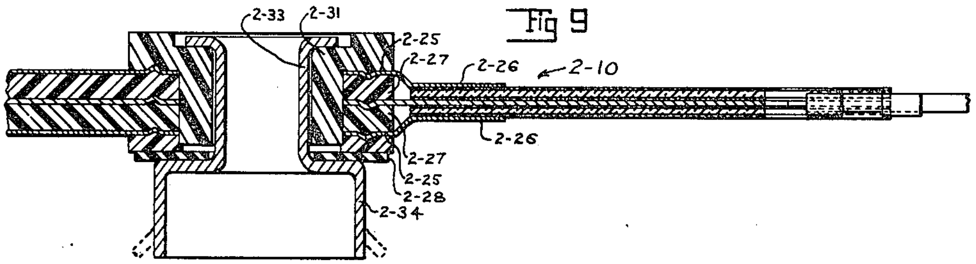
Fig 9
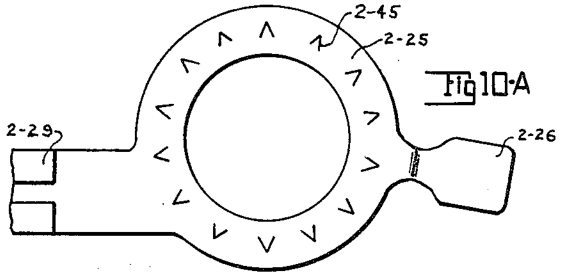
Fig 10-A
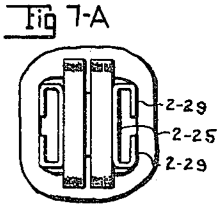
Fig 7-A
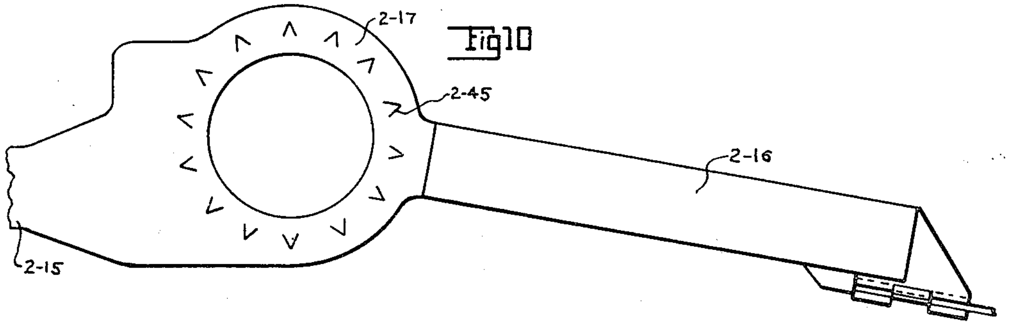
Fig 10
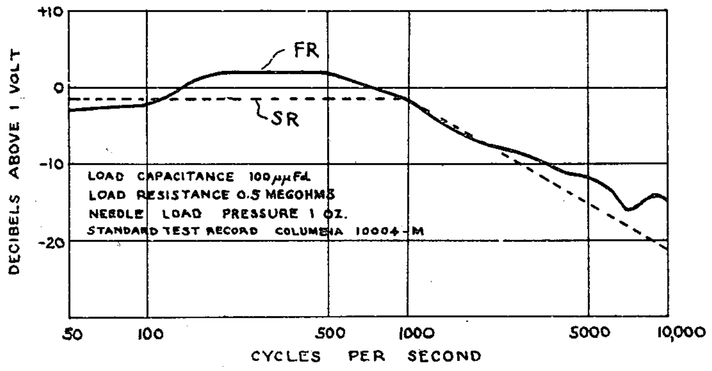
Fig 11
INVENTORS
J.W. CROWNOVER
H.W. KOREN
BY H. Pineles
ATTORNEY

DIELECTROSTRICTIVE SIGNAL AND ENERGY TRANSDUCERS

Filed Sept. 9, 1947 26 Sheets-Sheet 9

INVENTORS
J. W. CROWNOVER
H. W. KOREN
BY [signature]
ATTORNEY

INVENTORS
J. W. CROWNOVER
H. W. KOREN
BY AA Pineles
ATTORNEY

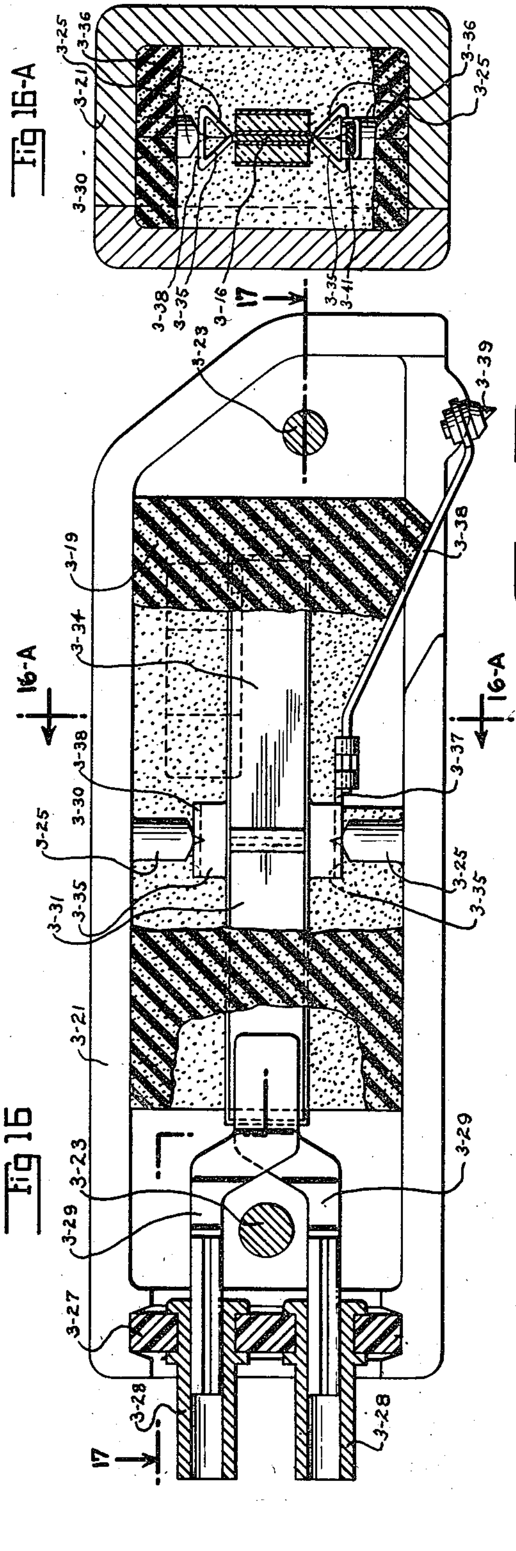
Fig 16-A, Fig 16
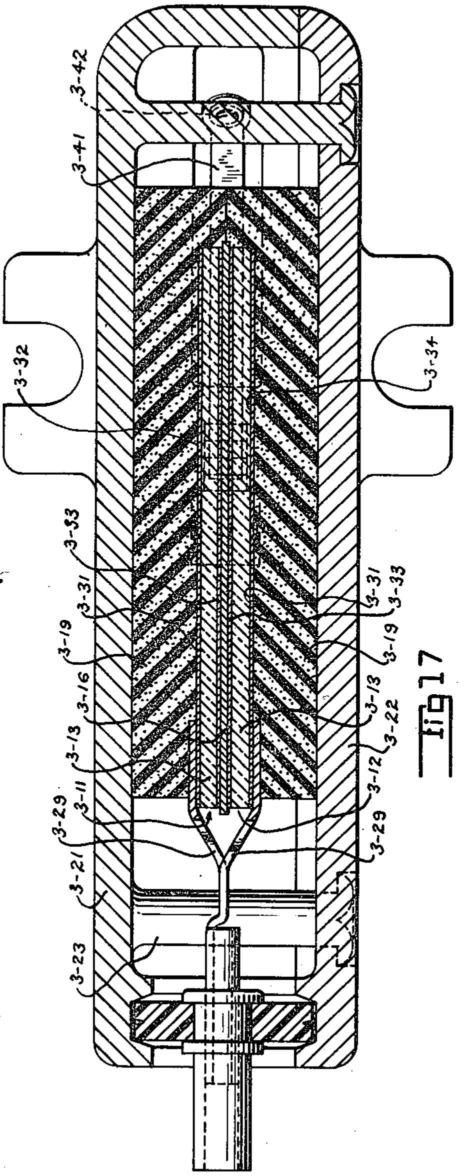
Fig 17
INVENTORS
J.W. CROWNOVER
H.W. KOREN
BY A. D. Pinelles
ATTORNEY

DIELECTROSTRICTIVE SIGNAL AND ENERGY TRANSDUCERS

Filed Sept. 9, 1947 26 Sheets-Sheet 12

INVENTORS
J.W.CROWNOVER
H.W.KOREN
BY
ATTORNEY

DIELECTROSTRICTIVE SIGNAL AND ENERGY TRANSDUCERS
Filed Sept. 9, 1947 26 Sheets-Sheet 13
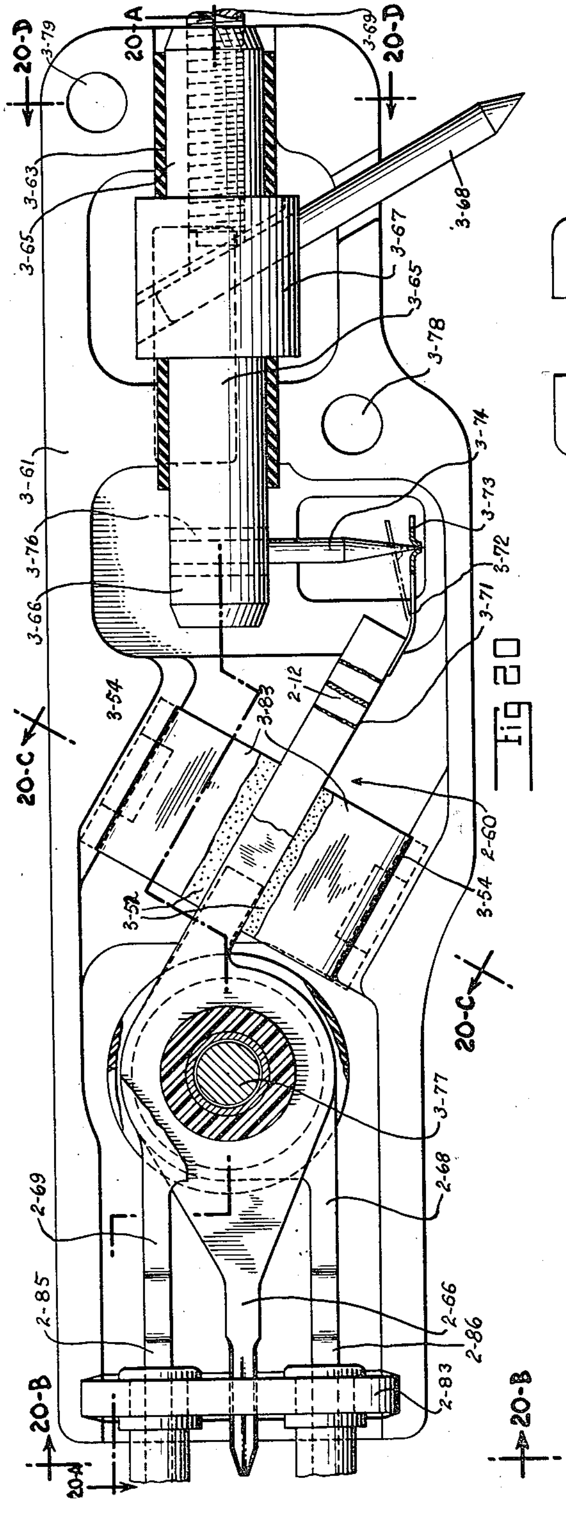
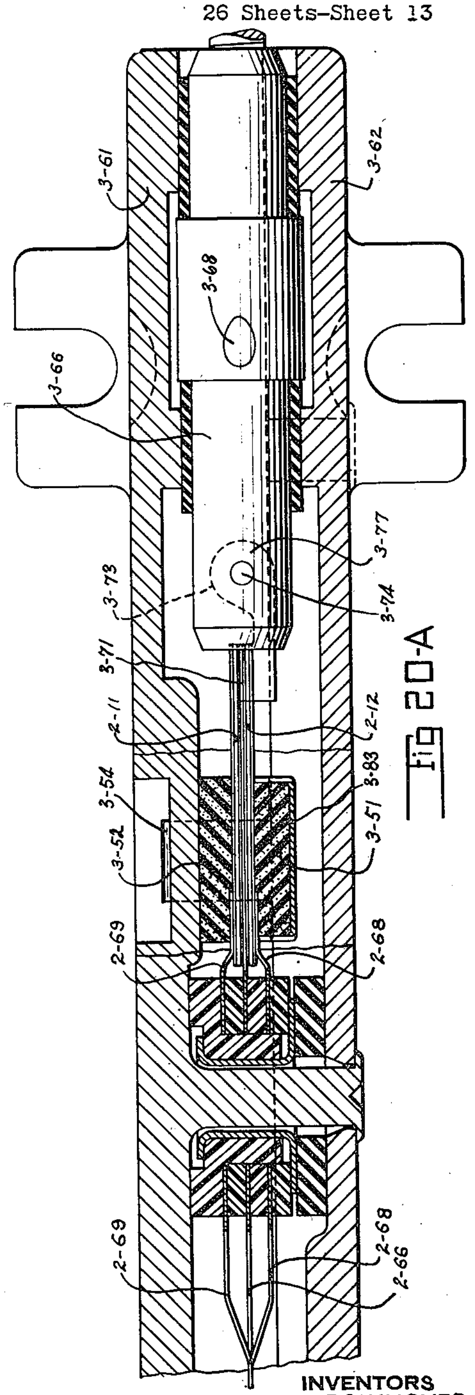
Fig 20 Fig 20-A
INVENTORS
J.W. CROWNOVER
H.W. KOREN
BY [signature]
ATTORNEY

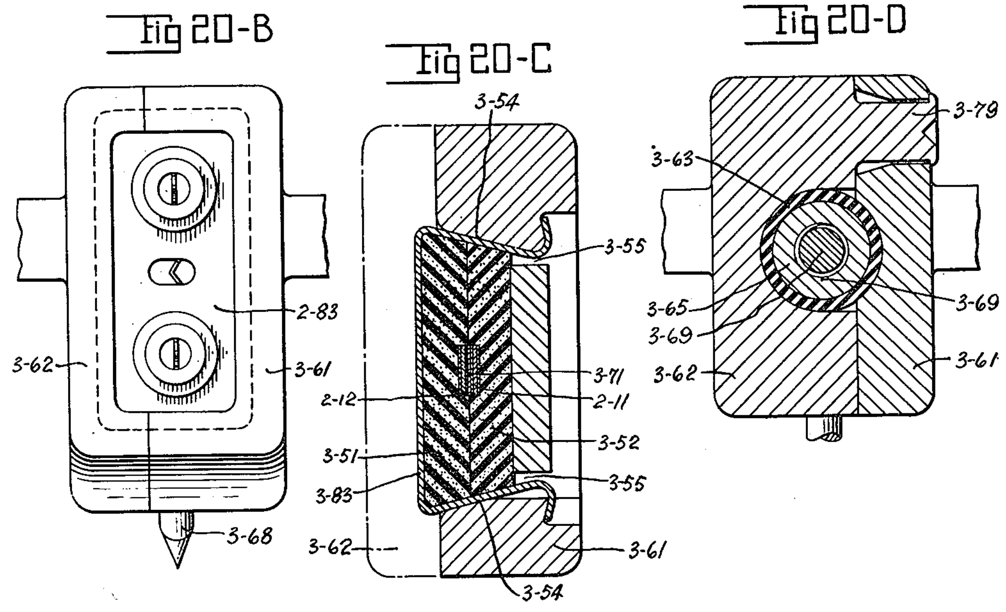
Fig 20-B, Fig 20-C, Fig 20-D
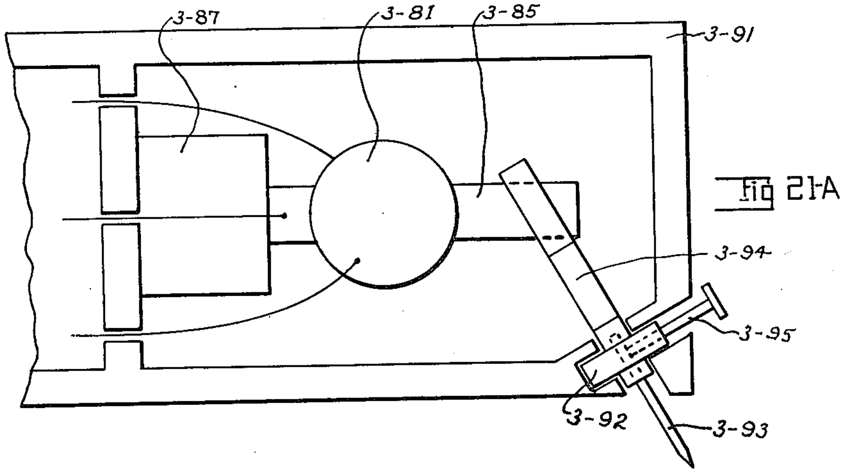
Fig 21-A
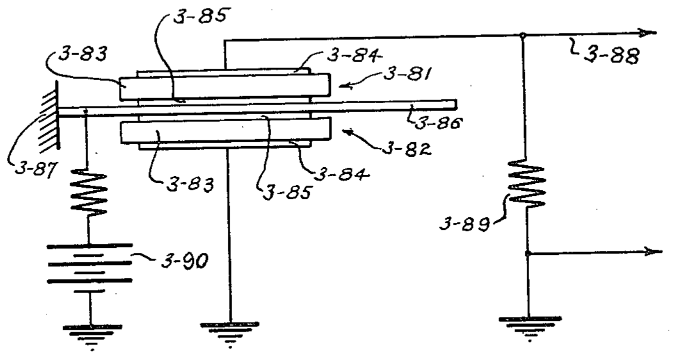
Fig 21
INVENTORS
J. W. CROWNOVER
H. W. KOREN
BY [signature]
ATTORNEY

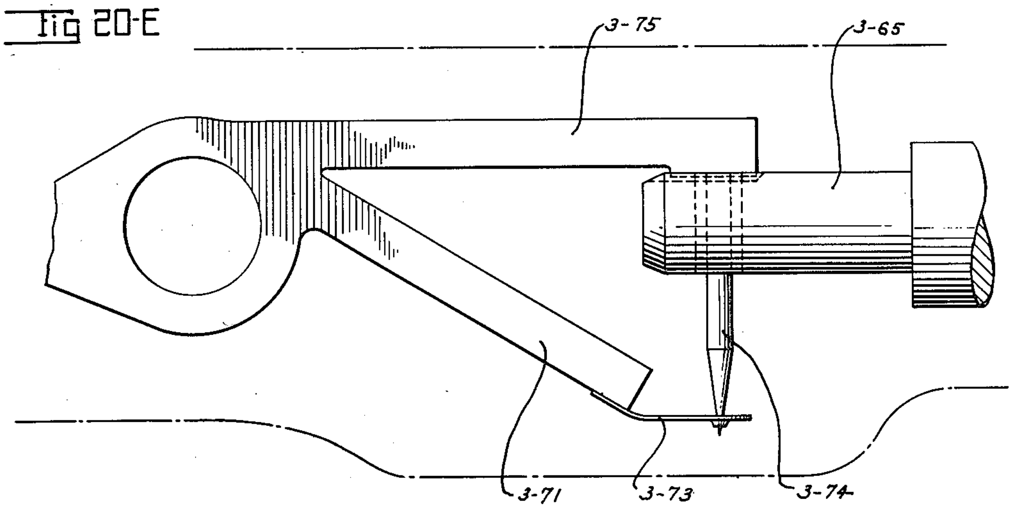
Fig 20-E
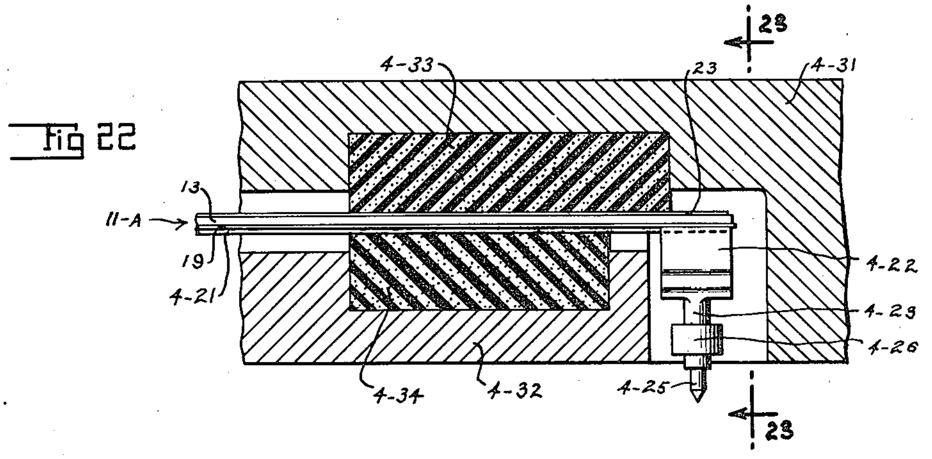
Fig 22
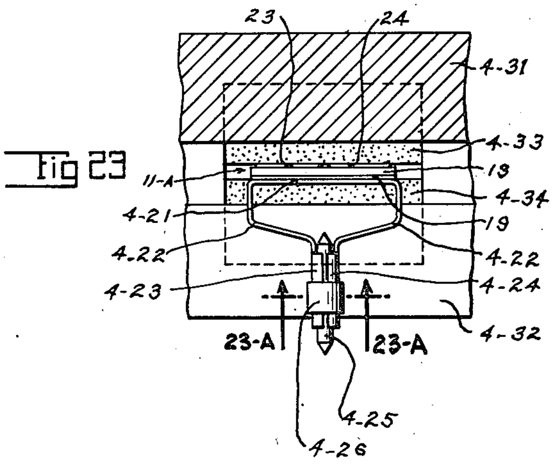
Fig 23
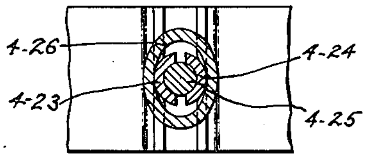
Fig 23-A
INVENTORS
J. W. CROWNOVER
H. W. KOREN
BY [signature]
ATTORNEY

DIELECTROSTRICTIVE SIGNAL AND ENERGY TRANSDUCERS

INVENTORS
J. W. CROWNOVER
H. W. KOREN
BY [signature]
ATTORNEY

DIELECTROSTRICTIVE SIGNAL AND ENERGY TRANSDUCERS

Fig 26, Fig 26-A

INVENTORS
J. W. CROWNOVER
H. W. KOREN
BY [signature]
ATTORNEY

Fig 27, Fig 29
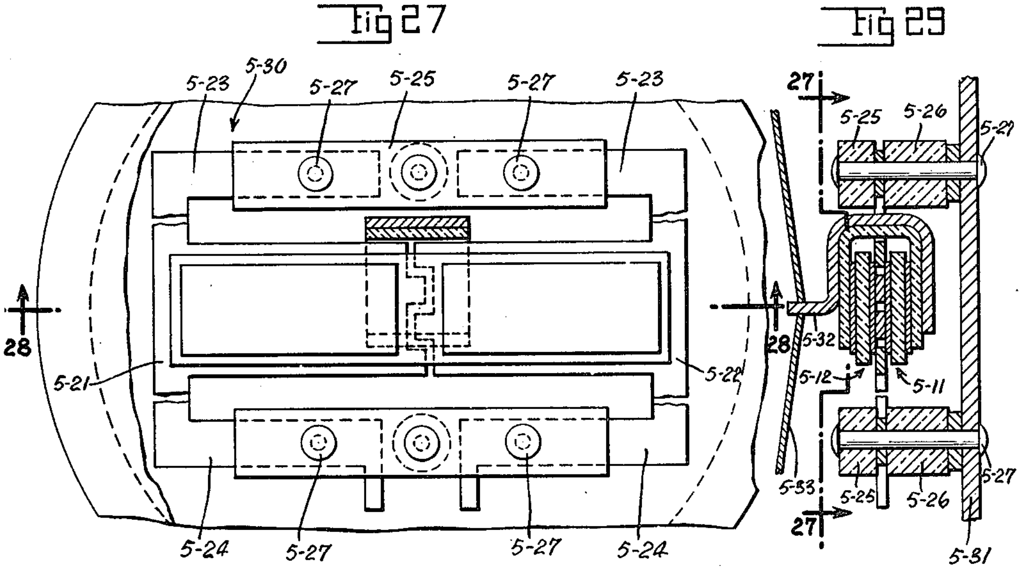
Fig 28
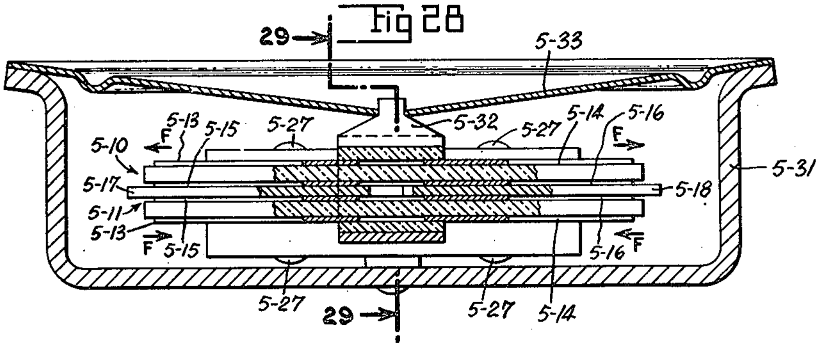
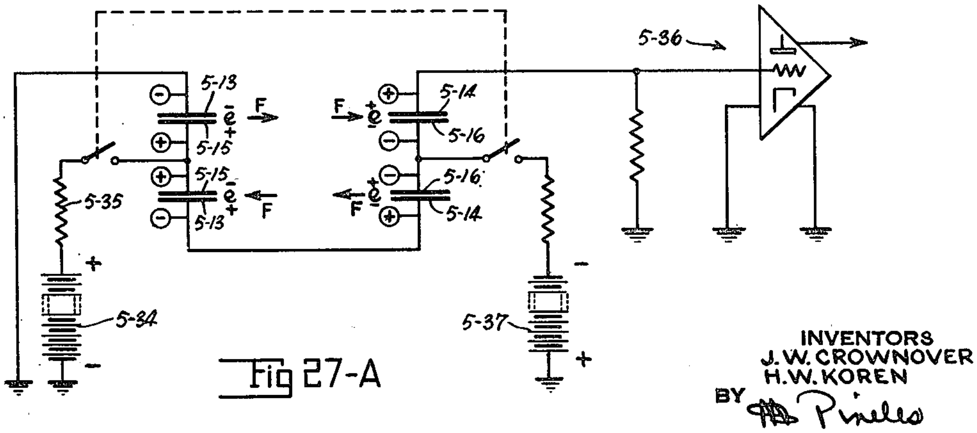
Fig 27-A
INVENTORS
J. W. CROWNOVER
H. W. KOREN
BY [signature]
ATTORNEY DIELECTROSTRICTIVE SIGNAL AND ENERGY TRANSDUCERS
Filed Sept. 9, 1947 26 Sheets-Sheet 19
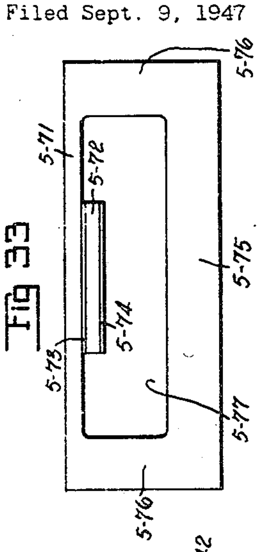
Fig 33
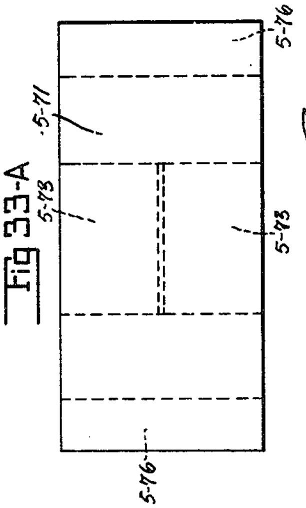
Fig 33-A
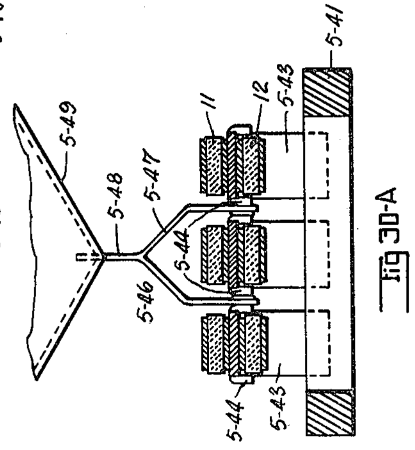
Fig 30-A
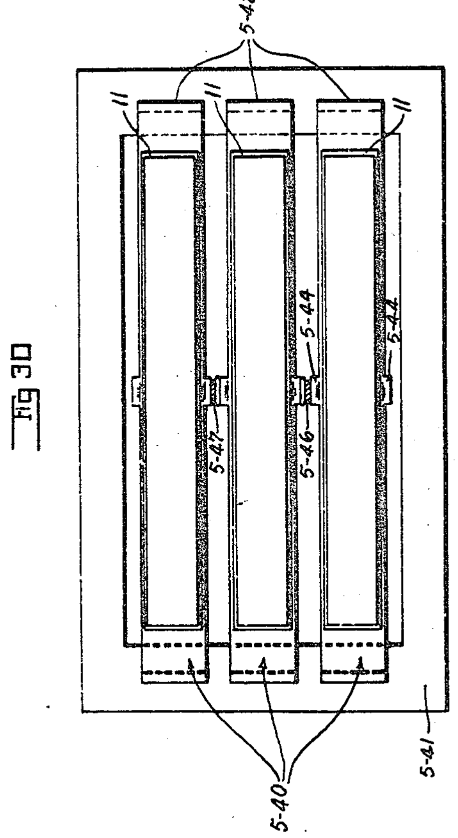
Fig 30
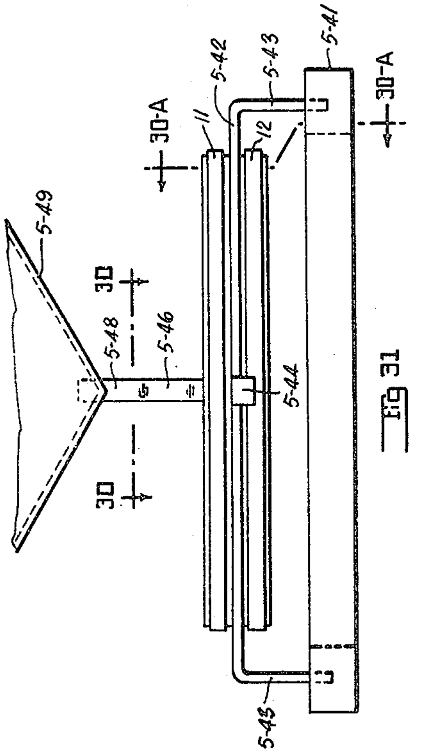
Fig 31
INVENTORS
J.W. CROWNOVER
H.W. KOREN
BY [signature]
ATTORNEY

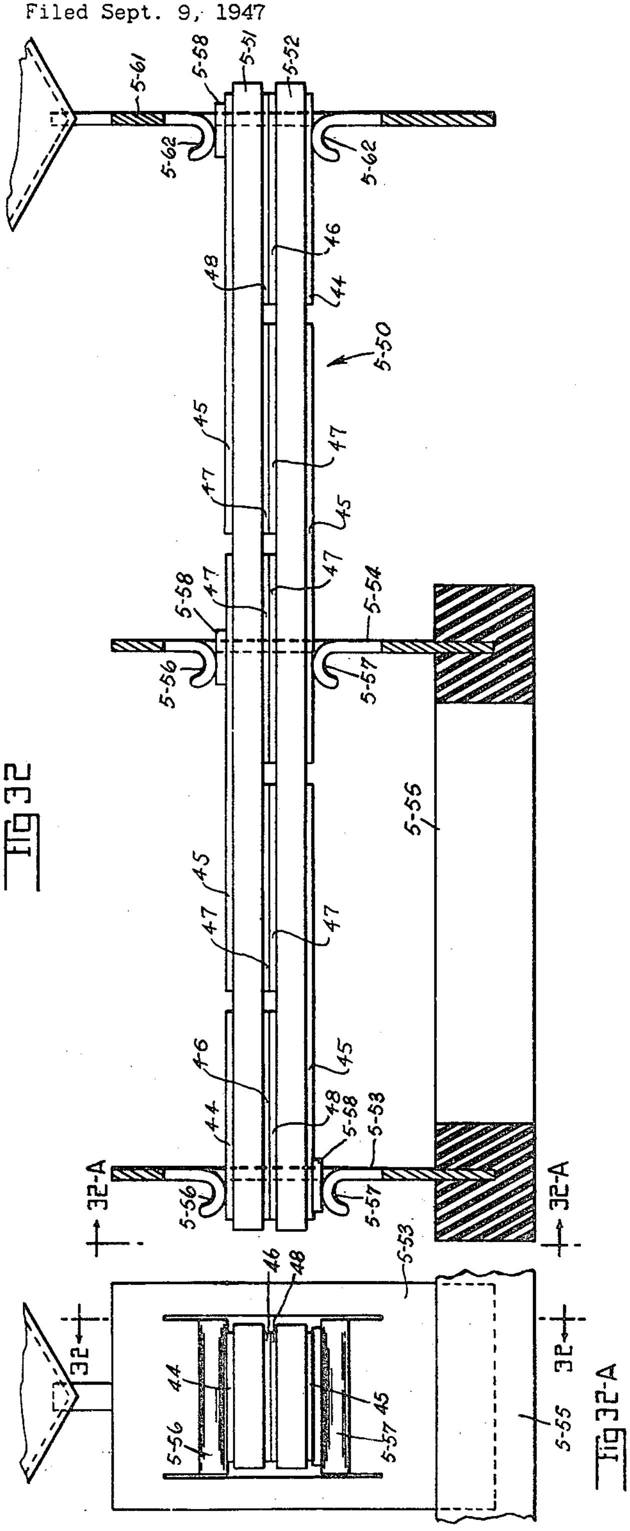
Fig 32, Fig 32-A
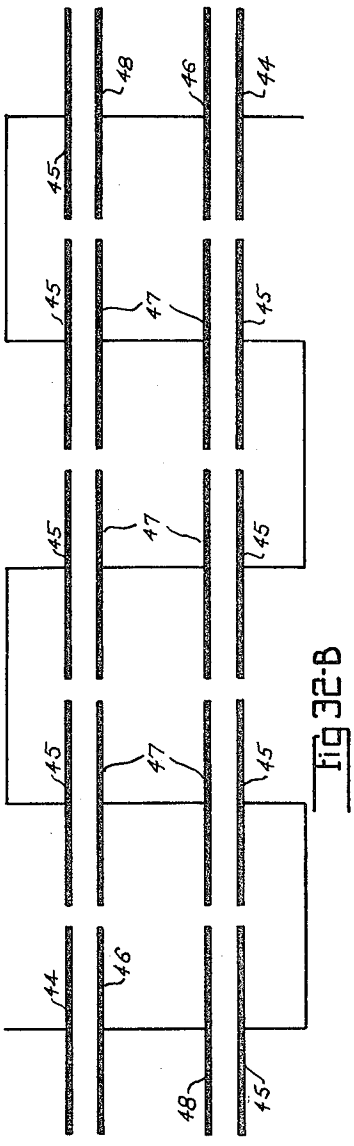
Fig 32-B
INVENTORS
J. W. CROWNOVER
H. W. KOREN
BY
[signature]
ATTORNEY

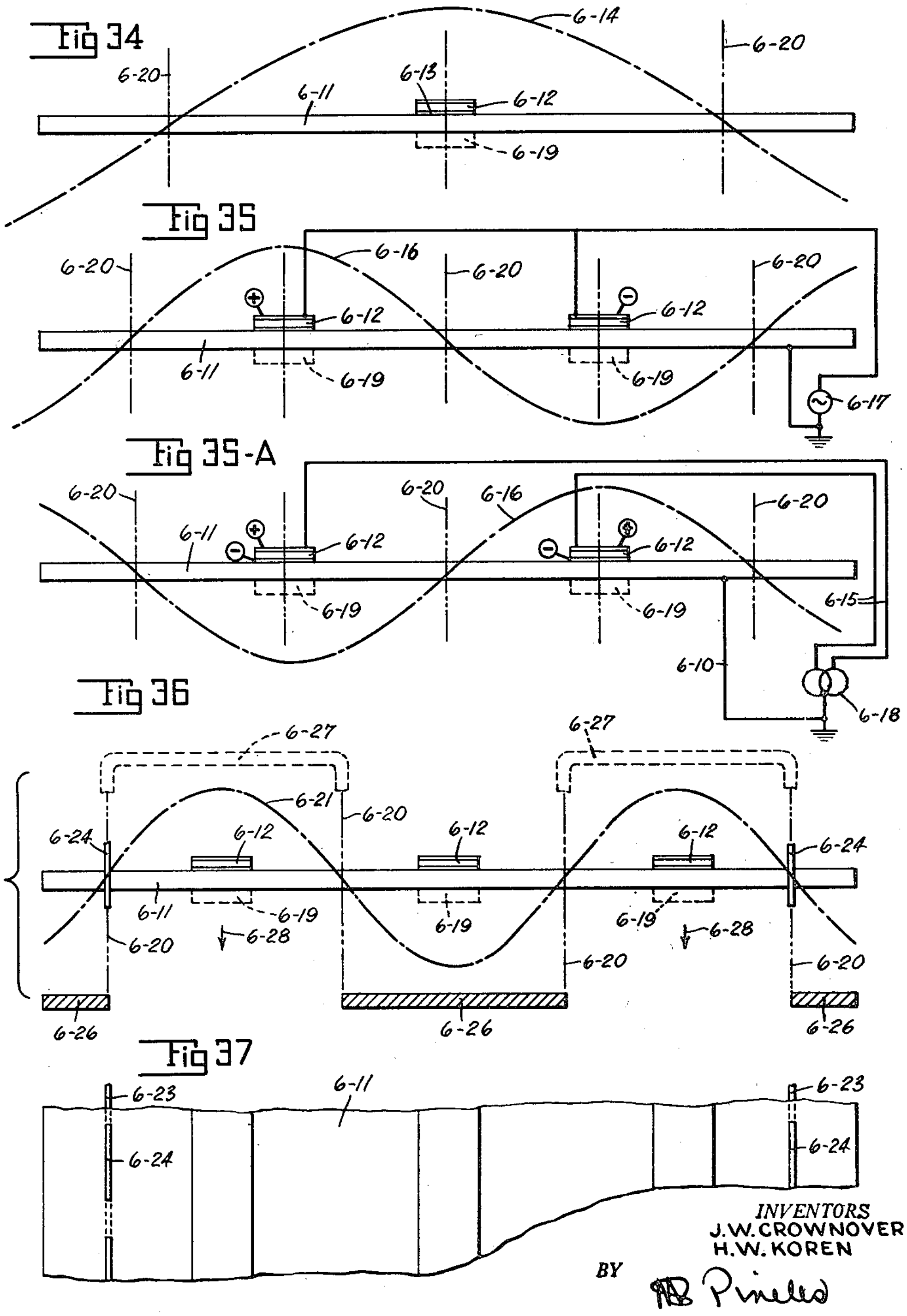
Fig 34, Fig 35, Fig 35-A, Fig 36, Fig 37
INVENTORS
J. W. CROWNOVER
H. W. KOREN
BY AB Pinelles
ATTORNEY DIELECTROSTRICTIVE SIGNAL AND ENERGY TRANSDUCERS
Filed Sept. 9, 1947 26 Sheets-Sheet 22
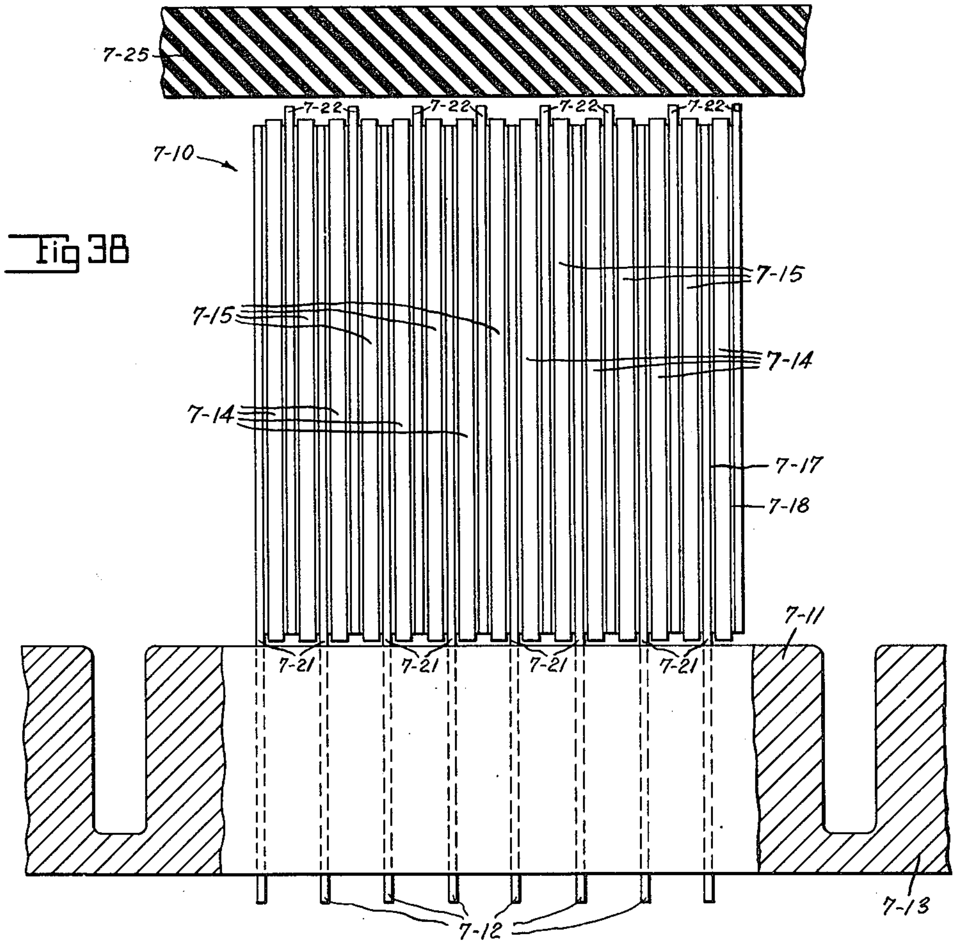
Fig 38
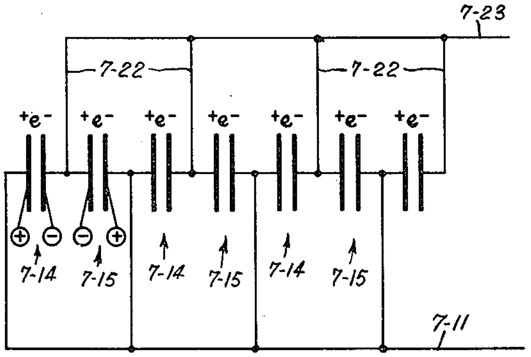
Fig 38-A
INVENTORS
J.W. CROWNOVER
H.W. KOREN
BY
[signature]
ATTORNEY Fig 39-A
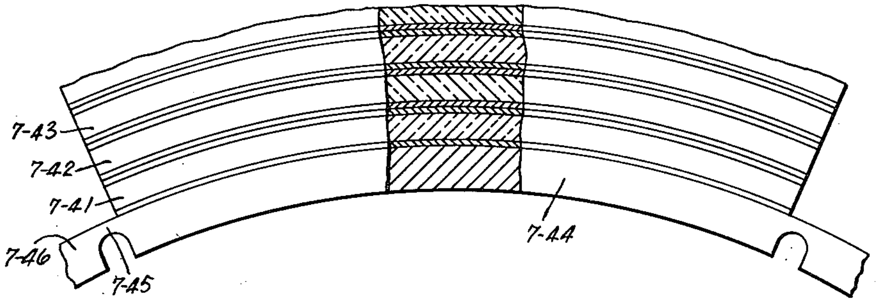
Fig 39
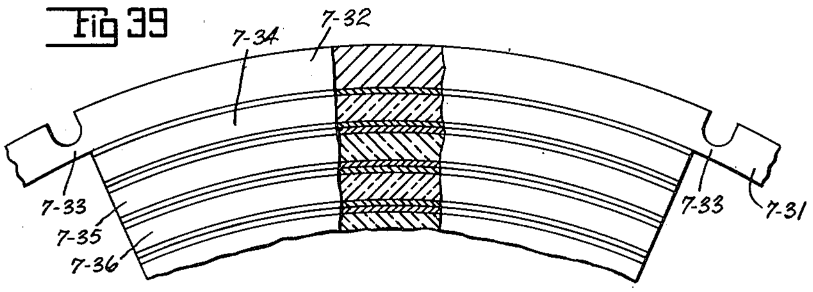
Fig 40
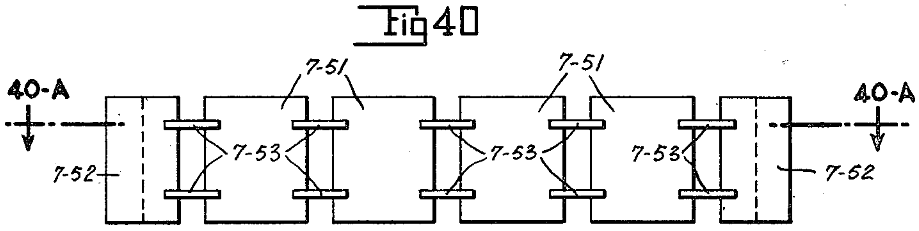
Fig 40-A
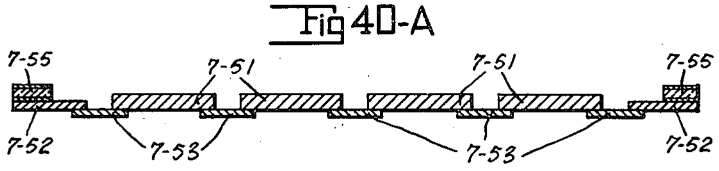
INVENTORS
J.W. CROWNOVER
H.W. KOREN
BY H. Pineles
ATTORNEY Fig 41
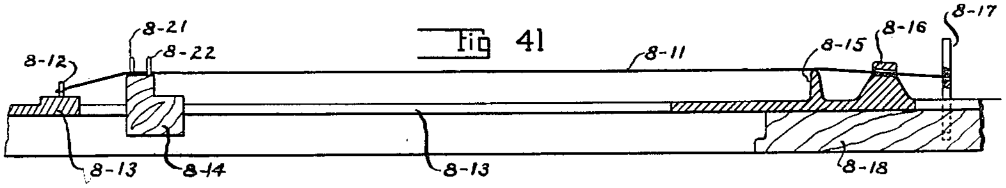
Fig 42
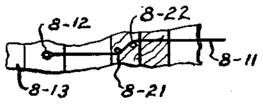
Fig 45-B
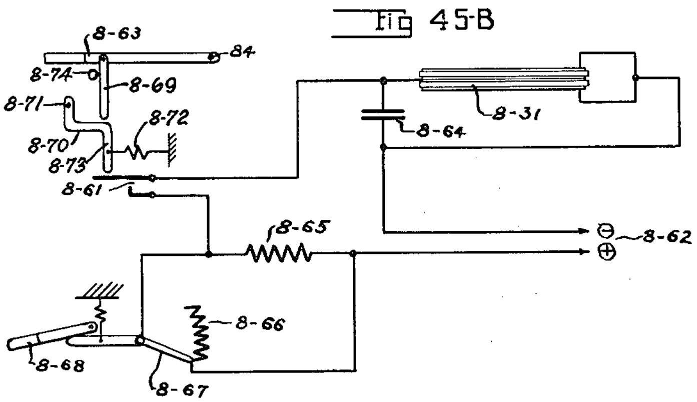
Fig 43
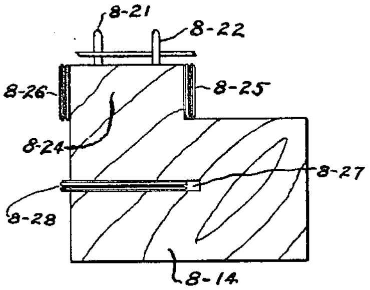
Fig 43-A
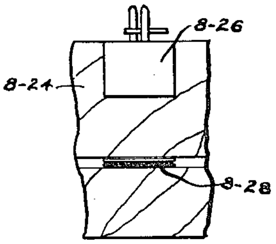
Fig 43-B
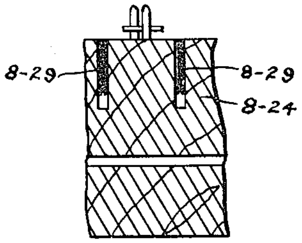
Fig 44
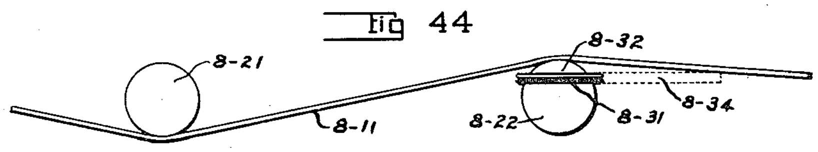
Fig 45, Fig 45-A
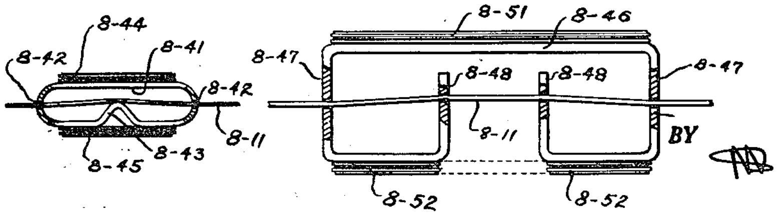
INVENTORS
J. W. CROWNOVER
H. W. KOREN
BY [signature]
ATTORNEY

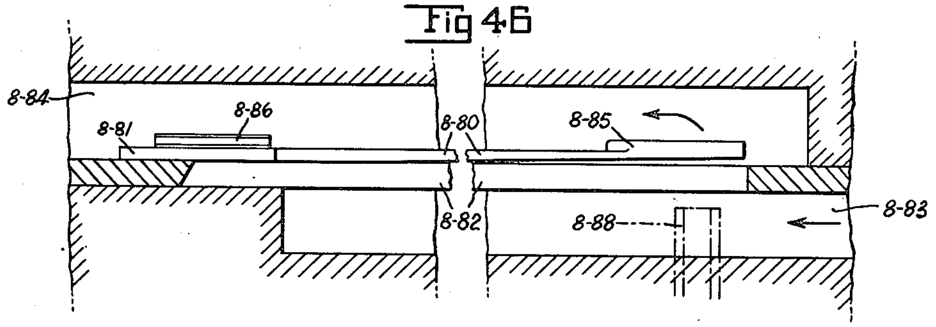
Fig 46
Fig 46-A
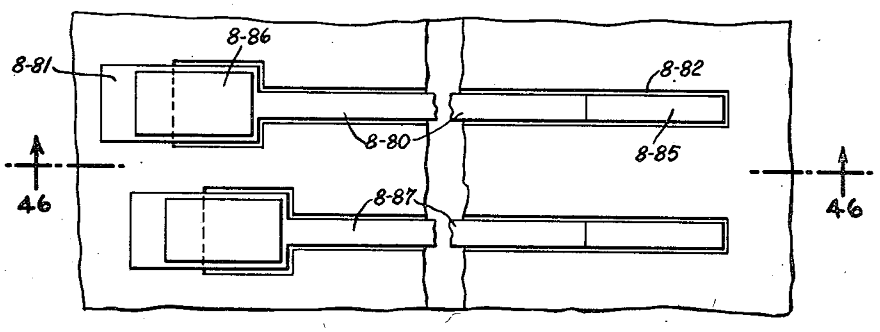
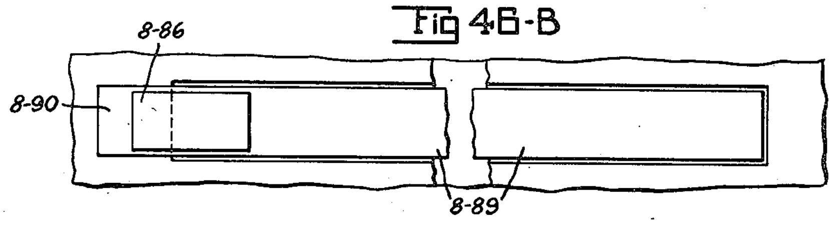
Fig 46-B
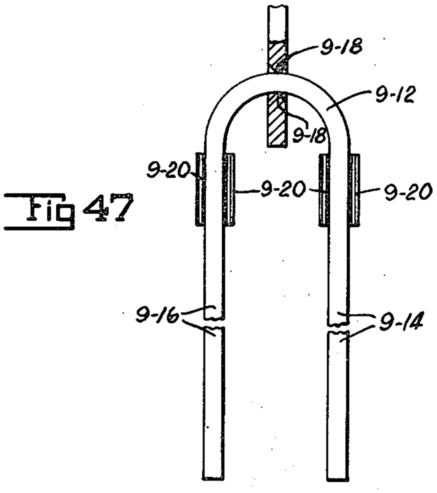
Fig 47
INVENTORS
J.W. CROWNOVER
H.W. KOREN
BY [signature]
ATTORNEY Nov. 6, 1956 J. W. CROWNOVER ET AL 2,769,867
DIELECTROSTRICTIVE SIGNAL AND ENERGY TRANSDUCERS
Filed Sept. 9, 1947 26 Sheets-Sheet 26
Fig 49
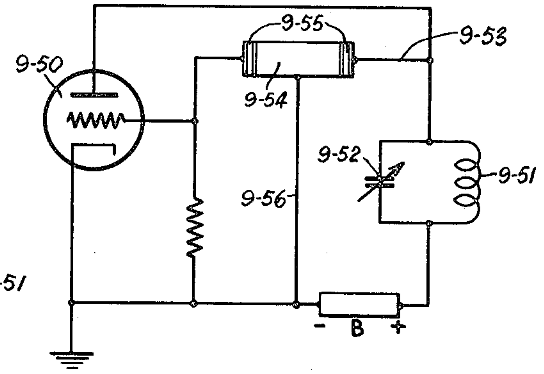
Fig 49-A
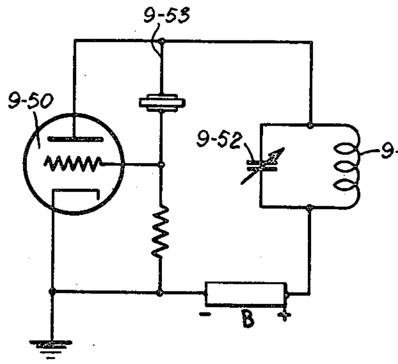
Fig 49-B
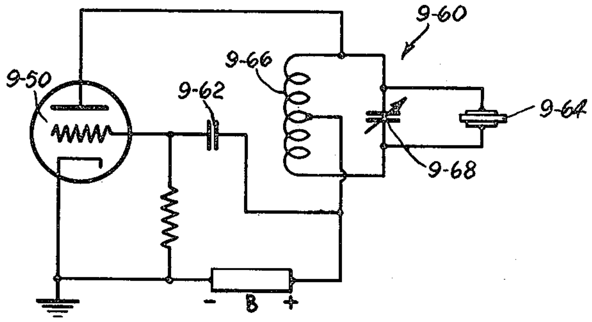
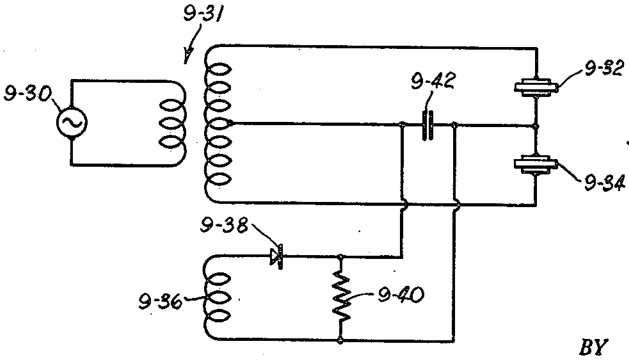
Fig 48
INVENTORS
J. W. CROWNOVER
H. W. KOREN
BY [signature]
ATTORNEY United States Patent Office 2,769,867 Patented Nov. 6, 1956

2,769,867

DIELECTROSTRICTIVE SIGNAL AND ENERGY TRANSDUCERS

Joseph W. Crownover, Hartsdale, and Heiman W. Koren, New York, N. Y., assignors to Sonotone Corporation, Elmsford, N. Y., a corporation of New York Application September 9, 1947, Serial No. 772,934

1 Claim. (Cl. 179—110)

This invention relates to signal and energy transducers which transduce one form of signals or energy into another form of signals or energy, such as phonograph pick-ups, microphones, strain gauges, sound and vibration emitters, or in general to devices and apparatus by means of which mechanical signals or energy are transduced into corresponding electric signals or energy, or by means of which electric signals or energy are transduced into corresponding mechanical signals or energy.

The present invention is based on the discovery that solid dielectric capacitors embodying a solid ceramic refractory dielectric material composed essentially of random oriented titanate particles may be permanently electrically polarized into piezoelectric ceramic bodies and that such permanently polarized titanate capacitors, when subjected to mechanical strains or motion, will produce corresponding electric potential across its electrodes and that when electric potentials are applied to the electrodes the capacitor structure will be subjected to corresponding strains or motion.

The foregoing and other objects of the invention will be best understood from the following description of exemplifications thereof, reference being had to the accompanying drawings, wherein.

Figure 1:
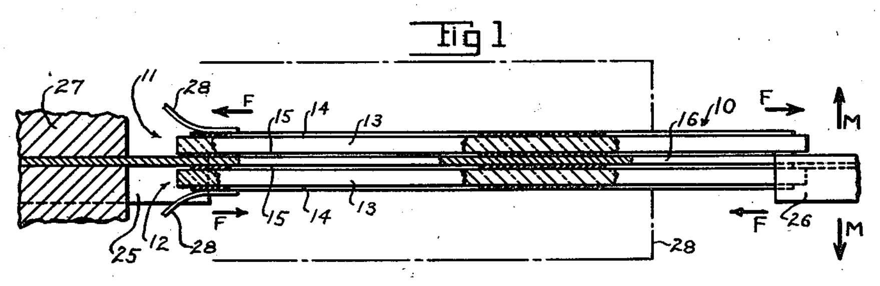
Fig. 1 is a side view of one form of a ceramic piezoelectric transducer structure of the invention.
Figure 2:
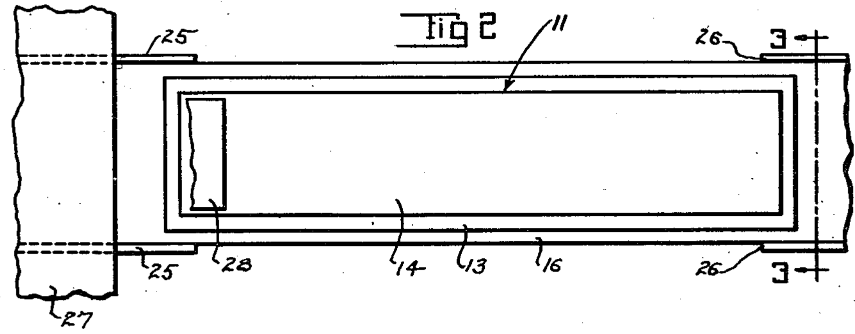
Fig. 2 is a top view of the structure of Fig. 1.
Figure 4:
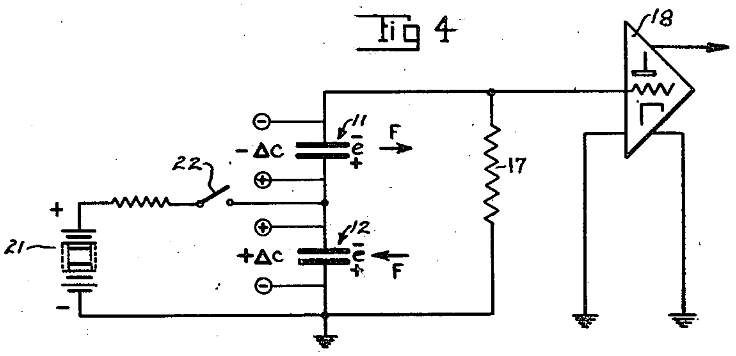
Fig. 4 is a circuit diagram showing one form of a polarizing arrangement for polarizing the dielectric elements of the transducer of Figs. 1 to 3.

Figs. 1–A to 4–A, inclusive, are figures similar to Figs. 1 to 4 of another form of transducer arrangement of the invention;

Fig. 4–A–B is a modified form of circuit diagram for polarizing the transducer structure of Figs. 1–A to 3–A;

Fig. 4–A–C shows diagrammatically the electrical circuit relationship of the transducer structure of Figs. 1–A to 3–A;

Figs. 1–B and 2–B are similar to Figs. 1 and 2 of another modification of a transducer of the invention;

Figs. 4–B and 4–BC are two circuit diagrams showing two forms of circuit relationship of the individual elements of the transducer structure of Figs. 1–B and 2–B.

Figure 5:
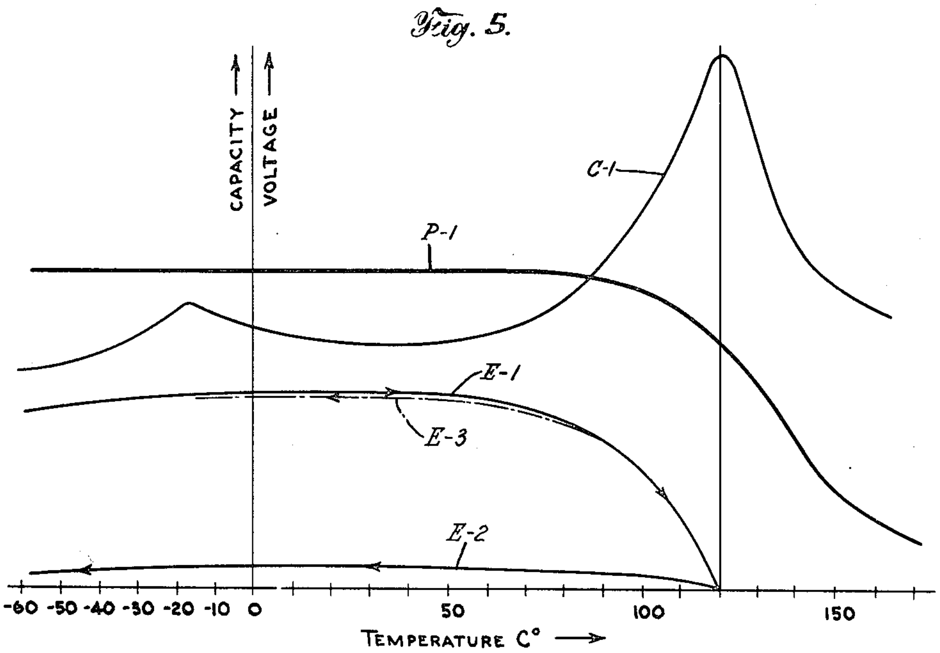
Figure 6:
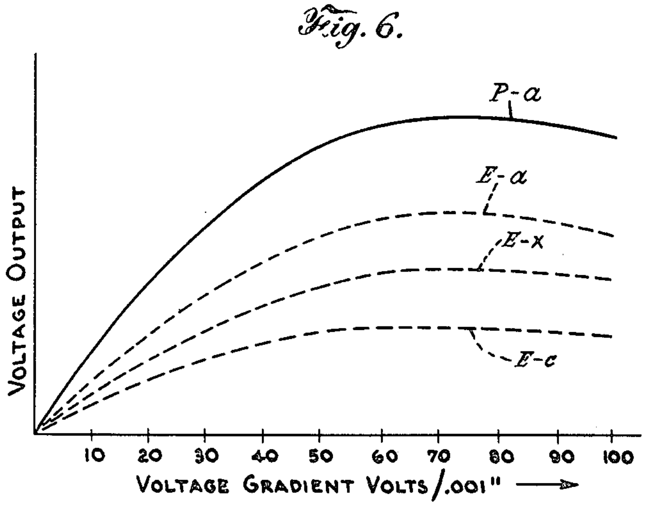
Figure 12:
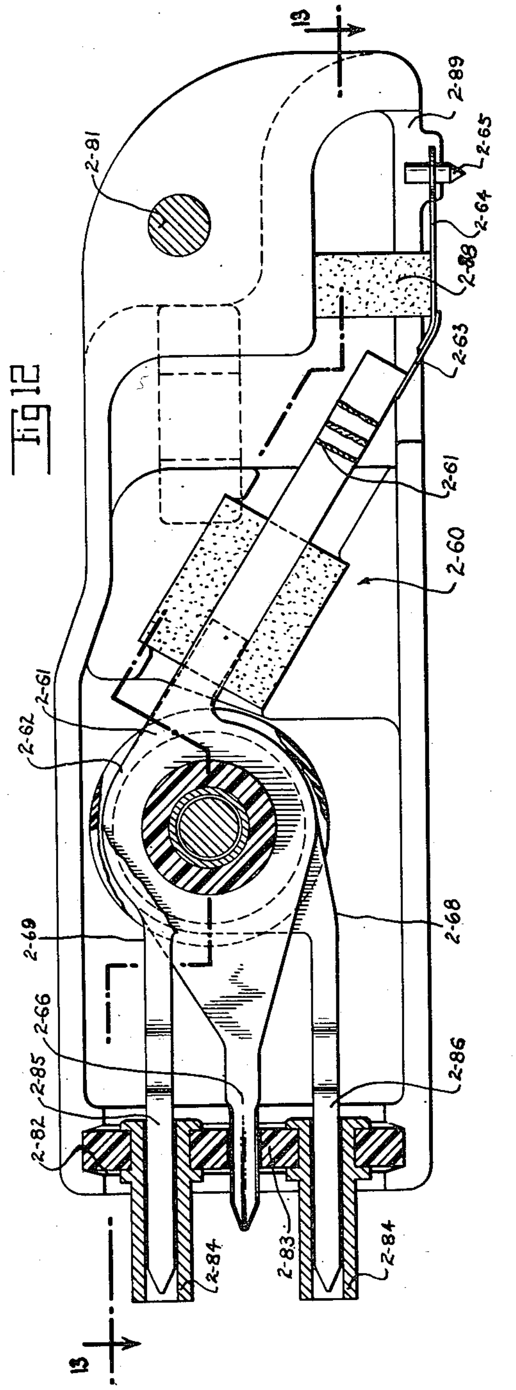
Figure 13:
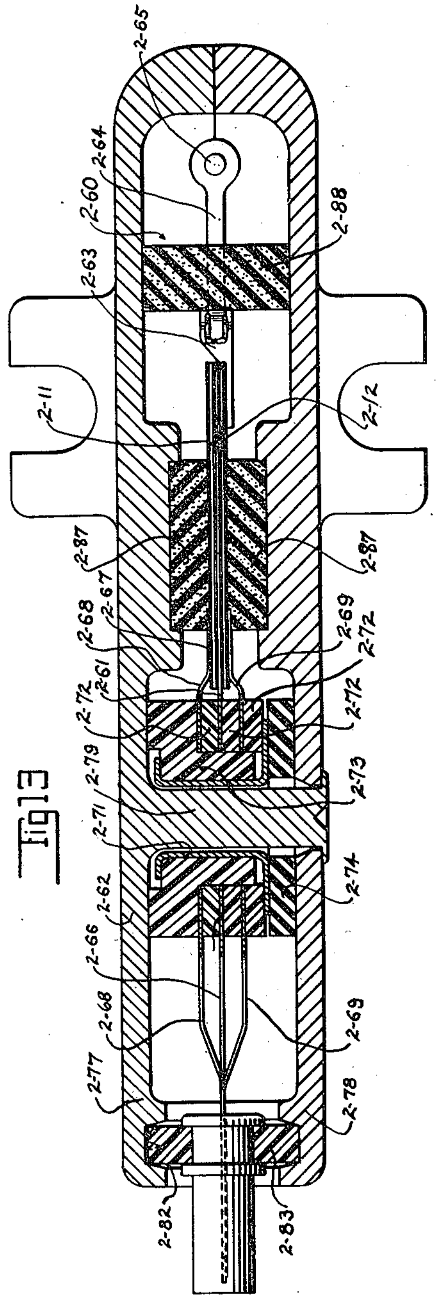
Figure 14:
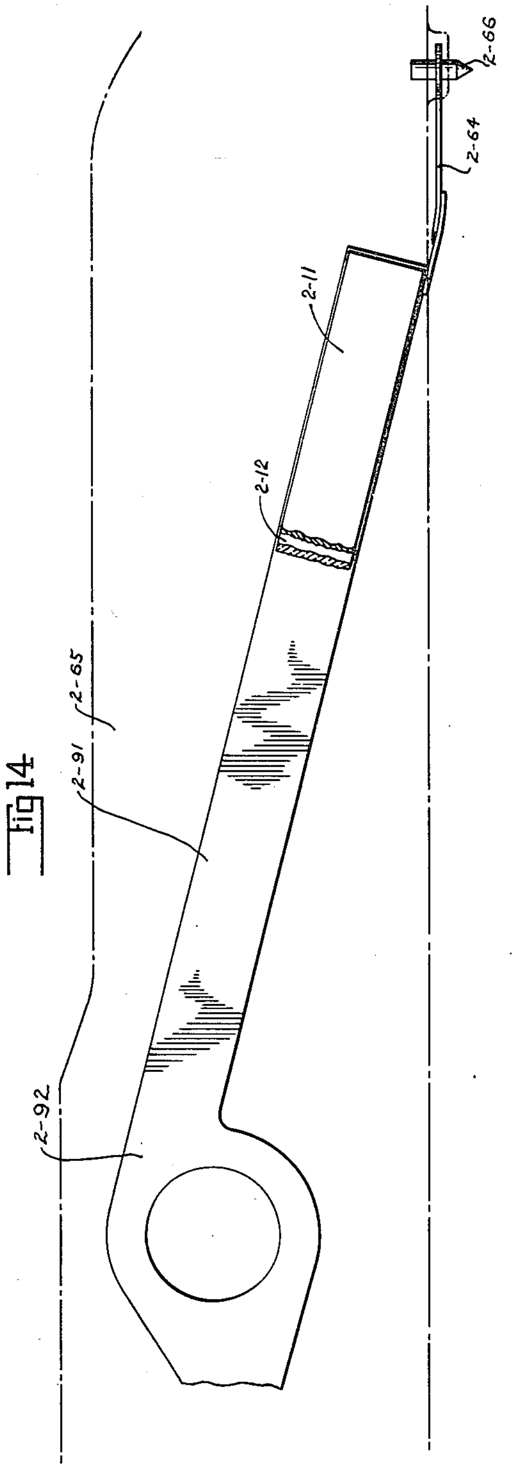
Figure 15:
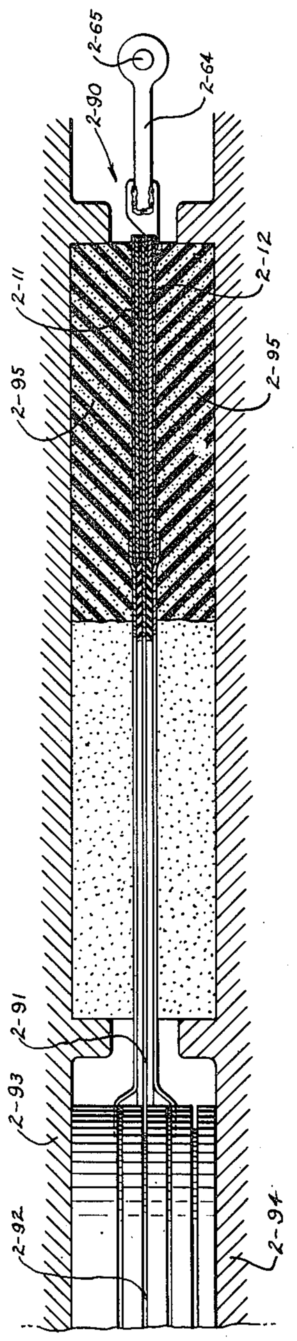
Figure 18:
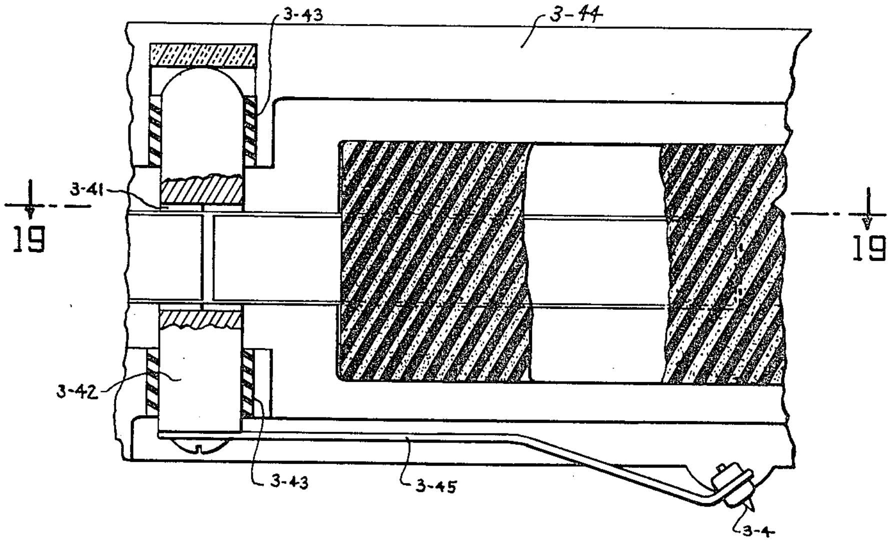
Figure 19:
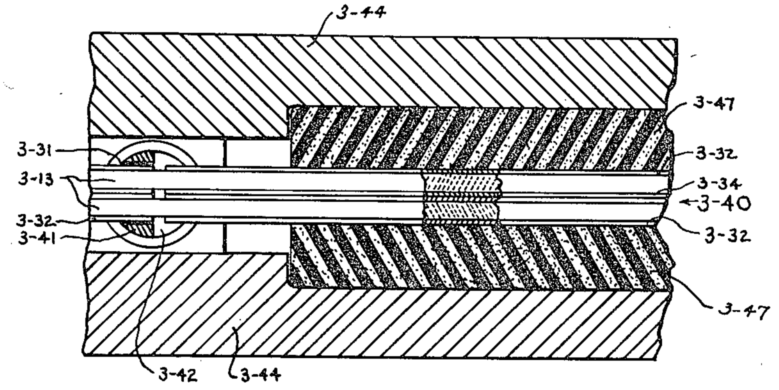

Figs. 1–C and 2–C are views similar to Figs. 1 and 2 of a further form of transducer arrangement of the invention;

Fig. 4–C is a circuit diagram showing the circuit relationship of the elements of the transducer structure of Figs. 1–C and 2–C;

Fig. 1–D is a view similar to Fig. 1 of a further form of transducer arrangement of the invention;

Figs. 2–D and 2–DE is a top view and bottom view of the transducer unit of Fig. 1–D;

Fig. 4–D is a circuit diagram showing the circuit relationship of the transducer elements of the transducer structure of Figs. 1–D to 2–DE;

Figs. 5 and 6 show two sets of curve diagrams representing the operating characteristics of dielectrostrictive condenser-transducers of the invention which render them suitable for use as mechano-electric or piezo-electric transducers;

Fig. 7 is a side view with one housing member removed of one form of a phonograph pick-up of the invention;

Fig. 7–A is an end view of the left end side of the pickup of Figs. 7 and 8;

Fig. 7–B is a cross-sectional view along line 7–B—7–B of Fig. 7;

Fig. 8 is a transverse sectional view along line 8—8 of Fig. 7;

Fig. 8–A is a cross-sectional view along line 8–A—8–A of Fig. 7;

Fig. 9 is a cross-sectional view similar to Fig. 8 of the transducer cartridge of Figs. 7 and 8;

Fig. 10 is a side view of the transducer unit of Figs. 7 and 8;

Fig. 10–A is a view similar to Fig. 10 of the contact member of the pick-up of Figs. 7 and 8;

Fig. 11 is a response curve diagram of the pick-up of Figs. 7 and 8;

Fig. 12 is a view similar to Fig. 7 of another form of pick-up of the invention;

Fig. 13 is a cross-sectional view along line 13—13 of Fig. 12;

Fig. 14 is a side view similar to Fig. 10 of another form of transducer unit of the invention;

Fig. 15 is a view similar to Fig. 13 of a phonograph pick-up operating with a transducer unit of Fig. 14;

Fig. 16 is a view similar to Fig. 7 of a further form of phonograph pick-up of the invention;

Fig. 16–A is a sectional view along line 16–A—16–A of Fig. 16;

Fig. 17 is a sectional view along line 17—17 of Fig. 16;

Figs. 18 and 19 are views similar to Figs. 16 and 17, respectively, of a modification of a pick-up of these figures;

Fig. 20 is a view similar to Fig. 7 of a still further form of pick-up of the invention;

Fig. 20–A is a view along line 20–A—20–A of Fig. 20;

Fig. 20–B is a view along line 20–B—20–B of Fig. 20;

Fig. 20–C is a view along line 20–C—20–C of Fig. 20;

Fig. 20–D is a view along line 20–D—20–D of Fig. 20;

Fig. 20–E is a view similar to Fig. 20 of a modified form of coupling connection between the transducer member and the stylus or needle chuck;

Fig. 21 is a partially diagrammatic view similar to Fig. 1 of a transducer structure of the invention;

Fig. 21–A is a phonograph pick-up of the invention operating with a transducer structure of Fig. 21;

Fig. 22 is a vertical cross-sectional view of another form of pick-up of the invention;

Fig. 23 is a cross-sectional view along line 23—23 of Fig. 22;

Fig. 23–A is a cross-sectional view along line 23–A—23–A of Fig. 23.

Figures 24, 25:
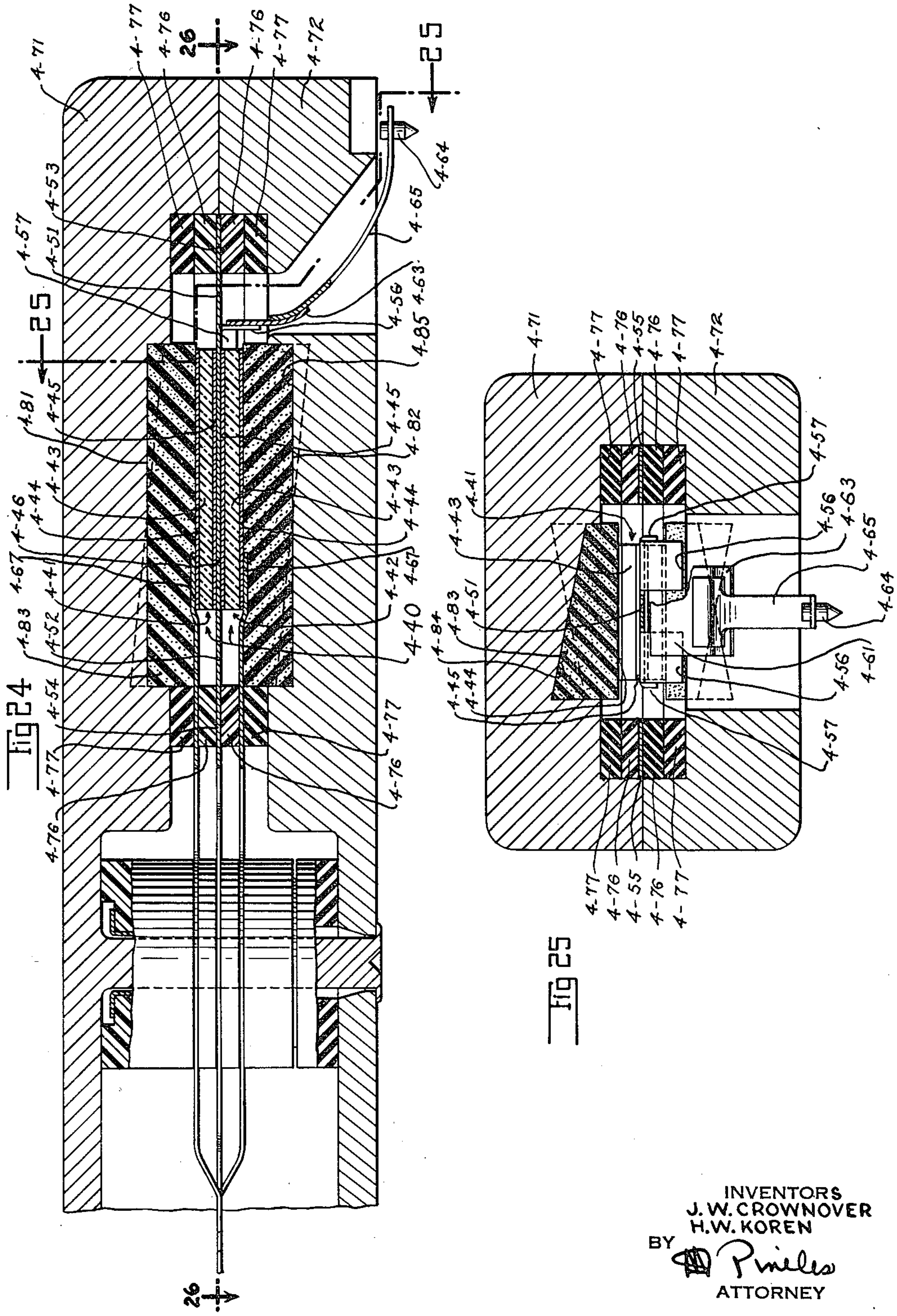
Figure 26:
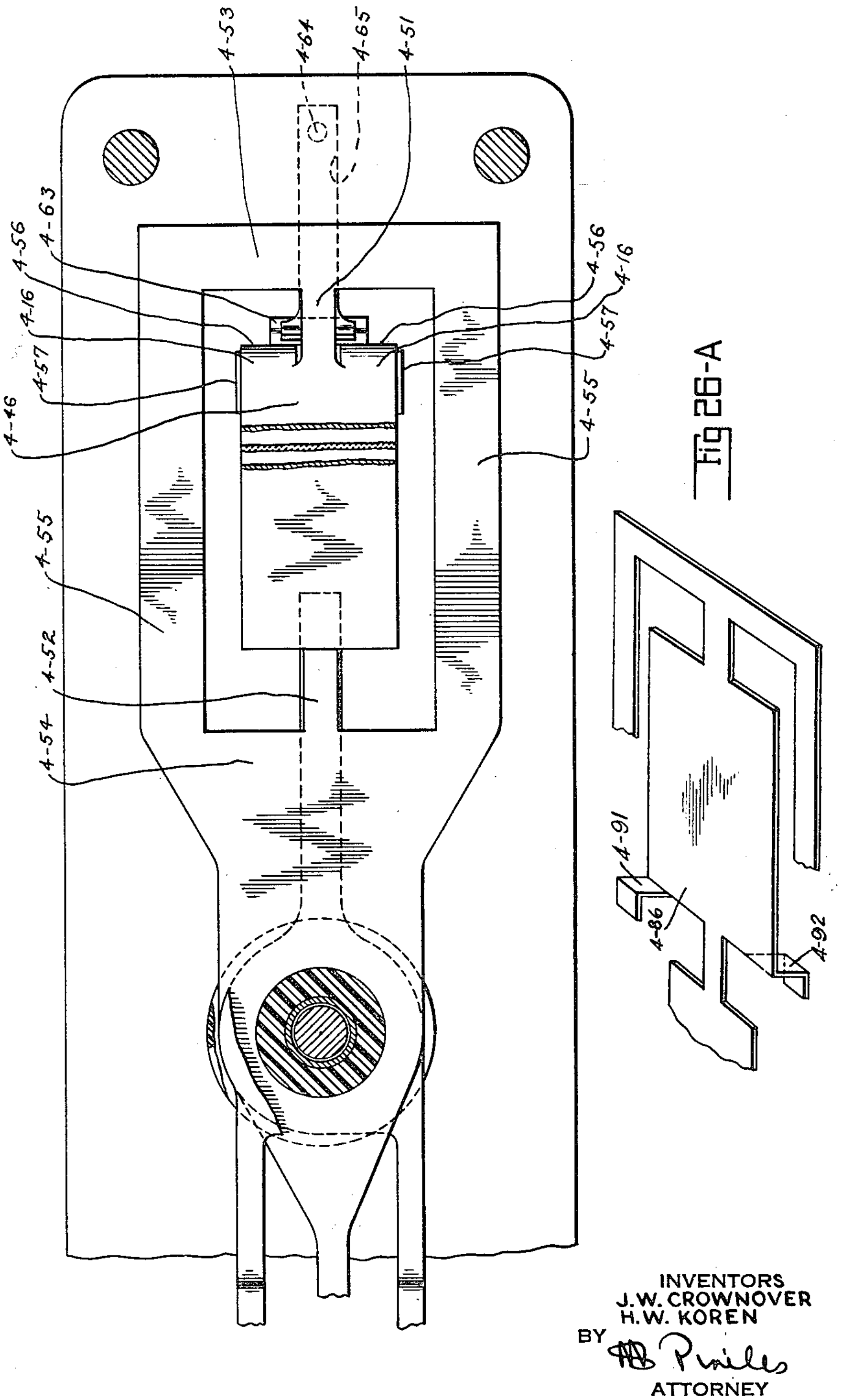

Fig. 24 is a vertical sectional view through another form of phonograph pick-up of the invention;

Fig. 25 is a view along line 25—25 of Fig. 24;

Fig. 26 is a view along line 26—26 of Fig. 24;

Fig. 26–A is a perspective view of a modified form of a transducer member for a pick-up of the type shown in Figs. 24 to 26;

Fig. 27 is a top view with parts in section of an acoustic device, such as a microphone or sound receiver, of the invention;

Fig. 27–A is a circuit diagram of a polarizing circuit for the transducer structure of Figs. 27 to 29;

Fig. 28 is a cross-sectional view along lines 28—28 of Fig. 27;

Fig. 29 is a cross-sectional view along line 29—29 of Fig. 28;

Fig. 30 is a view similar to Fig. 27 along line 30—30 of Fig. 31 of another form of electro-acoustic structure of the invention;

Fig. 30–A is a view along line 30–A—30–A of Fig. 31;

Fig. 31 is a front view of the transducer structure of Fig. 30;

Fig. 32 is a side view with parts in cross-section of another form of an acoustic transducer structure of the invention;

Fig. 32–A is a view along line 32–A—32–A of Fig. 32;

Fig. 32–B is a circuit diagram showing the relationship of the elements of the transducer structure of Fig. 32;

Figs. 33 and 33–A are a side view and top view, respectively, of a further form of a transducer structure of the invention;

Fig. 34 is a side view of another form of transducer structure of the invention;

Figs. 35 to 36 are views similar to Fig. 34 of modifications of the same generally similar transducer structure;

Fig. 37 is a top view of the transducer structure of Fig. 36;

Fig. 38 is a cross-sectional view of a part of another form of vibrational transducer structure of the invention;

Fig. 38–A is a circuit diagram showing the circuit relationship of the transducer elements of the transducer structure of Fig. 38;

Figs. 39 and 39–A are views similar to Fig. 38 of two further forms of vibrational transducer structures of the invention;

Fig. 40 is a plan view of an electro-mechanical filter transducer structure of the invention;

Fig. 40–A is a cross-sectional view along line 40–A—40–A of Fig. 40;

Fig. 41 is a vertical sectional view of a portion of a musical string instrument of the invention;

Fig. 42 is a top view of a portion of the instrument of Fig. 1;

Fig. 43 is an enlarged detailed sectional view of a part of the instrument shown in Fig. 1;

Figs. 43–A and 43–B are side and sectional views of the instrument portion shown in Fig. 43;

Fig. 44 is a top view of the instrument portion shown in Fig. 43;

Fig. 45 is a vertical sectional view of a string portion of a string instrument combined with a transducer structure of the invention;

Fig. 45–A is a view similar to Fig. 45 of a modified form of such combination;

Fig. 45–B is a schematic showing of the form of operating circuit for a sound generating instrument embodying the invention;

Fig. 46 is a vertical sectional view along line 46—46 of Fig. 46–A of a part of a musical reed type instrument;

Fig. 46–A is a top view of an instrument part of Fig. 46;

Fig. 46–B is a view similar to Fig. 46–A of a modified structure of the invention;

Fig. 47 is an elevational view of another form of a reed type instrument of the invention;

Fig. 48 is a circuit diagram schematically showing one arrangement for electrically driving mechano-electric transducers according to the invention; and Figs. 49, 49–A and 49–B are circuit diagrams of different forms and arrangements of mechano-electric resonating system of the invention.

Condensers or capacitors having a solid ceramic refractory dielectric layer composed essentially of random oriented titanate particles have come into wide use. The titanate dielectrics have a high dielectric constant, in the order of thousands and provide a large capacity in a small unit volume. They also exhibit a low power factor at high frequencies. They have the further advantage, in that the titanate dielectric layers may be made by standard ceramic procedures in the form of refractory ceramic bodies, which are free from deterioration due to penetration of the moisture into the dielectric.

The dielectric constant of titanates is a function of the temperature. Depending on the composition, the value of the dielectric constant of a titanate dielectric goes through a maximum within a relatively narrow range of temperature. Thus, the dielectric constant of barium titanate ($BaTiO_3$) has a maximum dielectric constant at about 120° C. On the other hand a ceramic dielectric comprising a solid solution in the ratio of two molecules of barium titanate ($BaTiO_3$) per one molecule of strontium titanate ($SrTiO_3$) has a maximum dielectric constant at about zero degree C.

Solid titanate dielectric body layers for use in condensers are made by more or less standard ceramic manufacturing procedures, and they all comprise polygranular refractory structures in which the crystal structure of the grains have random orientation.

One phase of the invention is the discovery that the entire volume of the solid random oriented dielectric titanate structure of such capacitors or condensers may be electrically permanently polarized and converted into dielectrostrictive or piezoelectric transducers by connecting such titanate condenser structure to a source of direct current (D. C.) potential so that a voltage gradient—which is a substantial fraction of its breakdown voltage or dielectric strength—is applied to the dielectric titanate body of such condenser for a shorter or longer period of time depending on the composition of the titanate dielectric body.

According to another phase of the invention, the foregoing difficulties encountered with condensers having extremely thin solid dielectric layers are overcome by embodying in at least one of the surface electrodes of such condensers or in both of its surface electrodes a ductile metallic backing layer or sheet of substantial ductility or/and strength united to the facing surface of the dielectric layer so that when the condenser structure is subjected to mechanical strains the metallic body layer of the condenser and the ductile backing layer is effective in distributing the mechanical strain to which any portion of the condenser may be subjected. A condenser of the invention has the further advantage that even if a condenser with such ductile electrode layers is flexed to a degree which causes the dielectric layer to fracture, the effectiveness of the ceramic dielectric layer is not impaired because the ductile electrode layers bridge the fracture gaps and maintain all elements of the solid dielectric in their proper relationship with respect to the electrodes without decreasing the effective capacity of the condenser.

One form of a condenser structure exemplifying the invention will now be described in connection with Figs. 1 to 3, which show such condenser with the dimensions of the several layers exaggerated for the sake of clarity.

The condenser transducer structure, generally designated 10, comprises two condenser units 11 and 12, each having a thin solid dielectric layer 13 composed essentially of a refractory ceramic titanate material. To the two exposed extended surfaces of each dielectric layer 13 are united extended surface electrodes 14, 15. Each surface electrode 14, 15 comprises an extremely thin layer or coat of an electrically conducting material such as a silver composition which has the property of becoming bonded and united in extremely intimate and direct contact with the underlying exposed surface particles of the solid dielectric layer 13. In order to give the two condenser units 11, 12 substantial mechanical strength notwithstanding the fragile character of their thin dielectric structure, they are shown joined to a ductile sheet backing member 16, as by uniting their thin electrode coatings 15 to the exposed opposite surfaces of the relatively tough thin sheet member 16 in such manner that the sheet member 16 shall provide a non-fragile backing for each of the two condenser elements 11, 12. The sheet member 16 may be made either of a ductile metal or of a strong synthetic resin or plastic sheet material, for instance, such a fabric impregnated with a synthetic resin or plastic of the type long and generally used in making tough sheets.

In accordance with one phase of the invention, the sheet element 16 which serves as a backing of the two condenser elements 11, 12 is made of metal and utilized as an electrode structure for the two condenser elements 11, 12, which are united thereto and which form therewith a substantially integral mechanically strong multiple condenser transducer structure.

By combining a condenser transducer structure of the type shown in Figs. 1 and 2 with a ductile backing sheet, it is given great mechanical strength without substantially increasing its stiffness against deformation or bending in a direction perpendicular to the plane of the backing sheet element 16. However, the backing sheet element will add greatly to the strength of the condenser transducer structure against forces in the direction substantially parallel to the plane of the sheet member 16.

Thin titanate dielectric layers for such thin condensers 11, 12 of the type shown may be made by casting a slurry of the granular ceramic insulating material and a quantity of a combustible organic binder, such as 10% by weight of the ceramic material are mixed with a suspension material such as toluol on a moving belt, of stainless steel, for instance, the thickness of the cast ceramic layer being determined by a standard doctor blade. After drying the cast dielectric layer is stripped from the moving belt and then sub-divided by cutting the green layer into strips of a size suitable for further handling during the firing procedure. The thin green strips of the dielectric material are placed on saggers and brought into a kiln where they are subjected to the firing process by a standard firing procedure in which the organic binder is burned out.

After cooling and removing from the kiln the thin dielectric strips are coated with thin surface electrodes by applying through a screen or by spraying a thin film of a mixture containing finely divided metallic silver and a ceramic frit, in such proportions that when the so-coated dielectric layers are subjected to an additional firing in an oxidizing atmosphere at a temperature such as 700° C., the frit will melt and the metallic silver particles will be adherently united and bound to the interface of the exposed dielectric layer surface. The silver frit used for electrode coating 13 is loaded with sufficient metallic silver so that the solidified frit forms a highly effective electric conductor and does not interpose an electric insulating medium between the extremely thin silver coating electrode and the dielectric body.

Such thin electrode coating may be applied by spraying relatively large fired strips of the refractory dielectric layer, and then sub-dividing the coated fired strip into condenser units of the desired size, each having an electrode coating extending to the edges of the dielectric layer.

The thin fired dielectric layer with the electrode coating formed thereon is then copper-plated for a short instant, such as a minute, in an acid copper-plating bath of standard composition so as to deposit an extremely thin layer of copper on the silver electrode coatings.

In accordance with the invention, commercial production of refractory dielectric condensers of the type described above suitable for use as dielectrostrictive transducers is carried on in accordance with the following procedure:

The thin refractory dielectric layers with the silver electrodes fritted to its surfaces are produced in relatively large area sections. To one or both the opposed silver fritted electrode surfaces of such large area condenser sections are then united ductile backing sheets. The backing sheets are united to both electrode surfaces of such thin condenser in cases where the additional stiffness is not objectionable and the protective backing sheets on both sides of the condenser is very desirable.

Thereupon each condenser section with the ductile backing sheet or sheets united thereto is sub-divided into condenser elements of the required size by an abrasive cutting tool, such as a cutting wheel having a thin cutting periphery coated with embedded diamond particles.

According to the invention, ductile backing sheets for such fragile refractory dielectric layer condensers may be provided by spraying or otherwise uniting to the fritted electrode surfaces of individual condenser elements a layer of material such as solder of sufficient thickness to provide the desired backing strength and protection against fracture.

A metallic thin backing sheet 16, which has been pretinned, has then united to its opposite sides the copper coated exterior surfaces of the two electrodes 15 of the two condenser units 11, 12 by placing them in juxtaposition in a suitable soldering fixture and then passing them through a heating region, such as a tunnel, which raises the assembled structure to the solder temperature so that after subsequent cooling the two condenser elements are integrally united along their electrode surfaces 15 to the backing element 16. If desired, a thin layer of solder may be placed on the opposite surfaces of the backing sheet 16 before assembling the two condenser units in juxtaposition on the opposite side thereof for uniting them by a soldering preparation described above. Other procedures may be used for uniting the two condenser units 11, 12 to the upper sides of the backing sheet 16.

Figs. 1 and 2 show the backing sheet 16 as being wider and longer than the two condenser elements. However, there are many applications in which the backing sheet may be confined to the area of the condenser elements 11, 12.

In condensers of the foregoing type in which the electrode coatings 14, 15 extend to the edges of the exposed surfaces of the dielectric layer 23, the insulating characteristics of the edge surface of the dielectric layer may be materially increased by wetting or dipping these edged surfaces in an insulating silicone fluid or oil of the type available on the market.

If such condenser element is subjected to a tension strain in the direction of its longitudinal axis, as indicated by the vectors F in Fig. 1, its dielectric constant and hence its capacity will decrease. Conversely, if such condenser unit is subjected to longitudinal compression the dielectric constant and hence the capacity of such condenser element will be increased.

As stated above, according to the invention, condenser structures of the foregoing type are converted in mechano-electric or electro-mechanical energy transducing structures by inducing in the dielectric layers of the condenser elements a permanent electric volume polarization. In particular we have discovered that the entire volume of the solid titanate dielectric layers of condenser elements of the foregoing type which are composed essentially of polygranular randomly oriented titanate particles, may be electrically permanently polarized so that when the dielectric body of such condenser element is subjected to a strain which increases or decreases its capacity it will generate at its electrodes voltages corresponding to the strain, or vice versa.

As used herein in the specification and claim, the expression "dielectrostriction"—as applied to condensers having a solid dielectric composed of non-oriented dielectric particles—means their property of producing electric voltages across the condenser electrodes when its dielectric is subjected to corresponding mechanical strains and their property of causing in the dielectric body to exert mechanical strains when corresponding potentials are applied to the condenser electrodes, and the expression "dielectrostrictive transducer" means a capacitor or condenser having a solid dielectric body composed of non-oriented dielectric particles which are permanently electrically polarized so that the capacitor or condenser will operate to transduce mechanical strains imparted to its dielectric into corresponding electric voltages, and to transduce electrical potentials applied to its electrodes into corresponding mechanical strains exerted by its dielectric structure. However, it should be understood that in the expression "dielectrostrictive transducer," the word "dielectrostrictive" is synonymous with the word "piezoelectric" throughout the specification and claim.

According to the invention, a combined multiple condenser structure of the general type shown in Figs. 1 and 2 may be permanently polarized in opposite senses so that when the two condenser elements of such polarized condenser structure are simultaneously subjected to strains of opposite character the changes of the dielectric constant or the capacity of the two condenser elements will produce aiding voltages. According to the invention, the dielectric structure of such condenser structure may be permanently electrically polarized—and thereby converted into a dielectrostrictive or piezoelectric transducer—by connecting each condenser unit to a source of D. C. potential—up to almost the breakdown voltage gradient—so that a larger or smaller fraction of its breakdown voltage gradient is applied thereto for a shorter or longer period of time, depending upon the characteristics of the specific titanate body of the individual condenser elements.

When two such condenser elements are combined into a bilaminate structure such as shown in Figs. 1 and 2, such permanently induced polarization may be conveniently applied in the proper sense so that their effectiveness aids when functioning as a mechano-electric or electro-mechanical transducer structure.

Fig. 4 shows one form of an electric circuit by means of which such bilaminate condenser unit which is to serve as an energy transducer may be permanently polarized in accordance with the invention. The condenser elements 11, 12 are shown connected in series across a resistance 17 which may serve as an input resistance of an amplifier 18 which serves to amplify the electric signals generated by the transducer structure in response to mechanical strains imparted thereto. A source of D. C. charging potential which may be provided by a battery 21 which is shown connected through a switch 22 between the terminals to the two condenser elements 11, 12, to the grounded side of the resistance 21, so as to apply to the two condenser elements 11, 12 equal unidirectional voltages which act electrically in parallel across the two condensers but which are oppositely directed with respect to the series relationship of the two condenser elements 11, 12.

We have found that when such charging potential is applied to titanate condenser elements, the grains of the entire dielectric structure of the condenser elements are subjected to electric forces which we believe produce in them a permanent electric displacement corresponding to the applied external charging potential so that after removing the external charging potential such previously charged condenser element exhibits a permanent electrical polarization of substantially the entire volume of its dielectric structure. The so polarized dielectric structure of a titanate condenser remains permanently polarized although its surface electrodes are permanently short circuited for an indefinitely long period of time and it will, upon removal of the short circuit exhibit mechano-electric transducer characteristics corresponding to such volume polarization.

Thus such polarized condenser structure will operate as a reversible mechano-electric energy transducer structure, if each of the condenser elements remains permanently shunted by a resistance or inductance exhibiting an impedance compatible with the other parameters of the associated operating circuit.

As used herein, the expression "mechano-electric" transducer is intended to mean an energy or signal transducing device which changes mechanical energy signals into electric energy or signal and which changes electric energy or signals into mechanical energy or signals.

In Fig. 4 the arrows F indicate the direction of the longitudinal forces shown applied to the two condenser elements 11, 12 when the entire condenser assembly structure is subjected to a bending strain for instance. Thus condenser element 11 is subjected to a stress F while at the same time the condenser element 12 is subjected to an opposite stress F. The legend $-\Delta C$ and $+\Delta C$ applied to the two condenser elements 11, 12 indicates the change of the capacitance produced in the two condenser elements by the two opposite forces F and F. The legend $\mp e$ applied to the two condenser elements 11, 12 indicates the change in the incremental voltages produced in the two condenser elements by the effect of the opposite strains F and the resulting opposite changes in the capacitance in the two condenser elements when they have been permanently polarized by a D. C. potential source in the manner indicated.

In this application when referring to solid random oriented refractory titanates we have reference to titanates the particles of which have a generally perovskite structure although we do not intend to thereby exclude other refractory titanate structure. In general all the titanates of the type described in the article by E. Wainer, entitled "High titania dielectrics," in the Transactions of the Electro-Chemical Society of volume 89, 1946, pages 47–71 are suitable for practicing the invention.

In Fig. 5 curve C–1 shows the capacity of such condenser element as a function of the temperature indicated on the abscissae axis. It will be noted that the condenser element in question exhibits a maximum capacity at about 120° C. Dash-line curve branches E–1, E–2 represent the piezoelectric output voltage as a function of the temperature, when a constant displacement is imparted to the element. It will be seen, that when the temperature is first increased from the low value to the highest value and then decreased from the highest value to the lowest value, as indicated by the arrows on curve branches E–1, E–2, the alternating voltage output of the condenser element drops when the temperature of the titanate condenser is brought to a value at which it has the highest maximum capacity, and that its mechano-electric output voltage remains low when the temperature of the condenser element is thereafter decreased along curve E–2.

In Fig. 5 the dash-dot line E–3 gives the mechano-electric output voltage of the condenser element, when, after its temperature has been raised up to about 70° C., its temperature is lowered to its normal value from 70° C. to which it was first raised. Curve E–3 shows that if the temperature of the condenser element is not raised to a high value, raising and lowering of the temperature does not materially affect is mechano-electric output voltage. For practical purposes the voltage characteristic E–3 substantially coincides over the range up to about 100° C. with the curve E–1. It is also of interest to know that in performing the tests represented by curves E–1, E–3, the condenser element was retained at a temperature of about 100° C. for an extended period of several weeks without any apparent loss of its mechano-electric voltage output.

Dot-line curve P–1 shows the output voltage of the condenser under constant mechanical displacement corresponding to the curves E–1, E–2, E–3, when its electrodes are connected to an external voltage source which was used to polarize the condenser and give it the mechano-electric characteristics represented by curves E–1, E–2, E–3. It will be noted that when the temperature of the condenser element is reduced even below minus 60° C., its mechano-electric output is not materially reduced.

We have found that generally similar characteristics are exhibited by condensers having dielectric bodies composed of titanates other than barium titanate alone. By way of example, there are given below data for a titanate condenser unit having a dielectric body containing about 70 percent barium titanate and about 30 percent strontium titanate in solid solution. This condenser element had a highest maximum capacity at about 40° C. The other characteristics of this condenser unit are qualitatively similar to those represented by the curves C–1, E–1, E–2, E–3 and P–1, except that the curves are shifted to lower temperature regions and that the ratio of ordinates of curve E–1 to the ordinates of curve P–1 was only about 30 percent as against 70 percent for the curves of Fig. 5.

In Fig. 6 curve P–*a* represents the mechano-electric voltage output for constant displacement of a condenser element having the characteristics shown in the curves of Fig. 5 as a function of the voltage gradient of the charging potential applied to its dielectric layer when the charging source remains connected to the condenser; curve E–*a* of Fig. 6 represents the corresponding mechano-electric voltage output when the charging source is disconnected from the condenser.

As shown by curves P–*a* and E–*a* the mechano-electric output voltage or sensitivity rises to an asymptotic value as the voltage gradient of the charging voltage is increased and remains at a substantially constant value as the voltage is further increased till the breakdown voltage which occurs for the specific condenser unit at a voltage gradient of about 100 volts per one thousandth of an inch of thickness.

When operating with a condenser element of the invention having a titanate body which was composed of about 70 percent barium titanate and about 30 percent strontium titanate in solid solution, there was obtained a mechano-electric output or sensitivity characteristic represented by curve E–*c* in Fig. 6.

Condensers made with the other titanate compositions will exhibit generally similar characteristics, such as represented by curve E–*x* in Fig. 6.

Depending on the composition of the titanate dielectric body of a mechano-electric condenser of the invention, a longer or shorter period of charging period is required in order to induce in it the desired mechano-electric characteristics. Thus, in a case of a condenser unit having a dielectric body consisting essentially of barium titanate, the desired mechano-electric characteristics may be induced therein by applying thereto the charging potential only for about a few minutes, at room temperature of about 25° C. Thus, if such condenser unit is subjected to a charging potential for five minutes, and if it is thereafter left connected to the charging source, its mechano-electric output or sensitivity will not be materially increased beyond that it acquires within the first five minutes of the charging process.

For condenser units having dielectric bodies composed of other titanates, the required charging time will vary. Thus, in case of a condenser having a dielectric layer composed of about 70 percent barium titanate and about 30 percent strontium titanate in solid solution, a charging period of several days may be required in order to induce therein desired permanent mechano-electric characteristics.

Summarizing, we have discovered that such condenser elements having a solid titanate dielectric layer formed of random oriented particles, when subjected to a deformation which causes it to change its capacity, will produce voltages corresponding to the deformation not only in the presence of an externally applied electrically polarizing field but also as a result of permanent displacement of electric charges in the internal structure of the dielectric imparted thereto by subjecting it to an electric polarizing process, and which gives it what appears to be permanent dielectrostrictive properties which it did not exhibit prior to the polarizing process.

According to the invention, permanent electric polarization or dielectrostrictive characteristics are imparted to the dielectric titanate structure of such condenser unit, by connecting it to a source of D. C. potential so that a voltage gradient of about 60 volts per 1/1000 inch thickness is applied thereto for a shorter or longer period of time from about five minutes or less up to one or more days, depending on the characteristics of the specific titanate body. When such a plurality of condenser sections or elements are combined into bilaminates, such permanently induced polarization may be conveniently applied to them, and in the proper sense, so their effectiveness aids when functioning as a mechano-electric transducer.

Figure 3:
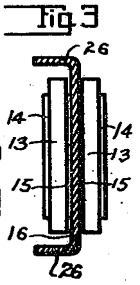
Fig. 3 is a cross-sectional view along line 3—3 of Fig. 2.

A dielectrostrictive transducer structure of the invention, such as shown in Figs. 1 to 3, may be used either for transforming mechanical strains or motions into electric signals, or vice versa.

Figs. 1 and 2 indicate in a diagrammatic manner one way in which such transducer structure of the invention may be utilized as a mechano-electric transducer unit, or vice versa. As shown the left end of the backing strip 16 is provided with two angularly bent flange portions 25, and the right end of the backing strip is likewise provided with two angularly bent flange portions 26, both sets of flange portions 25, 26 overlapping the adjacent end portions of the condenser elements 11, 12 which are united to the backing strip 16. Because of this arrangement bending forces imparted to the flanged end portions of the backing strip will cause the entire length of the two condenser elements 11, 12 to bend as a unit, so that the bending forces applied to the ends of the backing strips are properly transmitted to the entire length of the condenser structure united to the backing strips.

Thus the left end of the backing strip which is stiffened by its angularly bent flanges 25 may be mounted or clamped to a support 27 and the right end portion of the backing strip may be flexed by vibratory forces M. Thus the structure of Figs. 1 to 3 may be considered to represent a part of a phonograph pickup, the rear end of which is clamped to a mounting support and the front end of which is arranged to be vibrated by a phonograph needle.

Instead of providing the rear end of such transducer structure with a stiffened mounting end, the proper distribution of the mechanical forces over the condenser transducer elements 11, 12 thereof may be obtained by embedding a larger or shorter length of the two outer sides of the condenser elements 11, 12 between layers, pads or a body 28 of flexible, elastically yieldable cushioning material so that when the forward end of the condenser structure is flexed the cushioning bodies 28 within which the transducer is embedded will react against the flexed condenser elements and provide the desired distribution of the strains along their entire length. The elastically yieldable body 28 may be made of a material such as vinylchloride which is plasticised so as to be soft and exhibit rubbery elastic characteristics and is effective in internally dissipating vibratory energy imparted thereto.

When a dielectrostrictive transducer structure of the type described above in connection with Figs. 1 to 3 is connected with its exterior surface electrodes to a source of electric oscillations, the two ends of the transducer structure will vibrate in a direction perpendicular to the plane of the transducer structure. If the left end of such transducer structure is restrained against vibrations either by clamping it to a support 27 or embedding it within a soft compliant body 28, its right end will vibrate in the direction indicated by the arrows M in Fig. 1 when the exterior electrodes of its two condenser elements 11 and 12 are connected to a source of electric oscillations.

In the arrangement shown the backing sheet element 16 is made of conductive material and provides an electrical circuit connection between the inwardly facing surface electrodes 15 of the two condenser elements 11, 12. In some applications it may be desirable to make the backing sheet element 16 of electrically non-conductive material, in which case the circuit connection between the two condenser elements may be provided by a suitable electrically conductive jumper element of metallic foil, for instance, extending between the two facing electrode surfaces.

In accordance with the invention, the individual electrodes of a single integral dielectric body of a capacitor or transducer such as shown in Figs. 1 through 3, may be subdivided so as to provide several, or at least two capacitor or transducer sections on the same integral or common dielectric body, different sections of which are differenetially polarized so that such integral body will operate as a mechano-electric transducer having a predetermined vibratory mode wherein the individual transducer sections of the single dielectric body operate in aiding relation.

Figs. 1–A, 2–A, 3–A show another form of dielectrostrictive condenser transducer unit exemplifying the invention. It comprises two condenser units 11–*a*, 12–*a* of a shape similar to the corresponding elements of Figs. 1 to 3. Each condenser element 11–*a*, 12–*a* comprises a similar solid strip 13 of solid dielectric titanate material provided along one extended surface with a surface electrode 19 facing a backing sheet 16 and having on its opposite side two extended surface electrodes 23, 24 each cooperating with substantially one-half of the inner surface electrode 19. This electrode arrangement is indicated for the condenser unit 11–*a* in the plan view of Fig. 2–A where the outer surface electrodes 23, 24 are shown extending over one-half of the inner surface electrode 19 which is indicated, for the sake of clarity, in dotted lines as extending somewhat beyond the boundaries of the two outer electrodes 23, 24 in a simplified manner.

With such arrangement each of the two condenser units 11–*a*, 12–*a* actually constitutes two condenser sections interconnected by the common electrode 19. This cooperative arrangement of the two condenser sections associated with a single dielectric layer 13 is shown diagrammatically in Fig. 4–A for the condenser unit 11–*a*, where the two condenser sections 23—19 and 24—19 are indicated by portions of the common electrode 19 each cooperating with a facing portion of the sectional electrodes 23, 24 extending over the opposite side of the dielectric layer 13, the electrode portions of the common electrode 19 being shown electrically connected to each other. In other words, with such condenser transducer arrangement of the invention, one part of a large common surface electrode 19 of each condenser element 11–*a*, 12–*a* cooperates with opposite surface electrodes 23, 24 so as to form two distinct condenser sections associated with a single solid dielectric titanate body.

The operation of the integral dielectric body of a single condenser unit such as unit 11–*a* of Figs. 1–A, 2–A, and 3–A, with its two transducer sections extending between the common electrode 19 and the cooperating circuit electrodes 23, 24, as indicated in Fig. 4, is identical with the operation of the corresponding dielectric body of such signal transducer described in connection with Figs. 4 through 6–A of our copending application Serial No. 727,152, filed February 7, 1947, of which this application is a continuation-in-part. Such integral dielectric body having at least two differentially polarized dielectric body sections will operate by itself as a signal transducer in transducing mechanical energy into electrical energy and vice versa.

We have found that when the solid dielectric layer 13 of such or generally similar multi section condenser unit is composed essentially of polygranular random oriented titanate particles, it may be electrically polarized so that adjacent sections of the continuous dielectric layer 13 are of oppositely sensed permanent electric polarization in such manner that when the dielectric body of the condenser unit is subjected to similarly sensed strains it will generate at its electrodes oppositely sensed voltages.

Similarly the different sections of the common dielectric layer of such multi section condenser unit may be permanently electrically polarized in an opposite sense so that when two different sections of the single common dielectric layer are subjected to opposite mechanical strains they will generate voltages which will aid in the desired circuit interconnection between such condenser sections.

Thus, if such condenser unit, for instance unit 11–*a*, is subjected to a tension strain in the direction of its longitudinal axis, its dielectric constant and the capacity of both condenser elements will decrease. Conversely, if such condenser unit is subjected to longitudinal compression forces, the dielectric constant, and hence the capacity of the two condenser elements will be increased. We have found that adjacent condenser sections of such condenser unit may be permanently electrically polarized in opposite sense so that when both condenser sections of such unit are simultaneously subjected to the same character of strain the changes of the dielectric constant or the capacity of the two serially connected condenser elements of each condenser unit 11–*a*, 12–*a* will produce oppositely sensed voltages which aid serially in the series circuit connection of such condenser unit. In other words, we have found that a different character of permanent electric polarization may be imparted to different portions of the same polygranular titanate dielectric body of such condenser structure so as to produce a variety of desired effects by changes in the dielectric constant imparted to such condenser through external strains applied thereto.

Thus in order to cause one of the condenser units 11–*a* of Figs. 1–A, 3–A to generate aiding voltages in its two serially connected condenser sections, the desired internal polarization may be imparted to its titanate particles by connecting the two serially acting condenser elements 23—19, 24—19 in series with D. C. source, in the manner indicated in Fig. 4–A by D. C. batteries 21–*a* and 21–*b*. In Fig. 4–A the polarizing circuit is shown established by a set of three switches 22–*a*, 22–*b*, 22–*c*, the polarizing circuits being completed by the conventionally shown grounds and by a return resistor 29. In this polarizing circuit arrangement the current limiting resistor 29 serves also to prevent the application of a dangerous electric shock to the personnel.

Alternatively, as shown in Fig. 4–AB a single battery 21–*d* may be utilized for charging the two condenser sections 19—23, 19—24 of a single condenser unit, such as condenser unit 11–*a*, by connecting the battery 21–*d* in series circuit relationship with the two condenser sections 19—23, 19—24. A resistance 29 is shown connected parallel to each condenser section so as to properly divide the polarizing potentials applied by the single battery 21–*d* to the two condenser sections of the single condenser unit.

In Fig. 1–A and in the diagram of Fig. 4–AB the arrow F indicates the direction of the extension force applied to the two condenser sections 19—23, 19—24 of the condenser unit 11–*a*. The polarization imparted to the dielectric layer portions of the two condenser sections 19—23, 19—24 is indicated in Fig. 4–AB by (+) and (−) signs applied to the leads from the individual condenser elements. The legend "$\pm e$" and "$\mp e$" applied in Fig. 4–AB to the two condenser sections of the single condenser unit 11–*a* indicates the change in the potential produced by the effect of the tension forces F on the dielectric constant and the capacity of the two condenser sections 19—23, 19—24 when their respective portions of the dielectric layer 13 have been permanently polarized by a D. C. potential in the manner indicated by the polarity of the charging source 21–*a*, 21–*b* and by the (+) and (−) signs applied to the individual condenser electrodes.

It will be seen that although the two condenser sections 19—23, 19—24 are formed along adjacent portions of the same continuous dielectric body 13, the D. C. voltage charge, and hence the permanent electric polarization imparted to the dielectric particles of the two condenser sections is opposite, so as to cause them to generate serially aiding voltages when the dielectric structure of both condenser sections is subjected to a mechanical strain of the same direction.

Obviously, if a transducer structure formed of an integral dielectric titanate body having two differentially polarized body sections such as described above in connection with Figs. 1–A through 3–A, is to operate with a vibratory mode other than the longitudinal vibratory mode of the example just described above, the two different transducer body sections of the common dielectric titanate body 13 will be differentially polarized in an analogous way to assure their conjoint aiding operation when performing piezoelectric transducer operations. By way of example, if a transducer structure consisting of two differentially polarized dielectric body sections such as explained above in connection with Figs. 4–A to 4–AC, is to operate with a vibratory bending mode similar to that described in connection with the transducer of Figs. 1 to 3, the two transducer body sections of the common transducer body 13 will be given a shape analogous to that of the transducer of Figs. 1 through 3, with the two dielectric body sections extending between their intermediate electrode 19 and their circuit electrodes 23, 24, differentially polarized as in the transducer of Figs. 1 to 3, causing them to operate in the same way as the transducer of Figs. 1 to 3, with their polarization in opposite directions through the spaces occupied by the two transducer body sections.

By joining two multi sectional condenser units 11–*a*, 12–*a* to a common non-conducting backing sheet member 16–*a* in the manner indicated in Figs. 1–A to 3–A, the four condenser sections of such transducer structure may be interconnected so as to generate serially aiding voltages provided the individual condenser sections of each condenser unit have been previously polarized in the proper sense, in the manner indicated in Fig. 4–AC by the (+) and (−) signs applied to the condenser sections 19—23, 19—24 of each unit.

A condenser unit of the general type described above in connection with Figs. 1–A to 3–A combining a plurality of serially interconnected condenser sections having a single common dielectric layer of random oriented titanate particles the different sections of which are polarized in selectively different senses may be operated with the condenser sections connected in series or other circuit arrangement for transducing electric voltages applied to the serially connected condenser sections of a single condenser unit into corresponding mechanical motions or strains.

In Figs. 1–B, 2–B is shown another form of a polarized titanate condenser transducer structure of the invention. It comprises two flat condenser units 11–*b*, 12-*b* united to the opposite sides of a common backing sheet member 16–*b*. Each of the two condenser units 11–*b*, 12–*b* comprises a generally rectangular thin layer or strip 13 of solid dielectric material composed essentially of random oriented titanate particles. The two flat surfaces of the dielectric layer 13 of each condenser unit are provided with a set of outer electrodes 31, 32 and a set of coextensive inner electrodes 33, 34, respectively, each pair of cooperating electrodes 31—33, 32—34 extending over one-half, or generally the same fraction, of the area of the dielectric layer 13 of the condenser unit.

The adjacent sections of the common titanate dielectric body 13 of each condenser unit 11–*b*, 12–*b* is polarized in the proper sense so that when the several condenser sections of the common transducer structure are operated, as by bending or the like, the voltages induced in the suitably interconnected individual condenser sections will aid, and that when electric potentials are applied to the so interconnected condenser sections the mechanical forces produced thereby will likewise aid and cooperate.

The circuit diagram of Fig. 4–B shows one type of circuit interconnections as well as the electric polarization imparted to the dielectric structure of the several condenser sections of a transducer structure of the type shown in Fig. 1–B. Thus when the transducer unit of Figs. 1–B, 2–B has its free ends restrained against lateral motion—as by backing bodies indicated by dash-line 28 in Fig. 1–B—and its central portion is subjected to torsional forces M shown in Fig. 1–B—around a central axis indicated by the dash-dot-line 30 in Fig. 2–B—the individual condenser sections of the two condenser units 11–*b*, 12–*b* will be subjected to longitudinal strains indicated by arrows F in Fig. 1–B.

Fig. 1–B shows by (+) and (−) signs the permanent electric polarization that has to be applied to the individual condenser sections 31—33, 32—34 of the two condenser units 11–*b*, 12–*b* in order to produce in the individual condenser sections aiding voltages when they are interconnected in the manner shown in Fig. 4–B, which also indicates by arrows F the strains imparted to the individual condenser sections. It will be noted that with the circuit arrangement shown in Fig. 4–B the two condenser sections 31—33, 32—34 of each condenser unit are connected in parallel and the two parallel connected sections are in turn connected in series to the external circuit. With such arrangement the backing member 16–*b* of the transducer structure may be made of metal, and each of the two inner electrodes 33, 34 of each condenser unit 11–*b*, 12–*b* may be united by soldering to the common metallic backing member 16–*b*.

If it is desired to assure that the condenser sections of the several condenser units 11–*b*, 12–*b* act electrically in series, the individual condenser sections should be electrically polarized in the manner indicated by (+) and (−) signs in Fig. 4–BC.

Fig. 4–BC also shows the series circuit connection between the elements, and the voltages generated in the individual condenser sections when they are subjected to the forces F applied to them under such operating conditions. It will be noted that with the arrangement and polarization shown in Fig. 4–BC the voltages generated in the individual units, indicated by $\pm e$ and $\mp e$, will aid serially in all four condenser sections of the two condenser units 11–*b*, 12–*b*.

A feature of the invention is the fact that condenser sections may be placed in parallel connection even though they are individually polarized in opposite senses, as shown in Fig. 4B for example. Although it might be expected that no such polarization can be maintained because it appears to require one connected pair of electrodes to be simultaneously at a higher and lower potential than the other, the described arrangement is operative to produce the transducing expected from the summation of the transducing actions of the individual transducers. The polarization produced in accordance with the invention therefore appears to be independent of the circuit connections in which the condenser elements are used and to merely reside in the dielectric. The assembly of Fig. 4B may be produced by first polarizing the individual condenser elements and subsequently connecting them in the circuit shown.

Figs. 1–C and 2–C show a further form of a dielectrostrictive polarized titanate condenser transducer of the invention. It comprises two generally flat condenser units 11–*c*, 12–*c* united to the opposite sides of a common backing sheet member 16–*c*. Each of the two condenser units 11–*c*, 12–*c* is shown provided with a set of four outer surface electrodes 35, 36, 37, 38 and a set of three inner surface electrodes 41, 42, 43 covering sections of the outer and inner surface, respectively, of the solid dielectric layer 13–*c*.

The opposite electrode sets 35, 36, 37, 38 and 41, 42, 43 of each condenser unit 11–*c*, 12–*c* overlap each other and the two outer end electrodes 35 and 38 of each condenser unit are only half the area of the other electrodes, and they are so arranged that they form with the common polarized dielectric layer 13–*c* of each condenser unit six condenser sections 35—41, 36—41, 36—42, 37—42, 37—43, 38—43 which are serially connected in the manner indicated in the circuit diagram of Fig. 4–C, in which the individual condenser sections are designated by the reference numerals applied to their electrodes.

If it is desired to operate several condenser sections of the two condenser units so that they generate serially aiding voltages when the transducer structure is subjected, for instance, to bending strain and the individual condenser units are subjected to mechanical strain indicated by the arrows F applied to Fig. 1–C, the backing sheet member 16–*c* has to be made of electrically insulated material in order not to short circuit the individual electrode sections of each condenser unit.

The permanent electric polarization imparted to the different sections of the random oriented titanate particles of the dielectric bodies layer 13 of each condenser units is indicated in Fig. 4–C by the (+) and (−) signs applied to the individual serially connected condenser sections.

It will be noted that the multi-section arrangement shown assures that the several condenser sections of each of the condenser units 11–*c*, 12–*c* are interconnected in series through their inner electrodes 41, 42, 43 so that the external circuit connections to each of the condenser units may be completed by terminal leads connected to the exterior electrodes of the respective condenser units, such as outer electrode 35 or outer electrode 38 of such condenser unit.

In the transducer condenser combination described above in connection with Figs. 1 to 4–A compression and tension strains are imparted to the dielectric structure of the condenser elements incident to energy transducing operations. The various arrangements shown make it possible to impart to the transducer condenser elements compression and tension forces in the direction of their major dimensions by relative flexure of a transducer unit.

It should be also noted that energy transducer structures such as described in connection with Figs. 1 and 2 will perform in the manner described also if their facing sets of surface electrodes are directly united to each other into a bilaminate without an intermediate backing sheet member. However, the combination of such bilaminate with an intermediate backing member of ductile material is of very great advantage because it makes it possible to utilize the fragile condenser structure in a much more effective way and without loss of energy that would have to be dissipated by resort to other arrangements.

Figs. 1–D, 2–D and 2–DE show a still further form of dielectrostrictive transducer condenser structure of the invention. It comprises two flat condenser units 11–*d*, 12–*d* flatwise united to each other into a bilaminate transducer structure. Each of the two condenser units 11–*d*, 12–*d* comprises a generally rectangular layer or strip 13 of solid dielectric material composed, as in the previously described structures, essentially of random oriented titanate particles.

Each of the two condenser units 11–*d*, 12–*d* has two outer surface electrodes 44, 45 united to the outer side of its dielectric layer 13 and three cooperating inner surface electrodes 46, 47, 48 united to the opposite inner side of its dielectric layer.

As seen in Figs. 1–D, 2–D, 2–DE the opposite co-extensive electrodes 44 and 46 of each condenser unit 11–*d*, 12–*d* constitute one condenser section, and the additional outer surface electrode 45 of each condenser unit has twice as great an area and cooperates with two opposing inner surface electrodes 47 and 48 of half its area so as to form therewith two additional condenser sections of the same condenser unit. The two superposed condenser units 11–*d*, 12–*d* are united to each other by a layer of ductile solder material 49 thereby joining the inwardly facing surface electrodes 46—48, 47—47, 48—46 of the two condenser units into a laminated transducer structure so that the three condenser sections of condenser unit 11–*d* and the three condenser sections of the adjacent condenser unit 12–*d* are electrically connected in series in the manner indicated in the diagram of Fig. 4–D.

Fig. 4–D also indicates the polarity of the permanent electric polarization which has to be imparted to the individual condenser sections of the two condenser units 11–*d*, 12–*d* in order to assure that they generate aiding voltages when the combined bilaminate transducer condenser structure shown in Figs. 1–D, 2–D is subjected to bending forces which subject the dielectric structure of the individual condenser units to extension forces indicated by arrows F in Figs. 1–D and 4–D. Fig. 4–D also indicates by $\pm e$ and $\mp e$ the relative polarity of the aiding voltages generated in the so polarized individual condenser sections when their dielectric body is subjected to extension forces F.

There have been described above in connection with Figs. 1–A, 2–A, 1–B, 2–B, 1–C, 2–C, 1–D, 2–D various forms of multi sectional condenser transducer units of the invention in which random oriented titanate particles of a single solid condenser dielectric layer have adjacent dielectric layer sections which are permanently electrically polarized in opposite senses in order to secure an aiding cooperative relationship between a plurality of condenser transducer sections of a single condenser unit. It is understood, of course, that in an analogous manner generally similar condenser units may be designed to have much larger numbers of oppositely polarized dielectric layer sections which are interconnected and polarized in the proper sense in order to produce the desired selective cooperative action.

It will be seen that by combining two multi-sectional condenser units in a manner generally similar to that described above in connection with Figs. 1–D to 4–D it is possible to join a pile of superposed multi sectional condenser units into a condenser transducer body of any desired large dimensions with the different condenser sections of the different condenser units of the pile connected in series in a direction transverse to the pile of the individual condenser sections of the individual condenser units permanently electrically polarized in such manner that the voltages generated by the individual condenser sections aid serially in the desired circuit arrangement, notwithstanding that adjacent dielectric layer sections of the individual condenser units are subjected to mechanical strains which would produce mutual subtractive voltages had they been permanently polarized in the same sense.

With a pile of multi sectional condenser units made in the manner generally similar to that described above in connection with Figs. 1–D to 4–D, the external circuit connections have to be provided only to external electrodes such as the external electrodes 44 and 44 of the two condenser units 11–*d*, 12–*d* shown, since all other sectional electrodes of the superposed pile of condenser units are electrically interconnected by soldering or metallic joints between facing electrode sections of the condenser unit pile.

In order to make it possible to solder adjacent surface electrode sections of one condenser unit to facing electrode sections of the adjacent condenser unit of such pile without causing electric short circuit between adjacent surface electrode sections, the individual condenser units are shown provided with barrier elements 50 of insulating material such as plastic, synthetic resin or ceramic material. These insulating barriers 50 are applied to the surface portions of the dielectric layer 13 of each condenser unit which is exposed between the boundaries of the adjacent surface electrodes, such as surface electrodes 46, 47 and 48. The insulating barriers 50 may be made of plastic, synthetic resin or ceramic material which softens when heated to a temperature required to fuse the solder layers 49 which serve to solder facing electrode sections of superposed condenser units. There are available various thermo-plastic synthetic resin and plastic materials which may be used to provide such insulating barriers, which will keep the solder layers 49 from overflowing across a barrier while the facing surface electrode sections of a superposed pile of such condenser unit is held under pressure and heated to effect the soldering joint between the superposed electrode sections.

In the above-described modifications of the invention the transducer condenser elements have been described as placed under compression or tension to generate the desired signals. It has also been stated that a balanced action may be obtained by arranging that alternate compression and tension of a condenser element produces an alternating signal.

It is well known that ceramic bodies such as the condenser dielectrics of the invention exhibit only small tensile strengths although they are quite resistant to compressive forces. It is accordingly another feature of the instant invention to provide a dielectrostrictive condenser transducer in which a ceramic condenser dielectric is pre-stressed in compression so that during transducing operations the compressive stress on the dielectric is increased or diminished but the dielectric is never subjected to any appreciable tension. According to this phase of the invention, the range of stress variations to which a dielectric is subjected may be considerably broadened without exceeding its tensile tolerance. Breakage of dielectrics is also considerably reduced.

Another advantage of the pre-stressed dielectric construction is the resulting greater uniformity of operation. The signal or voltage change induced in a condenser element may in some cases be unsymmetrical, that is the voltage change may be of different amplitude for a compressive strain than for an equal tensile strain, or vice versa. As a result signal production by strains alternating between compressive and tensile may sometimes be distorted. Similarly the production of mechanical vibrations by the application of alternating voltages to a condenser transducer element may also be affected by the non-symmetry.

One simple arrangement for pre-stressing the condenser transducer dielectrics in compression is to secure an electrode to one of its faces by a thermal operation, selecting the electrode material to have a thermal coefficient of expansion different from that of the condenser dielectric. Thus for example phosphor bronze or steel have thermal coefficients of expansion appreciably larger than that of the dielectric and may be directly united to a surface of the dielectric that is covered with a thin sprayed or baked film of metal such as silver or copper. One practical method of uniting is to apply a thin layer of solder to a phosphor bronze or steel sheet, then place the composite with the soldered surface against the metal filmed surface of the dielectric and heating the assembly till the solder flows and unites the metal sheet to the metal film. The assembly is then permitted to cool whereupon the uniting solder layer solidifies and further cooling causes the greater thermal shrinkage of the metal sheet to bring the dielectric body into the desired compression. The pre-stressing element is placed under considerable tension at the same time as the dielectric is placed in compression and it is important that the former be of the required tensile strength.

The pre-stressing need only be applied to one surface layer of the thin condenser dielectric. For greater simplicity the pre-stressing element may also be the backing sheet member 16, 16A, 16B, 16C, or 16D as described in connection with Figs. 1 to 4D so that the assembly operation remains quite simple. The pre-stressing may be modified to suit conditions and may only be partial so that some tension is permitted to develop in the dielectric during use. Other techniques for applying the compressive bias may also be used.

It is accordingly understood that in the specification or claims where the transducer dielectric is described as placed under tension or compression, these terms are only relative and that when referring to pre-stressed dielectrics the tension may merely be a relatively lower degree of compression.

Although the dielectrostrictive transducer action of capacitors or condensers having a solid ceramic dielectric layer of electrically permanently polarized random oriented titanate particles is in its nature fundamentally different from the piezoelectric transducer action of piezoelectric crystal transducers having especially oriented slabs of a piezoelectric crystal of quartz, Rochelle salt or the like, the dielectrostrictive transducers of the present invention are suitable for use with great advantage in substantially all applications and arrangements in which piezoelectric transducers are or have been used and will produce therein similar results. However, because of their special character, the dielectrostrictive transducers of the invention may be used in a variety of applications and arrangements to which piezoelectric transducers could not have been applied.

In a similar way dielectrostrictive transducers of the invention are suitable for use with great advantage in lieu of magnetostrictive transducers in substantially all applications in which the latter are or have been used.

In order to enable those skilled in the art to readily practice the invention and without thereby limiting its scope there are given below, by way of example, the data regarding physical characteristics of one polarized titanate condenser element of the invention made from commercially available titanate ceramics. The specific condenser element referred to above has a solid dielectric titanate layer .010 inch thick and an area 1 x .25 inch. Its solid dielectric structure consisted essentially of barium titanate.

In Fig. 5 curve C–1 shows the capacity of such condenser element as a function of the temperature indicated on the abscissae axis. It will be noted that the condenser element in question exhibits a maximum capacity at about 120° C. Dash-line curve branches E–1, E–2 represent the piezoelectric output voltage as a function of the temperature, when a constant displacement is imparted to the element. It will be seen, that when the temperature is first increased from the low value to the highest value and then decreased from the highest value to the lowest value, as indicated by the arrows on curve branches E–1, E–2, the piezoelectric voltage output of the condenser element drops when the temperature of the titanate condenser is brought to a value at which it has the highest maximum capacity, and that its piezoelectric output voltage remains low when the temperature of the condenser element is thereafter decreased along curve E–2.

In Fig. 5 the dash-double-dot line E–3 gives the piezoelectric output voltage of the condenser element, when after its temperature has been raised up to about 70° C. its temperature is lowered to its normal value from 70° C. to which it was first raised. Curve E–3 shows that if the temperature of the condenser element is not raised to too high a value, raising and lowering of the temperature does not materially affect its piezoelectric output voltage. For practical purposes the voltage characteristic E–3 substantially coincides over the range up to about 50° C. with the curve E–1. It is also of interest to know that in performing the tests represented by curves E–1, E–3, the condenser element was retained at a temperature of 70° for an extended period of about 36 hours without any apparent loss of its piezoelectric voltage output.

Dot-line curve P–1 shows the output voltage of the condenser under constant mechanical displacement corresponding to the curves E–1, E–2, E–3, when its electrodes are connected to an external voltage source which was used to polarize the condenser and give it the piezoelectric characteristics represented by curves E–1, E–2, E–3. It will be noted that when the temperature of the condenser element is reduced even below minus 60° C., its piezoelectric output is not materially reduced.

We have found that generally similar characteristics are exhibited by condensers having dielectric bodies composed of titanates other than barium titanate alone. By way of example, there are given below data for a titanate condenser unit having a dielectric body containing about 70 percent barium titanate and about 30 percent strontium titanate in solid solution. This condenser element had a highest maximum capacity at about 40° C. The other characteristics of this condenser unit are qualitatively similar to those represented by the curves C–1, E–1, E–2, E–3, and P–1, except that the curves are shifted more to the left and that the ratio of ordinates of curve E–1 to ordinates of curve P–1 was only about 30 percent as against 70 percent for the curves of Fig. 5.

In Fig. 6 curve P–*a* represents the piezoelectric voltage output displacement corresponding to the voltage gradient of the charging potential applied to a condenser element having the characteristics shown in the curves of Fig. 5 when the charging source remained connected to the condenser; curve E–*a* of Fig. 6 represents the corresponding piezoelectric voltage output when the charging source is disconnected from the condenser.

As shown by curves P–*a* and E–*a* the piezoelectric output voltage or sensitivity rises to an asymptotic value as the voltage gradient of the charging voltage is increased and remains at a substantially constant value as the voltage is further increased till the breakdown voltage which occurs for the specific condenser unit at a voltage gradient of about 100 volts per one thousandth of an inch.

When operating with a condenser element of the invention having a titanate body which was composed of about 70 percent barium titanate and about 30 percent strontium titanate in solid solution, there was obtained a piezoelectric output or sensitivity characteristic represented by curve S–6 in Fig. 6.

Condensers made with other titanate compositions will exhibit generally similar characteristics, such as represented by curve E–*x* in Fig. 6.

Depending on the composition of the titanate dielectric body of a piezoelectric condenser of the invention, a longer or shorter period of charging period is required in order to induce in it the desired piezoelectric characteristics. Thus, in a case of a condenser unit having a dielectric body consisting essentiallly of barium titanate, the desired piezoelectric characteristics may be induced therein by applying thereto the charging potential only for about a few minutes, at room temperature of about 25° C. Thus, if such condenser unit is subjected to a charging potential for five minutes, and if it is thereafter left connected to the charging source, its piezoelectric output or sensitivity will not be materially increased beyond that which it acquires within the first five minutes of the charging process.

For condenser units having dielectric bodies composed of other titanates, the required charging time will vary. Thus, in case of a condenser having a dielectric layer composed of about 70 percent barium titanate and about 30 percent strontium titanate in solid solution, a charging period of several days may be required in order to induce therein desired permanent piezoelectric characteristics.

Summarizing, we have found that such condenser elements having a solid titanate dielectric layer formed of random oriented particles, when subjected to a deformation which causes it to change its capacity, will produce voltages corresponding to the deformation not only in the presence of an externally applied electrically polarizing field but also as a result of permanent displacement of electric charges in the internal structure of the dielectric imparted thereto by subjecting it to an electric polarizing process, and which gives it what appears to be piezoelectric properties.

According to the invention, permanent electric polarization of piezoelectric characteristics may be imparted to the dielectric titanate structure of such condenser unit, by connecting it to a source of D. C. potential so that a voltage gradient of about 50 volts per 1/1000 inch thickness is applied thereto for a shorter or longer period of time from about five minutes or less up to one or more days, depending on the characteristics of the specific titanate body. When such a plurality of condenser sections or elements are combined into bilamellates, such permanently induced polarization may be conveniently applied to them, and in the proper sense, so their effectiveness aids when functioning as a mechano-electric transducer.

Figs. 7 to 10 show one form of a novel phonograph pickup combining a dielectrostrictive condenser transducer structure of the general type described in connection with Figs. 1 to 3 with other operating elements into a simple, high quality mechanoelectric displacement device.

It comprises a transducer cartridge 2—10 shown as a unit in Fig. 7 and generally designated 2—10, the principal elements of which are enclosed in a housing formed of two housing walls 2—41, 2—42. The transducer cartridge (Figs. 7–10) comprises two condenser units 2—11, 2—12 each having a thin solid dielectric layer of ceramic titanate material and two surface electrodes as the corresponding condenser units of Figs. 1 and 2. The two condenser units 2—11, 2—12 are joined to opposite sides of a thin metallic lever strip 2—16 which carries the two condenser units.

The lever 2—16 is arranged to pivot or flex in a direction generally perpendicular to its surface. The lever 2—16 carries at its front end a stylus or needle arm 2—21 arranged so that when the stylus arm is undulated by a lateral undulating groove of a phonograph record in a direction generally perpendicular to the surface of the supporting lever 2—16, this lever will undergo corresponding vibrations relatively to its rearward mounting position 2—17.

The front region of the relatively thin lever 2—16 is rendered substantially rigid by providing it with angularly bent tongue portions 2—18, 2—18 arranged so that when the forward portion of the lever 2—16 is driven in a direction perpendicular to its surface it will impart a vibratory motion to substantially the entire length of the condenser transducer structure formed by the two condenser units 2—11, 2—12 united backing strip 2—16.

Although it may be made an integral part or extension of one stiffening tongue portions 2—18 of the lever 2—16, the stylus arm 2—21 is shown made as a separate flat sheet metal member, the rear portion of which is affixed to the stiffened front end of the backing strip lever 2—16. In the form shown this is accomplished by bending the stiffening tongue portions 2—18 around the rear end portion of the stylus arm 2—21, for instance in the manner seen in Fig. 7. The tongue portions 2—18, 2—18 may be bent to form socket arms for receiving the flat rear end of the stylus arm 2—21 which may be soldered in place to provide a firm connection between the relatively right front end of the lever 2—16 and the rear end of the stylus arm 2—21.

A stylus or needle 2—23 is supported by a needle socket 2—22 within a hole formed in the front end of the stylus arm 2—21. The surface of the flat stylus arm 2—21 extends generally perpendicular to the direction of the surface of the lever strip 2—16 so that it will exhibit great compliance in a direction of the plane of the lever strip 2—16 while at the same time exhibiting the required relatively great stiffness in a direction of its surface for assuring that displacement forces imparted to the stylus by a laterally undulating record groove will be effectively transmitted to the bilaminate condenser transducer structure carried by the lever 2—16. The stylus 2—23 may be of any conventional type, for instance, sapphire, diamond or any suitable needle material of the type used in conventional phonograph pickups.

The forward end of each of the two condenser transducer units 2—11, 2—12 overlap the stiffening tongue portions 2—18, 2—19 of the pivot lever 2—16, thereby assuring that when displacement forces are applied to the stiff forward end of the lever 2—16 they will be effectively transmitted to the length of the lever 2—16 and the two condenser units 2—11, 2—12 united thereto.

The lever 2—16 with the two condenser units 2—11, 2—12 secured thereto constitutes a unitary mechano-electric transducer unit arranged so that when its front end is undulated by the stylus its two permanently polarized titanate condenser units will generate corresponding voltages in the manner explained in connection with Figs. 1 and 2 so that the generated voltages may be utilized for playing back an undulating record groove.

The mounting portion 2—17 of the transducing lever 2—16 is also provided with a rearward terminal extension 2—16 which may be utilized for polarizing the condenser elements 2—11, 2—12 either after the transducer cartridge has been completely assembled or after the transducer cartridge has been assembled in the housing.

The transducer cartridge 2—10 has two strip-like metallic contact members 2—25 of spring metal, shown in detail in Fig. 10-A and generally similar in shape to the rear part of the transducer lever 2—16. Each contact member 2—25 has a forward contact portion 2—26 overlapping the rearward portions of the exterior surface electrodes of the respective condenser units 2—11, 2—12 so as to make contact therewith. The similar circular mounting portions of the two contact strip members 2—25 and of the transducer lever 2—16 are insulatingly spaced from each other by insulating spacers 2—27 and they are held in the assembled operative position on an insulating bushing 2—31 by a hollow metal rivet 2—33. An additional insulating washer 2—28 provided insulation between a flange portion of the hollow metal rivet 2—33 and the adjacent portion of the metallic contact member 2—25.

The contact strips 2—25 are made of spring metal and their contact portions 2—26 are elastically deformed so as to be biased into good contact engagement with the external electrode surfaces of the two condenser elements 2—11, 2—12. Each of the metallic contact portions 2—25 is provided with a rearward terminal portion having lateral tongue extensions 2—29 (Fig. 7-A) bent to provide a socket for receiving a flat prong-like terminal end of a circuit lead by means of which the two condenser transducer elements 2—11, 2—12 are connected to their conventional operating circuits.

The bilaminate condenser transducer unit 2—10 with its contact elements assembled in the manner described above around a hollow metallic rivet 2—33 constitutes a self-supporting subassembly or cartridge unit combining all the elements of the energy transducer structure of the pickup as well as all contact elements through which the two condenser transducer units are connected to external circuits.

A retaining band 2—36 is placed around the assembly of the rearwardly extending terminal portions 2—29 of the two contact members 2—26 (Figs. 7 and 7-A) and the terminal portion 2—15 of the lever 2—16 and their insulating spacers 2—27 held therebetween. The retaining band 2—36 may be made of a material such as rubber and shaped so as to interlock with interlocking projections 2—37 of the insulating spacers 2—27 so that it is merely necessary to slip the retaining band over the rearward terminal strip assembly in order to locate and retain it in its position where it provides an insulating enclosure around the contact terminals leading to the electrodes of the transducer cartridge 2—10.

The two condenser elements 2—11, 2—12 may be electrically polarized and subjected to inspection and operating tests on the completed transducer cartridge 2—10 in order to make sure that when assembled in the housing the pickup will have the required operating characteristics.

The two housing wall members 2—41, 2—42 (Figs. 7 and 8) have their inwardly facing surfaces shaped so as to provide a proper mounting support for the mounting portion of the transducer structure and to provide a housing enclosure which assures proper distribution of the driving forces along the movable portions of the dielectrostrictive transducer condensers 2—11, 2—12.

The inner side of housing wall member 2—41 is provided with a rivet post 2—43 arranged to seat thereon the narrow hollow rivet section 2—33 of the transducer cartridge, the end of the rivet post 2—43 being peened over the step portion 2—35 of the hollow rivet member 2—33 for holding the mounting portion of the cartridge 2—16 firmly clamped against the wall 2—41. In order to prevent turning of the cartridge assembly 2—10 around the rivet post 2—43 which clamps it to the housing wall 2—41, the inwardly facing mounting surface portion of the housing wall 2—41 surrounding the post 2—43 is provided with radial teeth 2—44 arranged to interlock with the facing surface of the flange 2—32 of the insulating bushing 2—31.

After securing the transducer cartridge assembly to the inner side of the housing wall 2—41 the other housing wall 2—42 may be clamped in its assembled position by peening over the outer end portion of the wider hollow rivet section 2—34 of the assembly rivet 2—33 over the rivet hole provided in the rear wall portion of the outer housing wall 2—42. The forward end of the housing wall 2—41 is shown provided with an additional rivet post 2—47 (Fig. 7) which fits within a hole of the other housing wall 2—42 so that it may be peened thereover, for clamping the two housing walls.

As seen in Figs. 7 and 8, the inwardly facing surfaces of the two casing walls 2—41, 2—42 are shaped to provide a compartment 2—51 which holds body elements 2—52 of a plasticized elastomer substance which is relatively soft and exerts elastic compliant reaction forces resisting deflection or displacement of the transducer structure including the condenser elements 2—11, 2—12 embedded therebetween. The elastomer body 2—52 may be made of a material such as vinylchloride or the like which embodies sufficient plasticizer to serve as a plastic elastomer which is soft and exerts rubbery elastic characteristics and is also effective in internally dissipating vibratory energy imparted thereto. The elastomer body 2—52 is shown formed into two elastomer pads which may be cemented against the inwardly facing surface walls of the housing members 2—41, 2—42. The two elastomer pads 2—52 are so dimensioned that they are compressed in their assembled operative position shown in order to assure that they exert on the moving condenser elements of the transducer structure reaction forces which will cause proper distribution of the mechanical strains throughout the dielectric layers of the condenser transducers. In addition, the elastomer pads 2—52 are arranged to press the contact portions 2—26 of the contact member 2—25 against the outer electrode surfaces of the two condenser units 2—11, 2—12 for assuring good electric contact connections therebetween.

By properly choosing the dimensions and the elastomer characteristics of the two pads 2—52 which act as stiffening bodies resisting displacement of the transducer structure, it is possible to control the ultimate operating characteristics of the assembled transducer structure over any desirable wide frequency range. In the arrangement shown the composition and dimensions of the two elastomer stiffener pads, or, in general, of the elastomer stiffener body 2—52, is so chosen, designed and they are held in such position relatively to the condenser transducer elements 2—11, 2—12 as to provide the controlling stiffness resisting displacement or deformation of the condenser elements when they are subjected to displacement by external forces. In other words, the elastomer body determines and controls the distribution of the mechanical strains in the permanently polarized dielectric body elements of the condenser transducer structure.

Instead of providing two elastomer pads held clamped to the opposite sides of the generally flat transducer condenser structure, the entire or a part of hollow space 2—51 through which the transducer condenser elements extend may be filled with a body of a plastic elastomer while it is fluid and permitting it to congeal after casting it into the cavity space of the housing structure 2—51. The plasticized vinylchloride compositions which exhibit desired elastomer characteristics may be heated to a fluid state in which they may be cast to form after congealing at normal temperature the desired elastomer body in which the transducer structure is embedded.

The two stiffening elastomer pads 2—52 are mounted, retained and clamped in their operative position shown in Figs. 7 and 8 before securing the housing wall members 2—41, 2—42 to each other. The housing wall 2—41 facing one elastomer pad 2—52 has clamped thereto a generally U-shaped clamping member 2—54 overlying the other elastomer pad 2—52 so as to clamp the two elastomer pads 2—52 in their operative position against the exterior of the condenser elements 2—11, 2—12 in the manner indicated in Figs. 7 and 8. The U-shaped clamping member 2—54 has two side arms 2—55 (Figs. 7, 8 and 8–A) which may be inserted into two slits 2—56 of the housing wall 2—41, whereupon their slitted end portion is peened over in the manner indicated in Figs. 8 and 8–A.

As indicated in Figs. 7 and 8, the outer wall portions of the housing walls 2—41 are also provided with mounting lugs 2—49 by means of which the pickup may be affixed as by screw to a downwardly facing mounting surface of a conventional phonograph tone arm.

The downwardly facing forward portions of the two housing walls 2—41, 2—42 are so shaped as to provide a downward opening 2—46 (Figs. 7, 8) through which the front end of the stylus arm 2—21 and the stylus tip project from the housing into engagement with a record groove.

The stylus 2—23 which transmits a lateral undulatory motion to the lever arm 2—16 and its condenser elements 2—11, 2—12 is supported by the stylus arm 2—21 which is resilient and highly flexible against forces acting in a direction perpendicular to the grooved record which imparts to the stylus lateral undulatory forces so as to limit the stylus pressure to a desired low level. For vibrations in a direction in which it exhibits great resilience, the stylus arm 2—21 may operate with a certain resonant frequency, for instance, in the range of about 10,000 cycles per second, which will result in a corresponding resonant output peak. In order to suppress such resonant peak of the highly flexible stylus arm 2—21, the two inwardly facing housing walls 2—41, 2—42 are also provided with an additional seating space for holding seated therein a damping pad 2—48 of a plastic elastomer substance against which the inward side of the stylus arm 2—21 bears.

With the arrangement shown the assembled self-contained transducer cartridge 2—10 is first secured and clamped against the housing wall 2—41 by means of the clamping connection between the rivet post 2—43 and the hollow assembly rivet 2—33. Thereupon the two elastomer pads 2—52 are placed in their location against the two outer sides of the two condenser elements 2—11, 2—12 of the transducer structure and the clamp 2—54 is then placed over this elastomer assembly, whereupon the split arm ends of the clamp 2—54 are peened over, thereby completing this subassembly. In this condition the entire pickup has all its essential operative elements mounted in their operative position against one of the housing walls, namely, housing wall 2—41, and the entire pickup may be subjected to inspection and operating tests. The completion of final pickup assembly consists merely of securing the other housing wall 2—42 in the tested subassembly by means of the hollow rivet section 2—34 and the rivet post 2—43. The wide damping pad 2—48 for the stylus arm 2—21 may be placed in its position within the housing either before or after joining the two housing walls to each other.

Without in any way limiting the scope of the invention, there are given below design and operating data of one practical form of phonograph pickup of the type described above in connection with Figs. 7 and 8.

The pickup is designed to operate into an input circuit of an amplifier representing a lead impedance of one 100 mmfd. condenser shunted by ½ megohm resistor. Each condenser element 2—11, 2—12 is ⅝″ long, $\frac{3}{16}$″ wide and about $\frac{10}{1000}$″ thick. The dielectric body layer of each condenser is composed essentially of barium titanate having a maximum value of its dielectric constant or Curie point at about 120° C. The backing strip 26 is nickel silver sheet material about $\frac{5}{1000}$″ thick. The pickup is mounted in a tone arm so that it operated with a stylus pressure of ¾ oz. The lateral stylus compliance was .5 to .7 times $10^{-6}$ cm./dyne. The full line curve FR of curve diagram of Fig. 11 shows the frequency response of the output obtained with such pickup when playing back frequencies of a standard frequency record having a frequency displacement characteristic represented by the dash line curve SR. Fig. 11 also contains the data of the conditions under which the playback operation was carried on.

Phonograph pickups of the invention of the type described above may be readily designed for operation with a much smaller stylus pressure, for instance, of the order of only about one-quarter of an ounce, and with much greater lateral compliance than the specific phonograph pickup described above. It should also be noted that when a lateral groove phonograph pickup is designed for operation with an increased lateral stylus compliance, the sensitivity of the pickup is inherently likewise decreased because the lateral undulations of the phonograph needle transmit less strain to the transducer elements of the pickup. For instance, its vertical stylus pressure is reduced to one-quarter of an ounce and its lateral stylus compliance is correspondingly increased, a pickup of the type described above will operate with a sensitivity only 6 db. less than that given above, in which case, however, the fidelity of the response of the pickup is extremely faithful and follows substantially exactly the displacement characteristics up to the highest frequency with which records can be made at present.

Figs. 12 and 13 show another form of a phonograph of the invention which is generally similar to the pickup of Figs. 7 to 11. It comprises a transducer cartridge generally designated 2—60, the principal elements of which are enclosed in a housing formed by two substantially alike wall member 2—77.

The transducer cartridge 2—60 comprises at its essential transducer element an operating lever 2—61 provided at its rear with a mounting portion 2—62 and at its front end an angularly bent shoulder portion 2—63 carrying a stylus arm 2—64 provided at its front end with a stylus 2—65. To the two flat sides of the operating lever 2—61 are united, as by soldering, inwardly facing surface electrodes of two condenser units 2—11, 2—12 so that they form with the lever portion to which they are united a transducer structure of the type described in connection with the similar elements of Figs. 7 to 10.

The operating lever 2—61 has mounting portion 2—62 provided with a rearward terminal extension 2—66 which is utilized for polarizing the two titanate condenser transducer units 2—11, 2—12, after the cartridge or the whole pickup has been assembled. The cartridge 2—60 also comprises two metallic contact members 2—68, 2—69, which are biased into contact engagement with the external surface electrodes of the two condenser units 2—11, 2—12. Each of the two contact members 2—68, 2—69 are provided with a circular mounting portion similar to the mounting portion 2—62 of the operating lever and rearward terminal extensions 2—85, 2—86, respectively. The mounting portions of the two contact strips are held insulatingly spaced from the metallic mounting portion 2—62 of the operating lever by insulating spacers 2—72 and an insulating bushing 2—73 held in position by a hollow metallic rivet 2—71 extending through the circular opening of the several mounting portions and spacers so that they may be assembled in a simple manner into a self-contained cartridge structure which maintains the different conducting elements of the cartridge structure insulated from each other and from the metallic housing walls when they are mounted in position therein.

The cartridge assembly thus far described combines all elements of the transducer condenser structure of the pickup as well as all contact elements through which the two condenser transducers 2—11, 2—12 are connected to external circuits and the cartridge 2—60 may be subjected to all operating and quality tests before it is assembled in the housing.

The hollow assembly rivet 2—71 of the transducer cartridge 2—60 is arranged to fit over the rivet post 2—79 of the housing wall 2—77.

The rear portions of the two housing walls 2—77, 2—78 are provided with a recess 2—82 bordering an opening which is enclosed by a terminal block 2—83 clampingly seated within the recess 2—82.

The terminal block 2—83 has fixed therein two hollow terminal pins 2—84. The rearward terminal projection of the operating lever 2—61 and the two terminal projections 2—85, 2—86 of the two contact springs 2—69 are seated and held in position respectively within a hole of the terminal block 2—83 and in the hollow interior of the two terminal pins 2—84.

As in the pickup of Figs. 7 to 10 the contact terminal members 2—68, 2—69 are of conductive metal and they are arranged so that their contact portions are elastically biased into contact engagement with the facing surfaces of the outer surface electrodes of the two condenser units 2—11, 2—12.

As in the pickup of Figs. 7 to 10, the transducer portion of the pickup with its two polarized transducer condensers 2—11, 2—12 united to the common backing strip lever 2—61 are embedded within body portions of compliant plasticized elastomer 2—87 which is effective in properly uniformly distributing the mechanical strains over the length of the two condenser transducer units 2—11, 2—12 when the transducer structure is flexed and bent in a direction perpendicular to its plane when the stylus 2—65 is actuated by a laterally cut record groove of a conventional phonograph record, for instance. In addition, a similar elastomer body or block 2—78 is held by the housing against the upper side of the stylus arm 2—64 so as to dampen its resonant frequency peaks for vibrations in a direction perpendicular to its flat side in which it is highly flexible so as to exert only the required limited small vertical pressure on the record groove engaged thereby.

The front portion of the housing has provided an opening 2—89 through which the stylus 2—65 projects into engagement with the record groove. As in the pickup of Figs. 7 to 11, the wall portions of the housing bordering the stylus opening 2—89 are shown provided with stop projections bordering the two sides of the stylus so as to limit the range of vertical deflection to which the stylus arm 2—64 may be subjected and prevent any permanent deformation thereof.

Figs. 14 and 15 show how a pickup or in general an energy transducer unit of the type described in connection with Figs. 12 and 13 or 7 to 10 may be modified when it is desired that it shall operate with a substantially uniform frequency response from below 60 cycles per second up to as high as 14,000 cycles per second or even higher.

It comprises a transducer cartridge 2—90 generally similar to that described in connection with Figs. 12 and 13. It has a considerably longer operating lever 2—91 to the front part of which are shown joined the two dielectrostrictive condenser transducer units 2—11, 2—12 in the same manner as in the similar transducer structures of Figs. 12, 13 and Figs. 7 to 10. To a stiffened front end portion of the operating lever of 2—91 carried a stylus arm 2—64 provided with a stylus 2—65 as in the pickup of Figs. 12 and 13. The cartridge assembly 2—90 is otherwise similar to that of Figs. 12 and 13 and it is arranged to be assembled in the same simple manner between two housing walls 2—93, 2—94.

With this arrangement the front end of the transducer lever 2—91 carrying the two condenser transducer units 2—11, 2—12 and the stylus arm 2—64 is connected to its rearward mounting portion 2—92 through a substantial length of the relatively thin operating lever which is highly compliant and flexible when bent or flexed in a direction perpendicular to its plane. As indicated in Fig. 15, substantially the entire length of the transducer lever 2—91 extending between the mounting portion 2—92 and the forward stylus portion is placed between or embedded within plasticized elastomer stiffening body portions 2—95 which exert against the entire flexible length of the bilaminate condenser transducer elements and the intermediate length of the lever 2—91 extending therefrom toward its mounting portion 2—92 compliant or elastic restraint against deflection and also serves to properly distribute over the length of the condenser elements 2—11, 2—12 the strains imparted to the lever structure by undulations of the stylus arm when its needle is driven by a record groove. In other words, the elastomer body portion 2—95 are designed to provide the desired degree of stiffness to the operating tongue of the condenser transducer structure.

A pickup provided with an energy transducer structure of the type described in connection with Figs. 14 and 15 will operate effectively as a phonograph pickup displacement transducer with a substantially uniform frequency response from below 60 cycles per second up to as high as 14,000 cycles per second or higher, and with an open circuit output voltage of about 1 volt at 1,000 cycles when reproducing signals from a standard tone record of the type described above in connection with Fig. 11.

In the transducer structure of Figs. 14 and 15 the condenser transducer elements 2—11, 2—12 with their highly flexible supporting lever or arm 2—91 operate effectively as a long transmission line with a controlled attenuation along its length. As a result this transducer structure will operate with a substantially flat frequency response from very low frequencies up to very high frequencies.

With such arrangement the thickness and the compliant characteristics of the cushioning bodies 2—95 may be readily so chosen and dimensioned as to cause the transducer structure to operate with any desired frequency response and sensitivity.

Although the phonograph pickup described above in connection with Figs. 7 to 15 is shown designed for playing back laterally grooved phonograph records, they may be readily modified so as to serve for playing back hill-and-dale records. When used for playing back hill-and-dale records, the forward end of the flat bilamellate transducer structure is held embedded within elastically compliant stiffening bodies so that the flat condenser elements extend in a generally horizontal plane and the stiffened front end of the transducer lever has connected thereto a stylus arm which has the required stiffness in vertical direction for causing it to transmit to the bilamellate transducer structure the vertical displacement undulations imparted to the stylus by the hill-and-dale record grooves.

Figs. 16 to 17 show another form of a phonograph pickup of the invention utilizing a dielectrostrictive bilaminate transducer structure of the type described in connection with Figs. 1–B, 2–B and 4–B.

It comprises two flat condenser units 3—11, 3—12 united to the opposite sides of a common backing sheet member 3—16. Each of the condenser units 3—11, 3—12 comprises a thin dielectric layer 3—13 of solid dielectric material composed essentially of permanently electrically polarized random oriented titanate particles. Each of the condenser units is provided with a set of outer surface electrodes 3—31, 3—32 cooperating with a set of co-extensive inner electrodes 3—33, 3—34 respectively.

The portion of the backing strip 3—16 which is located near the center of the length of the two condenser units 3—11, 3—12 is provided with tongue extensions 3—35 bent laterally from the plane of the backing strip 3—16. Each of the tongues 3—35, 3—36 is shown with the tip of the tongue engaging its initial portion so that each of the tongues 3—35, 3—36 render the central portion of the backing strip substantially stiff or rigid. This arrangement makes it possible to use the central stiff portion of the backing strip 3—16 as a pivot structure by means of which the backing strip 3—16 and the two condenser transducer element units united thereto may be pivoted around the axis indicated by the dash-dot line 3—30.

For the sake of simplicity, each of the folded tongues 3—35, 3—36 of the backing strip are indicated in an exaggerated manner as spread apart, but may be readily shaped to provide for the elongated flat transducer condenser structure stiffening pivot elements of small thickness extending in a direction generally perpendicular to the direction of the plane of the backing strip 3—16. The lower pivot tongue 3—36 is provided with an additional strip-like tail portion 3—37 extending transversely to the plane of the backing strip 3—16. To the tail portion 3—37 is secured a stylus arm 3—38 carrying at its front end a stylus 3—39 and arranged so as to transmit to its pivot tongue 3—36 vibratory forces when the stylus 3—39 is driven by a laterally undulating groove of a record member while exerting only very little vertical pressure in downward direction against the record groove.

The mid- or pivot-part 3—38 of each of the tongue pivots 3—35, 3—36 are supported within the pickup housing so that vibratory displacement imparted to the central portion of the bilamellate transducer structure will cause the two pairs of condenser transducer sections to be pivoted around the axis 3—30 and cause the two pairs of condenser sections to be flexed in opposite directions against compliant stiffening bodies 3—19 within which the condenser structure is embedded.

The condenser section of each unit associated with the electrodes 3—31, 3—33 may be permanently polarized in a sense opposite to that of the condenser section associated with the electrodes 3—32, 3—34. With the arrangement shown the inner electrodes 3—33, 3—34 of each condenser unit may be made as a continuous electrode in the initial condenser manufacturing process and the two outer electrode sections 3—31, 3—32 may be electrically connected after first electrically polarizing the dielectric titanate structure of the two sections in opposite senses.

The pickup of the type shown in Figs. 16 and 17 may be made so that one-half of the length is omitted, leaving only one pair of condenser sections extending for instance to the right from the pivot portions 3—35, 3—36.

Figs. 18 and 19 show a modified form of a phonograph pickup of the type described in connection with Figs. 16 to 17. It comprises the two righthand titanate condenser sections of the two condenser units 3—11, 3—12 shown in Figs. 16 and 17 joined to each other with their inner surface electrodes 3—34 into a bilaminate unit having exposed outer surface electrodes 3—32. The bilaminate condenser transducer unit shown is similar in its character to the righthand portion of the bilamellate transducer unit described in connection with Figs. 1–D, 2–D and 2–DE and it is embedded within compliant elastomer bodies 3—47 confined between the housing walls 3—44 as in Figs. 16, 17.

The bilaminate transducer condenser structure of Figs. 18 and 19 has the shape of an elongated strip, the rear end of which is held fixed in a slit 3—41 of a torsion shaft 3—42. The torsion shaft is indicated as pivotally supported in two bearing members 3—43 of a compliant material such as rubber which are arranged to be held within bearing supports of two casing walls 3—44 of a pickup housing.

The lower end of the torsion shaft has secured thereto as by a rivet projection, a vertically flexible stylus arm 3—45 which is effective in transmitting to the shaft oscillatory vibratory motion when the stylus 3—46 carried in the front end of the arm 3—45 is actuated by a laterally undulating record groove of a record member such as a phonograph record. In the arrangement shown the torsion shaft 3—42 with its stylus arm 3—45 is so designed that when the stylus is actuated by a laterally cut groove the stylus arm 3—45 will impart to the torsion shaft 3—42 a rotary oscillatory action along its axis, thereby imparting to the bilamellate structure, generally designated 3—40, bending strains as it is confined within the plasticized elastomer body 3—47.

As seen in Figs. 18 and 19 the part of the torsion shaft 3—42 having the slit 3—41 within which the rear end of the transducer bilamellate 3—40 is fixed, is cut away so that the slitted part of the torsion shaft 3—42 is of generally semi-circular cross-section. This mounting arrangement of a bilamellate strip within a torsion shaft assures that the axis of rotation of the torsion shaft 3—42 coincides with the line boundary along which the clamped end of the bilamellate unit 3—40 adjoins the free end of the bilamellate structure which is embedded between the compliant elastomer bodies 3—47 for securing proper distribution of the mechanical strains when the free length of the bilamellate is bent by the oscillatory movement of the torsion shaft 3—42. With such arrangement of the clamping connection between the bilamellate strip 3—40 and the torsion shaft 3—41 along the axis of rotation of the shaft makes it substantially impossible for the shaft to impart a translatory motion to any effective portions to the bilamellate unit.

Figs. 20 to 20–D illustrate how a phonograph pick-up of the general type described in connection with Figs. 7 to 13 may be modified so that its bilamellate transducer unit may be driven by a needle and chuck arrangement. The pickup shown in Figs. 20 to 20–D may be provided with a housing generally similar to a bilaminate condenser and housing structure and internal elements substantially identical with the rear part of the pickup structure of Figs. 12, 13. The front part of the two corresponding housing walls 3—61, 3—62 are modified to provide bearing supports for two resilient bearing members 3—63, which support a shaft 3—65 having a chuck member 3—67, provided with a conventional needle hole for clamping a replaceable stylus or needle 3—68 within the V-shaped wedge region of the needle hole by means of a conventional thumb screw 3—69. A bilaminate transducer unit 2—60 generally similar to that shown and described in connection with Figs. 12, 13, has two condenser elements 2—11, 2—12 secured to a backing sheet 3—71 and is mounted in the rear part of the pickup housing. The front end of the backing sheet 3—71 has a stiffening tongue 3—72 provided with a forward coupling portion 3—73 having a hole which is engaged by the tip of a coupling needle 3—74 seated in an axially extending rear portion 3—66 of the chuck so that an oscillatory motion of the shaft 3—65 is transmitted by the coupling needle 3—74 and its connection with the stiffening tongue 3—72 to the stiff front end of the backing strip 3—71 of the bilamellate structure 2—60 for causing it to flex and operate in a manner described in connection with Figs. 7 to 13.

Otherwise the pick-up shown in Figs. 20 to 20–D is similar to that described above in connection with Figs. 12, 13.

As shown in Figs. 20, 20–A and 20–C, two compliant elastomer pads 3—51, 3—52 are held clamped to the outer sides of the two condenser units 2—11, 2—12 of the transducer unit 2—60 by a U-shaped clamp member 3—83. The clamp 3—83 has two arms 3—54 which extend through slits 3—55 formed in the facing portion of the housing wall 3—61. The ends of the two clamp arms 3—54 are bent over recessed shoulder portions of the housing wall 3—61 adjoining the slits 3—55 so as to affix the clamp in its proper position to the housing wall 3—61 and maintaining the two elastomer pads 3—51, 3—52 and all other elements of the transducer cartridge structure in their proper operative position along the exposed interior side of the deep housing wall member 3—61.

Fig. 20–E shows a modified form of coupling connection between the operating transducer lever 3—71 of a phonograph transducer cartridge shown in Figs. 20 to 20–D with the coupling needle 3—74 of the detachable-needle chuck structure 3—65. In the arrangement of Fig. 20–E, the mounting portion of the transducer lever 3—71 is provided with an additional biasing arm 3—75, the free end of which rests on or engages a slit of the chuck shaft portion 3—65, in which the coupling needle 3—74 is mounted so as to exert a positive biasing force which keeps the coupling arm 3—73 of the lever 3—71 positively coupled to the coupling needle 3—74 of the chuck.

Figs. 21 and 21–A show another form of a pickup of the invention. It comprises two condenser units 3—81, 3—82, each having a thin solid dielectric layer 3—83 formed of a refractory body composed essentially of random oriented titanate particles. To the two exposed extended surfaces of each dielectric layer 3—83 are united extended electrode surfaces 3—84, 3—85. The two con-condenser units 3—81 are shown united with their surface electrodes 3—85 to a strip-like operating lever 3—86, one end of which is held clamped in a clamping support 3—87.

When the solid titanate dielectric layer of such condenser units 3—81, 3—82 is subjected to a tension strain in the direction of its surface, its dielectric constant will decrease, producing a corresponding decrease in the capacitance of the condenser. When the dielectric layer of such condenser is similarly subjected to a compression strain, its dielectric constant will increase and produce a corresponding increase of the capacitance of the condenser. The flat lever member 3—86 may be made of metal and of such stiffness that when its free end is flexed, it will cause the dielectric layer of one of the two condenser units to be tensioned while the dielectric layer of the other condenser unit is compressed. As a result, a vibrating motion imparted to the spring-like member 3—86 will produce an oscillatory change in the capacitance of the two condenser capacitor units 3—81, 3—82.

According to the invention, the entire volume of the random oriented titanate particles of the dielectric layers 3—83 of such condenser units may be polarized by applying to their electrodes a direct-current (D. C.) polarizing potential. Such D. C. polarizing potential may be applied to a bilaminate formed by the two condenser units 3—81, 3—82 by a polarizing circuit such as shown in Fig. 21. The polarizing voltage is shown supplied by direct-current voltage source in the form of a battery 3—87, one terminal of which is grounded and the other terminal of which is connected through the metallic lever 3—86 to the inner surface electrodes 3—85 of the two condenser units 3—81, 3—82. The polarizing circuit is shown completed by the connections of the outer condenser electrodes 3—84, 3—85 to ground. Resistance elements are shown connected in the polarizing circuit so as to limit the maximum current flow to the condenser units. The combination of two condenser units with a backing strip lever 3—81 when polarized in the manner described above will operate as an energy transducer which will efficiently convert mechanical displacement forces applied to the lever into aiding electric voltages generated across the electrode surfaces of the two condenser units acting in series.

In analogous manner, alternating electric voltages applied to the series connected condenser units 3—81, 3—82 will produce a corresponding vibratory motion of their combined lever structure. In the circuit arrangement 3—81 the electric output voltage generated by the transducer structure may be impressed on an output circuit such as an amplifier through lead 3—88 across a suitable input resistance 3—89.

Tests have shown that the refractory dielectric layers composed of random oriented titanate particles may be safely strained to a degree sufficient to produce a change in the dielectric constant of 1 part in 30 or even higher. Without limiting the scope of the invention, there are given data of a form of such device. Each condenser used has a dielectric titanate layer in the form of a circular disk 7/16" in diameter, .010" thick, and having surface electrodes in the form of silver coatings bonded to the opposing faces of the dielectric layer 3—83. The lever 3—86 is made of a Phosphor bronze spring .015" thick approximately 1" long. Although the capacitor units are shown as having circular shape, they may be made of a rectangular shape and dimensioned so that they don't project beyond the borders of the lever 3—86. The spring-like member 3—86 may be made either of metal as described or of a non-electric plastic, resinous, spring-like sheet member to which the surface electrodes of the two condenser units are united by a suitable cement.

The individual surface electrodes of the condenser units 3—81, 3—82 may be subdivided so as to provide separate capacitor sections having the same continuous dielectric body layers and the individual separate condenser sections of such condenser structure may be arranged to operate in series aiding relation for increasing the output impedance as well as the output voltage of the combined condenser structure without increasing the amount of mechanical work required for generating it.

When the transducer structure such as shown in Figs. 21, 21–A is flexed in opposite directions its two capacitor units 3—81, 3—82 will generate a voltage proportionate to the polarizing potential which was applied to their dielectric layers.

Figs. 21, 21–A also show how such transducer unit may be utilized for operation as a phonograph pickup. The transducer structure including the lever 3—86 and the two capacitor units 3—81, 3—82 united thereto are shown housed in the interior of a housing having two alike housing walls 3—91 joined to each other along facing vertical mating surfaces. The mounting member 3—87 of the transducer lever 3—85 is suitably clamped between the housing walls or it may form an integral part of the housing wall structure. A conventional stylus or needle holder chuck 3—92 has a shaft which is supported in the bearing seats of the facing wall members 3—91. The chuck 3—92 has a needle hole for clamping a replaceable needle or stylus 3—93 by means of a thumb screw 3—94. The chuck 3—92 is provided with a conventional driving arm 3—94 provided with forked ends engaging the free end of the transducer lever 3—85 so that lateral undulations of the needle cause the arm 3—94 to impart corresponding lateral flexing motions to the transducer lever 3—85. When such pickup is used with a conventional phonograph record having laterally undulating record grooves, the lateral undulations of the needle will transmit corresponding forces to the two condenser transducer units 3—81, 3—82 and cause them to generate electric signals corresponding to the needle undulations. Tests have shown that the frequency response of pickup such as described above in connection with Figs. 21, 21–A is excellent and better than that obtained with known conventional phonograph records.

A pickup of the type shown in Figs. 21 and 21–A may have the stylus or needle affixed directly to a portion of one of the condenser units such as condenser unit 3—82, a remote portion of the other condenser unit 3—81 being directly affixed to a support extension of the phonograph tone arm. The needle may be of the permanent type and soldered or welded directly to an electrode surface of one of the capacitor units 3—81, 3—82. The needle and the transducer capacitor assembly may be arranged as a replaceable detachable unit inasmuch as the cost of the capacitor structure is less than that of the better phonograph needles. The needle may also be affixed directly to the operating lever 3—86 of transducer structure shown in Figs. 21 and 21–A.

Energy or signal transducers of the type described in connection with Figs. 21, 21–A are also applicable for use in microphones, such as hearing aid microphones. When used in combination with a microphone, the apex of a conventional diaphragm may be linked directly or through a lever to a vibratory portion of the transducer structure such as the free end of lever 3—86.

The application of compression or tension strains along the small dimensional thickness of the polarized dielectric layer of such condensers will generate voltage of the same order of magnitude as their application along their larger dimension.

The application of alternating electric voltages to the electrode surfaces of a transducer capacitor or condenser such as described in connection with Figs. 21 and 21–A will produce audible compressionable vibrations of such condenser.

When such transducer condenser is connected with its electrodes through a source of alternating voltages before subjecting the dielectric polarization by direct current potential, the condenser structure will be set into vibrations at twice the frequency of the applied alternating voltage. In other words, the unpolarized dielectric structure of such condenser undergoes the same mechanical deformation when the instantaneous signal voltage of an alternating voltage wave is positive as when it is negative. Since each signal contains a positive as well as a negative half cycle, the dielectric structure of such condenser element will undergo two alike mechanical deformations. These phenomena indicate that such transducer condensers of the invention are reversible in action and are therefore suitable for use in electrical filters. For example, two transducer condensers of the invention may be fixed to the opposite ends of a longitudinally extending member such as a metal rod, the length of which is chosen so that the combined structure forms a resonator which resonates for compressionable or extensional vibrations of a specific resonant frequency. When alternating electric signals are fed to one of the transducer condensers of such resonator, the resonator structure will be set into vibrations and will actuate the other transducer capacitor thereof to generate corresponding alternating voltages when the applied signals are of the same resonate frequency.

Condenser transducers of the invention as described in connection with Figs. 21, 21–A may also be used for measuring of a distance. Thus slight flexing of the free end of the transducer lever 3—86 will generate in the associated transducer condenser units 3—81, 3—82 a substantial voltage which may be measured and amplified. In the mass production of articles requiring closed dimensional tolerances, a transducer unit such as shown in Figs. 21 and 21–A may be combined with a fixed support into a gate of specified dimensions for causing the lever to be displaced whenever the article exceeds the desired dimensions and setting into action an automatic mechanism which automatically rejects and selects the articles, depending on their ability to flex or not to flex the free end of the transducer lever by a desired critical dimension.

Such transducers of the invention are also useful for measuring pressures, as in pressure gauges. Mechanical links may be combined with the lever structure 3—86 for transmitting the pressure to the lever and therethrough to the condenser units such as 3—81, 3—82 for generating a voltage corresponding to the unknown change of pressure which is to be measured.

Since the solid titanate particle dielectric layer of the transducer condensers of the invention are made by standard ceramic processes, the individual capacitor transducer units of the invention may be given any desired shape, for instance, the shape of a curved surface such as a surface portion of a sphere, paraboloid, or the like.

Once the titanate condenser units of the type described are subjected to direct current polarizing potential, they will remain effectively polarized and will generate voltages when subjected to mechanical strain and vice versa though source of the polarizing voltage has been removed or disconnected from such condenser unit.

Condenser transducers of the invention, such as described in connection with Figs. 21, 21–A, have many other applications. Thus it may be used as a relay which causes the lever 3—86 to perform a relay action in response to a control voltage applied to the electrodes of one or both of its capacitor units. The transducer structure may be used so that when one circuit applies a control voltage to its electrodes, the transducer will change its capacity and impedance and thereby control the flow of current in a different circuit. With such arrangement, when the control current alternates at a frequency different from the alternating control voltage, mixing as well as amplification may be produced and voltages of frequencies equal to the sum and difference of whole number multiples of the frequencies of the control and of the controlled voltages will be produced. Audio frequency modulation of radio frequency carrier may be thus effected as well as heterodyne mixing of radio frequencies to produce an intermediate frequency.

Resonant circuits may also be tuned by connecting a transducer capacitor such as the capacitor units 3—81, 3—82 in a resonant circuit and applying an adjustable constant or alternating potential across the capacitor. Automatic volume or frequency control may be effected by transducer capacitors of the invention since they may be arranged to detect deviations from the desired signal volume or signal frequency and to utilize the detected deviations for controlling the volume or frequency of the signal.

Figs. 22, 23, 23–A illustrate another form of phonograph pickup operating with a polarized condenser transducer unit of the invention of the type described in connection with Figs. 1–A to 3–A. It is shown with a single condenser unit 11–A combining a common solid dielectric layer with two outer electrodes 23, 24 and a single opposite inner electrode 19 of twice the area into a two-section condenser transducer.

The physical characteristics of the polarized condenser elements of the transducer structure of Figs. 22 to 23–*A* are otherwise similar to those explained above in connection with Figs. 1–A to 3–A.

The transducer condenser 11–A has united to the under side a backing member 4—21 of a tough, flexible resilient sheet material which gives the condenser structure so formed great mechanical strength notwithstanding the fragile character of the thin dielectric body of the condenser unit. The backing sheet member 4—21 may be made either of metal or a strong synthetic resin or plastic sheet material. Such combination of energy transducing condenser and resilient tough backing member united only to one side thereof should be designed to form a composite beam-like structure which, when flexed, will assure that the neutral surface of the strains imposed thereon by flexing will remain outside of the volume of the condenser body dielectric layer 13 of the order to assure that when flexed by bending, the entire dielectric body of the condenser structure will be subjected only to one type of strain, for instance, either tension strain only or compression strain only. This assures that the internal voltages induced by the strained dielectric structure across its electrodes will not partially or wholly cancel each other.

It should be noted that the two sectional condenser elements of the transducer unit shown in Figs. 22 to 23–A may be made of two distinct condenser elements united to one side of a backing sheet 4—21 to form with it a composite transducer structure. In other words, the operation of such composite transducer unit will be essentially alike whether the dielectric layer of the condenser structure forms an integral body or two separate bodies each provided with the two sets of electrodes on its opposite extended faces. It should be also noted that when the backing sheet member 4—21 is nonmetallic, provision must be made to provide electrically conductive connections between the two electrode surfaces of such two condenser sections secured to the backing sheet member in order to operate in the manner shown and described in connection with Figs. 1–A to 3–A. However, unless specified otherwise, the descriptions of the transducer unit of Figs. 22 to 23–A assumes that the backing sheet or lever 4—31 is formed of an elastic flexible metallic sheet.

The front end of the metallic backing sheet member 4—21 is stiffened by providing it with two lateral extensions 4—22 bent and shaped to form their extremities two accurate chuck jaws 4—23, 4—24 for clamping therebetween the shank of a conventional replaceable needle or stylus 4—25. As shown, an elliptically shaped biasing ring 4—26 seated around the chuck jaws 4—23 provides a biasing force urging the two chuck jaws to exert a clamping action which clamps the needle 4—25 in its operative position. The mouth of the chuck jaws has an outwardly flaring tapered region to facilitate insertion of the rearward end of the stylus which may be slightly rounded as indicated.

The rearward end of the metallic backing member 4—21 may be arranged to be assembled into a transducer cartridge which is secured to a mounting part of the housing in a manner similar to the pickup of Figs. 7 to 13 so that its forward end, with the condenser elements secured thereto, is retained in an operating position between an upper casing member 4—31 and a lower casing member 4—32. The two casing halves are suitably secured to each other.

The effective transducer region provided with the energy transducing condenser structure 11–A is shown imbedded between two elastomer bodies or pads 4—33, 4—34 which is soft and exhibits rubbery elastic characteristics and is effective in internally dissipating vibratory energy imparted thereto. The elastomer pads 4—33, 4—34 are so designed and are of such proportions and they are so located in the casing that when they are compressed by the casing walls against the exterior faces of the condenser region of the transducer unit they are effective in increasing the stiffness of the elongated condenser transducer structure and in damping any resonant operating peaks thereof. By properly choosing the dimensions of the characteristics of the damping pads 4—33, 4—34, it is possible to control the ultimate operating characteristics of the assembled pickup device over a wide range of desirable characteristics.

The lower casing wall 4—32 is provided with an opening for the stylus 4—25. The pickup shown may be so designed that when the needle rests on a record member with a vertical pressure, for instance, of about 1 oz., the transducer condenser structure shown is flexed in upward direction so that in operation only the tough backing sheet member 4—21 is subjected to tension, while the relatively fragile dielectric layer of the condenser elements is at all times subjected only to compression forces. In other words, the weight, for instance, of about 1 oz., with which the needle is loaded when the pickup rests on the record sheet member, acts as a permanent biasing force which maintains the transducer unit biased in an operating condition in which undulations imparted to the needle cause the transducer condenser unit to oscillate around a neutral biasing position over a range in which the condenser elements are at all times subjected to varying compression strains.

Polarized dielectrostrictive condenser elements of the invention may be also utilized for operation as torsion devices in which the dielectric structure of the condenser elements is subjected to torsion strain instead of compression or tension strain.

Figs. 24 to 26 show one form of a phonograph pick-up utilizing polarized condenser elements of the invention in a novel manner for operation under torsion strains.

It has a transducer unit 4—40 which comprises two condenser elements 4—41, 4—42, provided with dielectric layers 4—43 and two electrode surfaces 4—44, 4—45 and united to the opposite sides of a backing sheet member 4—46 to form a relatively tough condenser structure generally similar to that described in connection with Figs. 1 and 2. The backing sheet section 4—46 of the transducer structure to which the two condenser elements are united is pivotally supported at its two opposite ends along its longitudinal axis through two pivot elements 4—51, 4—52 to two pivot supports or frame members 4—53, 4—54, respectively, so as to make it possible for the condenser backing sheet 4—46 of the transducer structure to pivot around the longitudinal axis through the two pivot supports. In the form shown the two pivot-support frame members 4—53, 4—54 form in conjunction with two frame members 4—55 a unitary frame structure surrounding the condenser section of the backing sheet member 4—46, and they are all parts of an integral sheet cut to provide the various elements thereof as shown and described above. The two pivots 4—51, 4—52 constitute thus sheet metal tongues which are flexible enough to permit tilting motion of the relatively stiff condenser backing sheet section through which they are joined to the frame structure formed by the frame elements 4—53, 4—54, 4—55.

The front end of the condenser backing sheet section 4—46, shown to the right, is provided with downwardly bent shoulder portions 4—56 which imparts stiffness to the forward edge of the backing sheet element 4—46 and thereby to the front portion of the two condenser elements 4—41, 4—42 united thereto. The side edges of the front region of the backing sheet section 4—16 are likewise provided with angularly bent shoulder portions 4—57 to assure that the entire front region of the backing sheet section 4—46 with the portions of the condenser elements secured thereto has sufficient stiffness so that torsion imparted to the front edge of the backing sheet member is transmitted undiminished to the adjacent edge region of the condenser elements united thereto. To the two downwardly extending front shoulders 4—56 of the backing member is secured a cross arm 4—61 of a downwardly extending driving lever 4—63 having a conventional needle arm 4—65. The needle arm 4—65 is shown suitably secured to a forwardly bent end portion of the driving lever 4—63.

The frame section 4—54 forming the rear pivot support of the condenser section of the backing sheet 4—46 is provided with a mounting support and is shaped so as to make it possible to assemble the sheet metal frame structure of the condenser section of the transducer structure and insulated contact element assembled into a subassembly or cartridge which may be readily mounted within two casing walls in a manner analogous to that described in connection with the pickups of Figs. 7 to 13.

The pickup has a casing provided with a top wall

4—71 and a bottom wall 4—72 suitably secured to each other. The frame sections 4—53, 4—54, 4—55 of the frame sheet structure are shown provided with two overlying insulating sheet elements 4—76 and 4—77 between which the frame structure of the backing sheet is held clamped by the inwardly facing surfaces of the two casing walls 4—71, 4—72 for assuring stable mounting of the pivot supports 4—51, 4—52.

The two casing wall members 4—71 and 4—72 have recessed seating surfaces 4—81, 4—82 for seating elastomer bodies 4—83 of elastically compliant rubber-like material within which the generally flat condenser structure is embedded. The two elastomer pads 4—83 also press contact prongs 4—67 of the unit cartridge against the electrodes 4—14 of the two condenser elements.

The two elastomer bodies 4—83 within which the effective condenser transducer structure is held clamped are so designed and proportioned and chosen that when the stiff front region of the condenser transducer structure and its backing sheet 4—46 is tilted around its pivot 4—51—as by means of the driving lever 4—63—the front edge region of the condenser elements will be twisted in torsion relative to the back edges thereof, thereby subjecting the dielectric material of the two condenser elements to torsional strains.

By properly polarizing the condenser in the manner explained above, the torsional strains imparted to the dielectric structure will modify its dielectric constant, and when the dielectric structure is properly polarized it will generate voltages corresponding to the strains imposed thereon.

We discovered that the following factors must be given consideration when dielectrostrictive condenser transducer structures of the invention are to be operated with torsional strains.

When the dielectric layer of such polarized condenser transducer is subjected to strains of opposite signs, for instance, of tensile and compressive character, the dielectric of the condenser will be modified in opposite directions. As a result the voltage changes will be of opposite polarity, as explained above. However, when a polarized condenser element of the invention is subjected to torsional strains its dielectric constant of its dielectric layer changes in the same manner irrespective whether the direction of the torsion strain imparted to the dielectric is clockwise or counter-clockwise or generally in one direction or in opposite direction.

When a polarized condenser element of the invention, is subjected to a succession of opposite oscillatory torsional strains, the voltages generated across its electrodes will all be of the same polarity for each halfwave of the strain half cycles, and a polarized condenser element of the invention will then function in a manner analogous to a linear rectifier of an alternating current. These limitations are overcome by mechanically biasing the condenser structure in a torsional manner so that it is maintained under a pre-determined torsional bias strain while it is in a neutral operating condition from which it is subjected to vibratory torsional strains. In other words, in accordance with the invention, a polarized condenser structure of the invention, which is to be operated under torsional strains, is mechanically biased by torsional biasing means which maintain the condenser structure under a pre-determined neutral torsional bias strain condition of such magnitude that throughout the range of torsional vibratory motion imparted to the so biased condenser structure it will generate corresponding voltages of the frequency of the vibratory motion.

Various arrangements may be utilized for maintaining such torsionally operated polarized condenser structure in a torsionally strained neutral condition. Thus, for instance, if such torsional transducer of the invention is operated as a phonograph pick-up, the needle stylus is so connected to the condenser transducer structure that the needle load or pressure operating through a proper lever arm connection subjects the condenser element to the required torsional bias strain so that all vibratory undulations imparted to the condenser structure in the course of its operation as a pick-up will only result in an increase or decrease of the characteristic unidirectional biasing torsion strain in which it is maintained in neutral condition.

According to another phase of the invention, a polarized condenser element of a generally flat configuration, instead of being united to a flat backing sheet element such as element 4—46, has its backing sheet element permanently deformed and set by torsion forces before the condenser elements are united hereto. The torsionally set backing element is then united as by soldering in the way described above to the condenser elements in a fixture which holds the backing sheet element momentarily in a flat condition parallel to the flat condenser elements so that the two condenser elements may be soldered or joined or united to the backing element while it remains in a substantially flat condition. After thus uniting the condenser element to the torsionally preset backing sheet element, the united transducer structure is released and permitted to be brought by the torsionally preset backing sheet element to torsionally deformed condition in which the dielectric structures of the two condenser elements are maintained in the desired torsionally biased condition.

According to another phase of the invention, the restraining bodies or pads 4—83, of the transducer structure are confined within a clamping structure and are given such configuration that the pressure forces imparted by the restraining bodies to the surface of the polarized condenser structure cause it to assume and remain in a torsionally biased neutral condition shape subject to oscillatory changes in its deformation by torsional forces imparted thereto or induced therein while operating over the desired oscillatory or vibratory range.

One form of such torsionally biased transducer structure is shown in the phonograph pick-up of Figs. 24 to 26. The two wall recesses 4—81, 4—82 which hold clamped the two restraining bodies 4—83, against the polarized condenser structure have their extended inner wall surfaces 4—84, 4—85 which face the extended surface of the condenser structure shaped so that the compartment confined between them conforms to a torsionally twisted bar along the axis of torsion defined by the two pivot elements 4—51, 4—52 of the condenser structure. The configuration of the torsionally shaped inner surfaces 4—84, 4—85 of the two wall recesses 4—81, 4—82 is indicated in full lines in Fig. 25 by the front end of the compartment, and in dash lines for the rear end of the compartment when seen from the front end of the compartment in the direction of the longitudinal axis of its torsional configuration.

Fig. 26–A shows another arrangement for restraining the transducer structure similar to that of Figs. 24 and 25 in a torsionally biased neutral condition. The rear edge of the main backing sheet section 4—86 is provided with two oppositely directed biasing arms 4—91, 4—92, arranged to engage restraining elements of the two casing walls 4—71, 4—72, for torsionally twisting the rear edge of the backing sheet section 4—86 with the two condenser units 4—41, 4—42 to the desired neutral biasing condition when the cartridge is assembled between the two casing walls 4—71, 4—72. With the arrangement of Fig. 26–A, the two compartments 4—81, 4—82 for the restraining pads 4—83, need not be given the torsional shape.

In polarized torsionally operating condenser transducer structures of the invention care must be taken to assure that the dielectric material is properly polarized. Thus a torsionally operated condenser bilaminate having two condenser elements aligned on opposite sides of a neutral common junction surface structure must be so polarized that when subjected to torsional strains of opposite direction, it will generate opposite voltages. Thus in case of a torsionally operated condenser bilaminate such as shown in Figs. 24 to 26, the two condenser elements 4—11, 4—55 may connect in series to the D. C. polarizing source so that they are both polarized in the same direction. It should be understood that the two condenser elements of Figs. 22 to 24 may form a condenser structure with a single polar polarized dielectric titanate layer having only two exterior electrode surfaces, and which is subjected as a unit to one central torsional biasing strain.

In such case both or only one of the outer electrodes of the single condenser unit may be formed of tough backing sheet material for properly supporting the polarized condenser in its operative torsionally-biased position, as indicated in Fig. 26–A.

Dielectrostrictive condenser transducers of the invention are also suitable for use in a variety of other applications where transducer structures of extremely high sensitivity are required, such as in microphones. Greatest sensitivity may be provided by using polarised condenser elements having extremely thin dielectric layers, for instance, of a thickness of the order of $\frac{3}{1000}''$ to $\frac{5}{1000}''$. By combining two of such thin dielectrostrictive condenser elements in bilaminate of the invention, relatively tough and strong transducer structures of great sensitivity may be obtained. According to invention, sensitivity of such transducer structures further is increased by combining in a single transducer structure a plurality of sub-divided condenser transducer sections so interconnected with each other that aiding voltages are induced in the several sections.

Figs. 27 to 29 show one form of a microphone utilizing such dielectrostrictive ceramic transducer arrangement of the invention It has a bilaminate structure 5—10 comprising two united elongated condenser transducer units 5—11, 5—12 of the type described in connection with Figs. 1–B, 2–B, 4–BC.

Each of the condenser units has two outer surface electrodes 5—13, 5—14 and two inner surface electrodes 5—15, 5—16.

The two condenser units 5—11, 5—12 are shown united with their inwardly facing sets of surface electrodes 5—15, 5—16 to the opposite sides of two metallic backing sheet members 5—17, 5—18 held in a plane and separate from each other along their facing inward edges by a very small insulating gap in which may be placed an insulating strip before the two condenser elements 5—11, 5—12 are united to the two backing elements 5—17, 5—18. The central gap separating the two backing sheet elements 5—17, 5—18 and the separating strip, if one is provided, must, of course, be of such size and character as to assure that when the polarizing circuit is employed such as described later in connection with Fig. 27–A, there will be no short circuit.

Alternatively the two condenser units, 5—11, 5—12, connected in the manner shown, may be united along their facing surface electrodes to two tough flexible sheet members of insulating material so as to form a stable and relatively tough unit which is not likely to fracture in use, notwithstanding the fact that the very thin dielectric layer of each condenser element is very fragile. When a backing sheet member of insulating material is used, it is not necessary to use two backing sheet elements separated by a gap along their central meeting edges by a gap. In other words, separate backing elements 5—17, 5—18 are required only if the backing sheet elements are made of metallic sheet material.

In the form shown the two backing sheet elements 5—17, 5—18 are each provided at their outer ends with lateral frame extensions 5—21, 5—22, each having a pair of frame arms 5—23, 5—24, by means of which they may be joined into a firm, stiff frame structure by clamping them to or between two clamping members shown in the form of two pairs of clamping bars 5—25, 5—26, the clamping bars being suitably clamped to each other and to the clamping frame arms as by rivets 5—27.

A unitary transducer structure of the type described above constitutes a self-supporting rugged unit capable of operating with a high degree of sensitivity. The whole transducer structure, generally designated 5—30, may be readily mounted in a conventional microphone housing 5—31 and connected by means of a conventional driving rod 5—32 to a conventional microphone diaphragm 5—33 of the type used for driving a piezo-electric crystal transducer unit. However, as distinguished from microphones operating with piezo-electric crystal element, the housing structure 5—31 of the present microphone may be provided with acoustic vents without requiring any special precaution for protecting the active elements of the transducer structure against humidity and temperature effects.

A condenser transducer unit 5—30 of the type described above may be polarized in the assembled form by a polarizing circuit indicated in Fig. 27–A. Two D. C. voltage sources, 5—34, 5—37 of the polarity indicated, are arranged to be connected as by switches, to two of the four serially connected condenser sections designated by the condenser electrodes 5—13, 5—14, 5—15. Current limiting resistors 5—35 serve to limit the charging current. The plus (+) and minus (−) signs applied to the series connected condenser sections of Fig. 27–A indicate the polarity of the polarisation imparted to them in order to assure that they generate and use voltage when they are subjected to bending strains and forces F by the drive rod 5—32. Similar operations will also be offered if all polarizations shown are reversed. When so polarized, the four serially acting condenser sections will generate aiding voltages indicated by "$\pm e$" when the combined transducer structure is subjected to forces F indicated in Figs. 28, 27–A. The circuit diagram Fig. 27–A also shows how the serially acting condenser elements of the condenser transducer structure 5—10 are connected to the input electrode of a conventional amplifier 5—36 which amplifies the microphone output.

Figs. 30, 30–A and 31 show another form of microphone operating with a transducer structure of the invention. It comprises a plurality of energy transducing units, in the form shown, three energy transducing units, generally designated 5—40, all mounted on a common frame member 5—41. Each energy transducing unit 5—40 comprises a dielectrostrictive titanate condenser transducer bilaminate of the type described in connection with Figs. 1 and 2 and has two polarized titanate condenser units 11, 12 united with their inner surface electrodes secured to a metallic backing strip 5—42. The backing strip 5—42 of each bilaminate unit is provided at its two ends adjoining the ends of its condenser units 11, 12, two arms 5—43 extending at a substantially right angle therefrom. The two end arms 5—43 of each backing strip 5—42 are held affixed in opposite sides of the frame member 5—41 so that when the central portion of each bilaminate unit is flexed in a direction perpendicular to its extended surfaces the two end arms 5—43 will act as stiff supports against forces in a direction perpendicular to the extended bilaminate surfaces but the two arms 5—43 will flex freely under action of forces in the direction of the length of the bilaminate. In other words, the two supporting arms 5—43 of the backing strip 5—42 resist deflecting forces acting in a direction substantially perpendicular to the extended surface of the generally flat bilaminate structure while offering only negligible resistance to forces acting in a direction of the length of the bilaminate structure.

The central portion of each backing member 5—42 is provided at its opposite edges with laterally bent stiffening shoulder portions 5—44. Facing tongue portions 5—44 of adjacent backing members 5—42 are joined to the opposite sides of link arms 5—46, 5—47 extending from a drive rod 5—48 which is affixed to the apex of a conventional acoustic diaphragm 5—49. The two linked arms 5—46, 5—47 may be of insulating material, and their inner ends are secured as by cement to the facing overlapping shoulder portions 5—44 of the backing strips 5—42 of adjacent bilaminate units, for providing a driving connection between the central portion of each of the bilaminate units and the drive rod 5—48 with its acoustic diaphragm 5—49. The drive arms 5—46, 5—47 may be of metal, in which case their end portions are affixed to the adjacent overlapping portions of the central stiffening shoulders 5—44 of the bilaminate backing strips 5—42, and are insulated therefrom by suitable thin spacers of insulated material. The diaphragm 5—49 and the other elements of the microphone or electroacoustic structure of Figs. 30, 30–A and 31 is suitably mounted in a suitable housing of the type used in conventional microphone or telephone receivers operating with a piezoelectric crystal transducer.

The condenser elements of the individual units 5—40 may be suitably connected in series so as to increase the impedance and the sensitivity of the microphone or transducer structure. The acoustic device of Figs. 27 to 31 has been described as a microphone but such device will also operate as a sound emitter when its polarized condenser transducer elements are energized by a source of electric oscillations.

Furthermore, in many applications it will be sufficient to operate such acoustic device with a single polarized transducer 5—40.

Figs. 32 and 32–A show another form of an acoustic transducer device of the invention which will operate as a high sensitivity microphone, although it will also operate as a sound emitter. It comprises a bilaminate condenser transducer structure, generally designated 5—50, of the type described in connection with Figs. 1–D to 4–D. The bilaminate structure 5—50 comprises two condenser units 5—51, 5—52 joined to each other in superposed relationship along their facing electrodes. Each of the polarized transducing condenser units 5—51, 5—52 is shown provided with a set of outer surface electrodes 44, 45, 45 and a set of cooperating facing inner electrodes 46, 47, 47, 47 and 48. The facing inner surface electrodes 46, 47, 47, 47 and 48 of one condenser unit are united as by soldering the facing inner surface electrodes 48, 47, 47, and 46, respectively of the adjacent condenser transducer unit so that the individual condenser sections of the bilaminate structure constitute ten serially connected condenser sections in the way indicated by Fig. 32–B in which the individual condenser sections are designated by the reference numerals of the individual surface electrodes.

The bilaminate transducer structure 5—50 is shown intended for operation as by flexure in a direction perpendicular to its extended surface. In the form shown, it is supported by two mounting supports 5—53, 5—54 engaging the left end and a center portion of the bilaminate unit, the right end of the bilaminate unit being coupled as by drive rod 5—61, to an acoustic diaphragm.

The mounting supports 5—53, 5—54 are shown formed by two strip members, the lower ends of which are shown affixed or anchored in a frame member, such as a bar 5—55 of insulating material such as plastic or synthetic resin material so that each strip member acts as a stiff or rigid knife-edge-like support against forces in the direction perpendicular to the length of the bilaminate. Each strip member 5—53, 5—54 is provided along an intermediate portion thereof with two tongue portions 5—56, 5—57 struck out therefrom, each tongue portion 5—56, 5—57 being bent so as to provide a good coupling and supporting connection for the opposite flat sides of a short line-like portion of the bilaminate length in the manner generally indicated in Fig. 32. In order to prevent short circuiting of the outer electrodes of the condenser bilaminate by the metallic structure of the mounting strips 5—53, 5—54, insulating spacers 5—58 are interposed between one of the coupling tongue portions of each supporting strip and the surface electrode against which it is connected and spring biased.

The driving rod 5—61 is made in the form of a similar strip 5—61 having cut-out coupling tongues 5—62 engaging the opposite sides of the right end portion of the bilaminate unit and providing a driving connection therebetween and a conventional acoustic diaphragm 5—63. The coupling tongues of the strips 5—53, 5—54, 5—61 which are in direct engagement with a surface electrode of the bilaminate may be united thereto by soldering and their other tongues may be united to their facing surface electrode by insulating cement.

In all of the transducer devices and applications described above, the dimensions of the thicknesses of the individual surface electrodes of the condenser units, the soldering layer junctions therebetween or to the backing strips, and the dimensions of the backing strips have been shown exaggerated for the sake of simplicity.

Dielectrostrictive transducers of the invention are also ideally suited for use in accurate measuring instruments for measuring deflections or the like and in applications such as vibration pickups or the like.

Figs. 33, 33–A show one form of a simple measuring device which is combined with a dielectrostrictive transducer element of the invention for measuring the characteristics of the vibratory motion of a vibratory body. It comprises a beam 5—71 of steel, brass or other material of well-known mechanical properties, which has secured to one side thereof a polarized titanate condenser transducer 5—72.

The condenser transducer 5—72 comprises a solid dielectric layer composed essentially of random oriented titanate particles which are permanently polarized so that a strain imparted to the dielectric structure will produce a corresponding voltage across its surface electrodes 5—73, 5—74. One of the surface electrodes is shown united to one flat surface of the beam 5—71 so as to form therewith an integral measuring structure arranged so that when a bending or flexing force or motion is imparted to the beam 5—71, the dielectric structure of the polarized titanate transducer unit 5—72 will be subjected to mechanical strains which will produce across its electrodes 5—73, 5—74 voltages corresponding to the vibrations imparted to the beam.

To produce optimum output from the bilaminate transducer, it may be desirable to secure it to those regions of the beam 6—71 in which its curvature or deformation is of the same character. The electrodes 5—73, 5—74 of the transducer may be subdivided, as indicated by the dotted lines in Fig. 33A, to effectively provide a larger number of condenser elements, the voltage outputs of which can be added together by a series connection, as indicated above. Such output voltage cascading may also be increased considerably by greater electrode subdivision, care being taken to prevent electrode short circuiting through the beam 5—71, as by the insulation of the beam from those electrodes secured to it. Output connections to the electrodes may be applied in any convenient manner as by soldering or by clamping or spring biasing contact members against them.

In order to provide a deflection measuring device of great accuracy, the beam 5—71 is shown formed as an integral part of a single massive metallic supporting block or base 5—75 provided with two massive post-like arms 5—76 integrally joining the ends of the beam 5—71 to the massive base 5—75. The base 5—75 and the two connector arms 5—76 are of such cross-section and mass rigidity as to confine substantially all strains imparted by vibrations acting on the beam 5—71 to the free portions of the beam extending between the two massive arms 5—76. In the arrangement shown the dielectrostrictive transducer unit 5—72 is shown united to the side of the beam facing the hollow space 5—77 bounded by the beam, the two posts and serving as a protective enclosure for the dielectrostrictive unit 5—72.

A vibration pickup device shown in Figs. 33, 33–A has been found to operate with the same accuracy as the very elaborate and expensive artificial mastoid instruments, only a few of which have been heretofore available for making similar measurements.

Dielectrostrictive energy transducer structures of the type described above will also operate effectively for converting electrical energy into vibrational or sound energy or in general as vibration or sound emitters. Thus, the dielectrostrictive transducer structures of the type described above will, when excited by a source of electric oscillations connected to its electrodes, cause the transducer structure to vibrate and convert the electrical energy supplied thereto into vibrational energy.

Since dielectrostrictive transducer structures of the invention may be readily united, as by soldering, to metallic bodies so as to form therewith composite vibratory structures of a resonant frequency determined by the mass, compliance and related mechanical parameters, of composite structures, and since the dielectric structure of the polarized condenser is not subject to deterioration by humidity over wide ranges of temperature, such transducer structures of the invention are suitable for use in a variety of applications and they will operate in such applications with a higher efficiency than similar prior art devices.

Figs. 34 to 37 show several modifications of a generally similar type of vibration or sound emitting structure which combines one or more dielectrostrictive transducer elements of the invention with metallic body into a composite vibratory structure of predetermined vibration characteristics and which is effective both in emitting vibrations or sound when energized by electric oscillations and also for responding to vibrations or sound for generating a corresponding electric output.

Referring to Figs. 34, a plate-like beam 6—11 has secured to its generally flat central portion a dielectrostrictive transducer condenser unit 6—12 of the type described in connection with Figs. 1 to 6 by soldering, for instance, one of its electrodes 6—13 to a flat portion of the beam 6—11. When a plate-like beam such as shown in Fig. 34 having a relatively wide surface extending in a direction perpendicular to the plane of the drawing and provided with a transducer unit 6—12 extending over all or a major portion of its width will vibrate in a direction transverse to its plane with a fundamental mode in accordance with the well-known mechanical vibration characteristics of a free-free beam, the fundamental mode vibration being indicated in Fig. 34 by the dash-dot sine wave 6—14.

As shown in Fig. 34, the transducer unit 6—12 is joined to an anti-nodal portion of the plate which, in the case shown, coincides with its central portion along its length. When the transducer unit 6—12 of such vibrating structures is supplied oscillations of a frequency substantially coinciding with the resonant frequency of its fundamental vibrating mode shown by wave 6—14, the contraction and expansion of the dielectric structure of the transducer unit 5—12 will impart to the beam or plate 6—11, through its intimate coupling therewith, flexure forces which will cause it to flex and vibrate with the mode shown.

There is thus obtained a composite mechanical vibrating structure which is arranged to vibrate at its fundamental mode by a dielectrostrictive transducer unit of the invention which forms an integral part of the vibrating structure. The vibrating structure of this type will exhibit extreme ruggedness and stability in adverse ambient conditions of humidity, temperature and pressure.

Figs. 35 and 35–A show how a beam or plate of the type shown in Fig. 34 may be driven by dielectrostrictive units of the invention so as to vibrate with the next higher mode indicated in these figures by the wave lines 6—16. In order to vibrate the plate or beam 6—11 at such higher mode one or more dielectrostrictive transducer units 6—12, 6—12 are united to one or more anti-nodal vibrating portions of the plate for vibrations at the higher mode of wave 6—16. The two transducer units 6—12 may be alike and they are joined to the plate 6—11 shown in Figs. 35, 35–A in the same manner as described in connection with Fig. 34.

Fig. 35 also shows how the two transducer units joined to the two anti-nodal portions of the higher mode of plate 6—11 may be energized in parallel from a source of oscillating energy 6—17 of the desired frequency. Since both transducer units 6—12 are shown joined to the same side of the metallic plate 6—11 which vibrates in opposite direction relatively to the surface of the plate, the two transducer units are polarized in opposite direction as indicated by the (+) and (−) signs applied to their outer electrodes.

Fig. 35–A shows in a similar manner how the two transducer units 6—12, which are joined to opposite anti-nodal portions of the same side of beam 6—11, have to be polarized when they are connected in series to a source of oscillating energy 6—18 in order to cause the beam or plate to vibrate at the higher mode of wave 6—16. As shown, the opposite polarity leads 6—15, 6—15 of the oscillation generator 6—18 are separately connected to the respective exposed electrodes of the transducer units 6—12, 6—12, the circuit being completed by the connection of the other transducer unit electrodes through the beam 6—11. In such an arrangement, the exposed electrode of one transducer unit is driven at a polarity opposite to that of the exposed electrode of the other unit and the beam contacting electrodes of each unit which form an intermediate point in the output circuit assume a potential intermediate that of the beam contacting electrodes and is therefore opposed to both of the exposed electrodes. For example at an instant when the exposed electrode of the left hand transducer unit 6—12 is positive with respect to that of the right hand unit 6—12 the beam contacting electrodes of these units will assume a potential negative with respect to the left hand transducing unit and positive with respect to the right hand transducer unit. These instantaneous potentials are always oppositely applied so that the units must be similarly polarized as indicated in Fig. 35A to vibrate the contacting anti-nodal points in opposite direction. An intermediate point of the oscillation source 6—18 may be connected directly to the beam 6—11 as shown at 6—10 in the figure.

Fig. 36 shows how such plate 6—11 may be driven to vibrate at a next higher mode indicated by the dash-dot wave 6—21. In the form shown, the plate 6—11 has united to three anti-nodal portions of its higher mode 6—21 three dielectrostrictive transducer units 6—12 such as described in Figs. 34 to 35A. When the transducer units 6—12 of the vibrating system of Fig. 36 are supplied with oscillations of a frequency of the higher mode of curve 6—21, the plate or beam 6—11 will vibrate at such higher mode, provided the individual transducer units are properly polarized in relation to the beams and their connections to the energizing source and in the manner explained in connection with Figs. 35 and 35–A.

As indicated in Figs. 34 to 36 the beam 6—11 may have united to the other side of its anti-nodal portion or portions of its respective modes an additional transducer unit 6—19 indicated by dash-lines and operating for supplying to the plate additional driving forces for vibrating it at the desired mode.

A vibrating beam or plate-like structure of the free-free type described above in connection with Figs. 34 to 36 should be mounted in such manner that it is held by supports at spaced nodal portions thereof, indicated in Figs. 34 to 36 by dash-double-dot lines 6—20. The supports may be formed by felt pads, or by knife-edge support elements or the like. Figs. 36 and 37 show how such free-free vibrating beam may be supported by relatively thin sheet metal members such as tongues forming part of a supporting sheet structure secured to a suitable base or support. A supporting sheet structure 6—23 has tongues 6—24 extending through slits of the plate 6—11 and united thereto by welding, soldering or the like so as to form therewith a continuous structure the elements of which are integrally united to each other. The supporting tongue portions 6—24 of such support will have lateral flexibility and they will not be exposed to large forces because they are located at the nodal regions of the vibrating structure.

If it is desired to confine the radiation of the vibrating energy to a given direction, the portions of the vibrating structure, which radiate vibrations in a direction opposite to the desired direction may be acoustically screened. This is indicated in Fig. 36 by screen elements 6—26 positioned relatively to the different anti-nodal portions of the plate 6—11 vibrating at the desired higher mode so as to suppress undesired emission of vibrating energy. In addition resonators, indicated in Fig. 36 by resonant cavities 6—27 are placed at the proper positions behind the anti-nodal portions of the plate so as to reflect vibrations emitted in the undesired direction and strengthen the emission of vibrations in the desired direction indicated by the arrows 6—28.

Various other forms of electro-mechanical or mechano-electric vibration emitting or receiving apparatus, of the type described in Mason Patent 2,416,426, Harrison Patent 2,416,314, Pope Patent 2,405,604, Morgan Patent 2,399,820, Gruetzmacher Patent 2,323,030, Pope Patent 2,242,756, and Hansell Patent 1,899,503 and other similar apparatus in which mechanical structures are combined with the piezoelectric transducer units for securing the desired operating characteristics may, to great advantage, be modified by combining their mechanical structures with the dielectrostrictive transducer structures of the present invention.

Figs. 38 and 38–A show how the mechanical elements of a transducer apparatus of the type described in Harrison Patent 2,416,314 may be combined with a dielectrostrictive transducer structure of the present invention. It comprises a mechanical vibrating structure including a vibratory plate-like member 7—11 joined through a relatively compliant junction region 7—12 to a supporting wall 7—13 which forms part of a support structure holding the vibratory plate member 7—11 in its vibratory position. Such vibrating and supporting structure may be readily produced of metal either by machining or by casting so that the vibrating member 7—11 may be given any desired shape, either polygonal or circular and any desired mechanical vibrating characteristic. To the upper side of the vibrating plate 7—11 is shown secured a pile 7—10 of superposed dielectrostrictive transducer units 7—14, 7—15. Each of the transducer units 7—14, 7—15 comprises a solid dielectric layer composed essentially of electrically permanently-polarized random oriented titanate particles and two surface electrodes 7—17, 7—18 united to the opposite sides of the dielectric layer arranged to operate individually in substantially the same manner as described in connection with Figs. 1 to 6.

The surface electrodes 7—17, 7—18 of adjacent condenser units 7—14, 7—15 of the array are shown joined as by soldering or fusion to backing sheet members 7—21, 7—22 into a unitary integral structure so as to form in combination a vibrating structure of desired resonance frequency and other vibrational characteristics. Both backing sheet members 7—21, 7—22 may be made of metal, and as indicated, they serve to provide electric circuit connections to the individual electrodes. Alternatively, the sheet members 7—22 may be omitted and the electrode surfaces of the adjacent condenser transducer unit, which are shown united to these sheets, may be directly joined to each other by soldering, suitable electric circuit connections like thin foil electrodes being provided in lieu of the sheet members 7—22 in order to complete a circuit connection between these electrodes to external circuits. However, the sheet member 7—22 may be made of a relatively thin metal so as to not materially modify the mass and compliance parameters of the unitary dielectrostrictive transducer structure 7—10 formed by the laminated array or pile of condenser transducer units 7—14, 7—15.

One set of backing sheet members, namely, the backing sheet members 7—21 of the pile of transducer units, as shown extending beyond the boundary of the individual condenser units into slits formed in the vibrating plate member 7—11 so that they may be united thereto by welding or soldering and form therewith an integral structure. With such arrangement the lamination pile of condenser transducer units 7—14, 7—15, is integrally united to the vibrating support member 7—11 so as to form therewith a unitary integral vibrating structure which operates with maximum efficiency.

The individual polarised condenser transducer units extend with their flat bodies in planes generally perpendicular to the drawing of Fig. 38 and they are polarised and interconnected in the laminated condenser array in the manner shown diagrammatically in Fig. 38–A for causing them to vibrate in unison with an extensional motion.

As used herein the expression "extensional" motion or vibration means a longitudinal motion or vibration of a bar or plate in the direction of one of its major dimensions when subjected to either by compression or tension forces; and "flexural" motion or vibration of a bar or plate means a bending or flexing motion in a direction perpendicular to one of its major surfaces when subjected to bending or flexing forces.

By way of example, bilaminate transducer structures of the type shown in Figs. 1 to 3 when polarised and serially connected to an alternating voltage source in the manner shown in Fig. 4, will vibrate with a flexural motion, on the other hand, the laminated transducer structure of Fig. 38, when polarised and connected to an alternating voltage source through leads 7—11, 7—23—in the manner shown in Fig. 38–A—will vibrate with extensional vibrations. As shown the unitary and integral extensional vibratory transducer structure of Figs. 38, 38–A is formed of a plurality of superposed condenser transducer units which are alternately of opposite polarity, so that they may be energised from a relatively low voltage source thereby avoiding difficulties encountered with supersonic vibration emitters which have to be driven by a high voltage source.

The energy transducer structure 7—10 of the invention is shown enclosed by a vibration transmitting diaphragm member 7—25 which forms an enclosure around the transducer structure 7—10. The space within the diaphragm enclosure 7—25 is filled with a suitable vibration transmitting liquid, such as oil, so that extensional or compressional waves may be transmitted or received across the diaphragm 7—25 between the transducer structure 7—10 and a body of a liquid, such as a body of water adjoining the exterior of the diaphragm member 7—25. When a transducer structure of the type shown in Fig. 38 is to be used for transmitting and receiving compressional wave energy to or from a body of water adjoining the outer side of the diaphragm 7—25, the diaphragm member 7—25 and the other elements of the transducer structure should be designed in the well-known manner for suitable resistance, as described in Mason Patent 2,417,426 or Harrison Patent 2,416,314.

The feature of the invention based on the pre-stressing of the dielectric elements in compression as described above in connection with Figs. 1 through 4D also apply to produce the similar desirable results in systems such as shown in Fig. 38 where the dielectric elements are subjected to extensional vibrations or are used to transduce electrical energy into mechanical energy. Thus, the backing strips 7—21 and/or 7—22 may be arranged so that when they are secured to the associated dielectric units the dielectrics are stressed in compression in a manner similar to that described above. The application of mechanical strain will accordingly vary the compression up and down from the pre-stressed value and the application of electrical potentials will also vary the compressive bias and cause extensional movements of the dielectric.

In Fig. 39 is shown another form of energy transducing device of the type described in connection with Figs. 38 and 38–A in which the energy transducing structure is arranged to focus emitted vibrations in a focal point. It comprises a frame or supporting structure 7—31 of metal supporting a backing sheet 7—32. The backing sheet 7—32 has the shape of a surface segment of rotary body, such as a sphere paraboloid or the like. The backing sheet member 7—32 is shown joined to the surrounding wall of the frame structure 7—31 through a compliant annular junction region 7—33 so as to make it possible for the backing member 7—32 to vibrate relatively to the frame without excessive restraint by the supporting frame structure 7—31.

To the concave surface of the backing sheet member 7—32 is secured a pile of superposed electrically polarised dielectrostrictive condenser transducer units 7—34, 7—35, 7—36, etc. Each of the dielectrostrictive condenser transducer units 7—34, 7—35, 7—36 comprises a solid dielectric layer of electrically polarised titanate particles and two surface electrodes intimately united to the opposite outer surfaces of the dielectric layer in a manner described in connection with the corresponding condenser transducer elements of Figs. 1 to 5. The individual condenser transducer units of the pile are secured to each other and to the backing member 7—32, by soldering their facing surface electrodes to each other and by soldering the surface of the wall member 7—32 to the facing surface electrode of the adjoining condenser transducer unit 7—34. The individual condenser transducer units 7—34, 7—35, 7—36 are polarized and interconnected in a manner described in connection with Figs. 38, 38–A so as to cause the pile of transducer units to undergo extensional vibrations in a direction perpendicular to the curved surface layers of the individual units when the transducer structure is energized from an alternating voltage source. The frame wall member 7—31 of the device of Fig. 39 may form part of a casing or of a hull of a ship, or the like, with which the transducer structure is associated.

When an energy transducing device of the type described in connection with Fig. 39 is connected to a source of electric oscillations of a frequency which is near the resonant frequency of the composite vibrating structure formed by an array of condenser transducer units and with its backing member 7—32 and other associated elements, it will be set into vibrations of such frequency, that as a result, these vibrations will be generally transmitted in a direction perpendicular to the concave surfaces of the condenser units and they will be focused and concentrated, thereby focusing the vibrations in the focal point of the curved vibrating structure. Thus in the case of a spherically shaped vibrating structure, the emitted vibrations will be focused in the center of the sphere. In accordance with well known principles, described, for instance, in the foregoing Mason and Harrison patents, the vibrating device equipped with the transducer structure of Fig. 38 may be designed that its rear side, extending rearwardly from the first condenser transducer unit 7—41 constitutes substantially infinite or large impedance for waves of its resonant frequency, so that substantially all emitted waves are directed toward the focal point.

Although the energy transducing device of Fig. 39 has been described as a vibration emitting device it will also operate as a very efficient directional receiving and detecting device for detecting the direction of a vibration emitting source.

Fig. 39–A shows an energy transducing device of the type described in Fig. 39 in which an array or pile of superposed condenser units 7—41, 7—42, 7—43, etc. are united to the convex side of a backing member 7—44. The backing member 7—44 is joined through a circular compliant region 7—45 to a surrounding frame structure 7—46 generally similar to that of Fig. 39. The individual condenser transducer units of Fig. 39–A are joined in similar manner to each other and to the backing member 7—44 so as to constitute a combined integral vibratory structure of a predetermined resonant frequency.

The individual condenser units of the vibrating structure of Fig. 39–A are polarised and interconnected in the manner analogous to that explained in connection with Figs. 38 and 38–A so that when they are connected to a source of electric oscillations of a frequency which is near the resonant frequency of the composite vibrating structure, it will be set into extensional vibrations which will emit energy in divergent directions. The device of Fig. 39 may be designed in accordance with the principles of the foregoing Mason and Harrison patents or of Morgan Patent 2,399,820 or Pope Patent 2,405,604.

Dielectrostrictive transducer structures of the type described in connection with Figs. 39 and 39–A which are designed to emit or receive vibratory energy in convergent or divergent directions may be also built without resort to curved dielectrostrictive transducer condensers. Thus a pile superposed condenser unit generally similar to that of Figs. 39 and 39–A may be formed of generally triangular sections each composed of superposed triangular condenser elements joined into a pile. Each segmental section of such pile is joined to a generally triangular junction surface portion of the metallic backing wall member which is given a flat shape so that it may be joined by soldering to the flat electrode surface of the corresponding generally triangular pile section. The centrally oriented apex portions of each triangular segment section of such condenser transducer structures may be cut off, so that the composite structure may have a shape generally similar to the condenser transducer structure of Figs. 39 and 39–A which are provided with a central hole.

It should be noted that in some applications it may be desirable to combine with a single backing pole member of the structures of Figs. 39 and 39–A a pile of the inner and outer transducer structures composed of superposed individual polarized condenser transducer units united to each other in the manner described above.

Figs. 40, 40–A show in a schematic manner one form of an electro-mechanical filter of the invention which combines a known structure with electro-mechanical terminating elements of the invention and make it possible to use the filter structure as a part of an electric filter circuit. It comprises a plurality of filter mass members 7—51 and two terminal mass members 7—52 joined to each other by compliant members 7—53 so as to form a mechanical filter analogous to well-known electric filters as described for instance in the book "Electro-Mechanical Transducers and Wave Filters," by W. P. Mason, published 1942, page 86. As explained in the article "Compact electro-mechanical filter," published by R. Adler, in Electronics, April 1947, pages 100 to 105, the mechanical elements of a filter such as shown in Figs. 40 and 40–A may be designed for instance, for operation as an intermediate frequency filter of a radio broadcast receiver. For such application, the individual filter mass members 7—51, 7—52 are made of metal plates and the compliant members 7—53 are made of wires, the plates and wires being of predetermined mass and elastic characteristics and predetermined dimensions to produce the desired filter action.

In order to provide electrical terminations for such mechanical filter, each of its two terminal plates of 7—52 has secured thereto one or two dielectrostrictive condenser transducer units 7—55 of the invention. Such condenser transducer unit 7—55 has a solid dielectric layer of electrically polarized randomly oriented titanate particles and two surface electrodes united to the outer surfaces of the dielectric layer in a manner described in connection with analogous elements of Figs. 1 to 3 so that the condenser transducer structure is effective in converting electric energy into mechanical energy, and/or mechanical energy into electrical energy. The individual condenser transducer unit is secured to the respective terminal plate by soldering the surface electrode to the facing surface of the terminal plate, and two condenser units may be secured to the opposite sides of each terminal plate.

In the filter shown in Figs. 40 and 40–A, each combined terminal unit is formed by the terminal plate 7—52 and a dielectrostrictive condenser 7—53 united thereto and constituting therewith a half-wave line element of the filter. One of the half-wave line terminating units of the filter may be utilized to provide an electric input connection to the two surface electrodes of its condenser unit. In a similar manner the surface electrode of the condenser of other terminal unit provide output circuit connections of the filter. Otherwise the filter described in connection with Figs. 40 and 40–A may be designed in the manner described in the Electronics article of April 1947, referred to above.

Composite vibrating structures of the invention which combine mechanical vibrating parts with dielectrostrictive condenser-transducers of the invention in accordance with the principles described above will, in general, operate much more effectively and with greater efficiency than prior art electro-mechanical vibrating structures which could be used in similar application, and in which the vibrating energy had to be driven either by magnetostrictive driving structures or by piezoelectric crystal transducing sructures operating with quartz, tourmaline of Rochelle. Since they are produced by ceramic methods, condenser-transducers of the invention may be given any desired shape, and made in the form of rings, spheres or other curved shapes. Furthermore, dielectrostrictive condenser-transducers of the invention will per unit force generate an electric charge about 100 times larger than a corresponding element made with tourmaline crystals. In addition the dielectric layer of such transducers of the invention, will operate with a lower voltage gradient to give the same pressure change as a piezo-electric crystal transducer operating with a quartz or tourmaline crystal slabs.

Because of the relatively high dielectric constant and the ability to operate with a relatively high voltage gradient, dielectrostrictive condenser transducers of the invention are ideally suited for all applications in which it is desired to produce substantially vibratory energy. Because of the high dielectric constant of their solid dielectric titanate layer, dielectrostrictive condenser-transducers of the invention used for driving a given vibratory load will represent a higher capacitive admittance to the energizing circuit of the piezoelectric quartz crystal transducer structures used for driving such load. Accordingly, dielectrostrictive condenser-transducers of the invention will operate with an alternating voltage energy through relatively longer line connections without undue losses due to the capacitive effect of the line. On the other hand, piezoelectric quartz crystal transducers have to operate with relatively short lines in order to minimize the losses due to the shunting admittance of the line. For instance, when a piezo-electric quartz crystal transducer pick-up is used in submarine signalling applications, it has to be connected to the amplifier circuit through short lines as otherwise only a fraction of the output is delivered to the input of the amplifier or measuring element of the amplifier circuit. As distinguished therefrom, when a dielectrostrictive condenser-transducer pickup of the invention is used in submarine signalling it may be connected to the measuring circuit through a relatively long line without such disturbing effects.

According to the invention, dielectrostrictive condenser-transducers of the invention are also of great advantage combined with vibrating elements of musical instruments both for transducing musical vibrations of the individual elements or composite structures of such instruments into electrical signals which are used for the reproduction of the music, and also for actuating music producing elements of the instruments such as strings or reeds and setting them into musical vibrations. This phase of the invention is applicable to various types of musical instruments such as those described, for instance, in the following U. S. patents: 2,414,886, 2,219,539, 2,413,062, 2,200,718, 2,273,975, 2,032,435, 2,250,065, 1,952,630, 2,237,105, 1,933,298, 2,230,836, 1,633,186.

Figs. 41 to 43–B show how elements of a string instrument, such as the piano, may be combined with dielectrostrictive condenser-transducer elements of the invention into novel electronically operating musical instruments. A piano-type instrument has a plurality of progressively tuned vibrators in the form of strings 8—11. Each string 8—11 is shown strung from a hitch pin 8—12 of a metallic mounting frame 8—13, over a common bridge 8—14 and then across the width of the frame 8—13 over a ledge 8—15 thereof and past a pressure bar 8—16 to a tuning pin 8—17 held in a wrest plank. The bridge 8—14 is vibrationally supported in a conventional manner and it has two bridge pins 8—21, 8—22 for each string around which the string passes and on which it bears in its vibrational movement. The piano may be provided with a usual key-operated hammer arranged to strike a portion of the lengths of the string extending between the bridge and the ledge 8—14 for setting the individual string or string groups into the desired musical vibrations.

As shown by the cross-sectional views of the bridge 8—14, it has a pin mounting portion 8—24 which is narrower and rises above the wider base thereof. When a string of such instrument is set into musical vibrations, the bridge pins 8—21 and 8—22 will be vibrated by the pull of the vibrating strings and these vibrations will be also transmitted both to the raised portion 8—24 of the bridge as well as to its base 8—14.

According to the invention, the musical vibrations of one or more, or all of the strings of such a string instrument, are utilized to produce electric signals by combining or uniting either an element or elements of the bridge pins, or of the bridge, or portions of the string with one or more dielectrostrictive condenser-transducer elements of the invention in such manner that when a string or strings undergo musical vibrations the transducer elements will produce corresponding electric voltages.

As indicated in Fig. 43, one or both sides of the raised bridge portion 8—24 in which the bridge pins are mounted have united or secured thereto dielectrostrictive condenser-transducers 8—25, 8—26. Furthermore, the raised pin mounting bridge portion 8—24 is shown provided with a slit 8—27 within which is mounted and held united to the slit walls a dielectrostrictive transducer unit 8—28.

In addition, as indicated in Fig. 43–B, the upper side of the raised bridge portion 8—24 is shown provided with inwardly extending slits in which are mounted and held united to the slitwalls additional dielectrostrictive condenser-transducer units 8—29 of the invention, so that vibrations of the adjacent bridge portions shall be transmitted to the transducer units 8—29 and produce therein corresponding voltages. When combined with a wooden bridge structure the surface electrodes of the transducer units 8—25, 8—26, 8—28, 8—29 are secured to the adjacent facing wall surface portions of the bridge by a suitable cement.

The individual transducer units 8—25, 8—26, 8—28, and 8—29 are the type described in connection with Figs. 1 to 6. If they are combined with the bridge so that they operate with flexural vibrations, they are made to advantage in the form of bilamilate condenser-transducer units. However, the transducer units 8—25, 8—26, 8—28, 8—29, may be mounted so that they are sensitive primarily for extensional vibrations in a direction perpendicular to their plane. With the arrangement shown, the vibrations of the strings will be transmitted through the bridge pins 8—21, 8—22 to the body of the bridge and thereby to the transducer units 8—25, 8—26, 8—28, 8—29 and actuate them to produce corresponding voltages.

As indicated in Fig. 43–A, each string or group of strings of the same tone may be combined with its own individual dielectrostrictive condenser-transducer units 8—24, 8—26, 8—28, and 8—29. In such case, the output of the condenser-transducer units associated with the individual strings may be suitably combined either before or after one or more amplification stages in a mixer for securing desired musical effects. However, the condenser-transducers of the invention may be also made in the form of continuous long units or of a limited number of sections secured to the full length of the bridge so that a continuous transducer unit responds and produces voltages corresponding to the musical vibrations of a larger or smaller number of instrument strings.

Although, as indicated in Figs. 43, 43–A, 43–B, each sectional bridge is shown combined with four transducer units of the invention, this is done only in order to illustrate the versatility with which they may be used in combination with musical instruments. In most practical applications it will be sufficient to combine the bridge with only one or two of the transducer unit mountings shown.

Fig. 44 shows how bridge pins of a string instrument, such as bridge pins 8—21, 8—22, may be combined with the dielectrostrictive transducers of the invention for producing voltages corresponding to the vibrations of the strings. Both bridge pins or only one bridge pin 8—22, as shown, is provided with a slit in which is mounted a dielectrostrictive transducer unit 8—31 of the invention so that it extends between a prong portion 8—32 engaged by the string, and the adjoining prong portion of the pin body 8—22. The condenser-transducer unit 8—31 may be of limited transverse length so that it doesn't engage any portion of the string 8—11. Alternatively, as indicated in Fig. 44, the transducer unit 8—31 may project sufficiently far beyond the boundary of the pin 8—22, as indicated by its dash line extension 8—34, so that a longer or shorter portion of its facing surface is engaged by the vibrating string. With the arrangement of Fig. 44, the vibrations of each string 8—11 will be transmitted by its pin to the associated transducer unit 8—31 for producing corresponding voltages.

Fig. 45 shows another way of combining a string 8—11 of a musical instrument with a dielectrostrictive transducer unit of the invention. A resilient sheet member 8—41 is bent to form an elongated loop having holes 8—42 formed in its curved end portions so that the string may be threaded through the holes for seating the loop in desired position on the virbrating string. The loop 8—41 may be endless and is shown provided with an inwardly deformed nose portion 8—43 which is elastically deformed so that it engages and presses against the portion of the string passing through the loop 8—41 and keeps it biased into engagement with the surface portions of the two holes 8—42, 8—42 of the loop so that vibrations of the string are transmitted to the resilient loop 8—41 and cause it to be subjected to corresponding elastic deformations. To the two elongated outer sides of the spring loop 8—41 are shown secured two dielectrostrictive condenser-transducer units 8—44, 8—45 arranged so that the vibrations imparted to the loop 8—41 will be transmitted to the transducer units 8—44, 8—45 and cause them to produce voltages corresponding to the vibrations of the string.

Fig. 45–A shows another combination of an instrument string 8—11 with a spring clip forming part of a dielectrostrictive condenser-transducer structure of the invention. An elongated spring strip 8—46 has its two ends bent into loop section, each having an outwardly extending arm portion 8—47 and an inwardly extending end arm portion 8—48. Each arm 8—47, 8—48 of each loop section has hole engaging portions of the string passing therethrough. The spring strip 8—46 and its four loop arms 8—47, 8—48 are elastically deformed so that the elastic force causes the two arms of each loop section to maintain coupling engagement along their respective holes with portions of the string 8—11 passing therethrough in such manner that the vibrations of the string are transmitted to spring clip member 8—46.

Dielectrostrictive condenser-transducer units 8—51, 8—52 are shown secured to the portions of the looped spring strip 8—46 which extend in a direction generally parallel to the lengths of the string 8—11 so that vibrations imparted by the string 8—11 to the spring strip 8—46 are transmitted to the transducer units 8—51, 8—52 and produce therein voltages corresponding to the vibrations of the string. Two flat transducer units 8—52 are shown secured to each of the flat portions of spring strip 8—46 extending between each set of loop arms 8—47, 8—48. Alternatively, a single transducer unit 8—52 of the same length as the transducer unit 8—51 may be secured to the two loop sections of the two sets of loop arms 8—47, 8—48.

In the form shown, the spring sheet members or clips 8—41, 8—46 of transducer structures of Figs. 45, 45–A are made of metal and the transducer units 8—44, 8—45, 8—51, 8—52 are united thereto, respectively, by soldering the surface electrodes of the transducer units to the facing metal portions of the respective sheet metal members.

The features of the invention disclosed in the present application which are directed to ceramic titanate transducers, wherein an integral or common dielectric body has differentially polarized body sections which operate in aiding relation with a predetermined vibratory mode, are not claimed in the present application, but in applicant's copending application filed October 8, 1956, as a division of the present application.

Dielectrostrictive transducer units of the invention combined with the elements of a string instrument in the manner described above in connection with Figs. 41 to 45–A may be utilized not only for producing electric oscillations corresponding to the musical vibrations of the strings, but also for imparting to selected strings actuating impulses which set them into vibrations in the same manner as a conventional key-operated string hammer of a piano or a bow stroke of a fiddle. To this end it is merely necessary to connect the electrodes of one of the transducer units 8—25, 8—26, 8—28, 8—29, 8—31, 8—44, 8—45, 8—51, 8—52 associated with a given string or group of strings to a source of electric voltage through a circuit controlled by a key-operated switch so that each time the key is actuated an electric voltage will be applied to the selected transducer unit and cause it to impart thereto a mechanical motion which is in turn transmitted thereby to the desired string or group of strings for setting them into musical vibrations.

Fig. 45–B shows diagrammatically one form of such actuating or control circuit. A dielectrostrictive condenser-transducer unit 8—31 which is associated with a string, for instance in the manner shown in Fig. 44, is connected through a circuit including a normally open switch 8—61 to a source of electric energy 8—62 which is indicated by plus (+) and minus (−) signs. In operation, each time the switch 8—61 is closed a direct current voltage will be applied to the bilamilate transducer unit 8—32 and cause it to undergo a flexure or extension which imparts to the associated string a corresponding impulse stroke and sets it into the desired vibrating condition. The switch 8—61 may be arranged to be controlled by a key 8—63, such as a conventional pivotally supported piano key so that each time the key 8—63 is actuated it will close the switch 8—61 and apply a D. C. voltage impulse to the transducer unit 8—31.

The control circuit associated with the switch 8—61 is shown as including timing elements in the form of a condenser 8—64 connected in shunt to the transducer terminals and a resistance 8—65 connected in series between the switch and the voltage source 8—62 for controllably delaying in a selectively predetermined manner the rate at which a D. C. voltage, or in general the striking voltage is built-up across the dielectric layers of the actuating transducer unit 8—31. In other words, the condenser 8—64 and resistance 8—65 constitute timing elements which time the rate at which the striking voltage is built-up across the striking transducer unit 8—31 each time the control switch 8—61 is closed by actuation of its associated key. Obviously, either the condenser or the resistor 8—65 may be omitted and in general the timing circuit elements may be so chosen as to produce the desired time delay, or in general the selective control of the striking action.

The control circuit also includes a variable rheostat 8—66 having a movable arm 8—67 which is operated, for instance, by a foot pedal 8—68, for providing additional control of the striking action. The rheostat 8—66 is suitably interconnected with the key-controlled supply circuit of the transducer unit 8—31 so that depending on the control action exerted on the foot pedal 8—68 the character of the striking action is controllably modified in a selected manner in one way or another. In the form of circuit arrangement shown, the rheostat 8—66 is shown connected parallel to the resistance element 8—65 of the timing circuit and the rheostat arm 8—67 is shown normally biased to a position in which the timing resistance 8—65 is short circuited. As a result, striking the key 8—63 and closure of switch 8—61 will apply the striking voltage to the transducer unit 8—31 at the fastest rate determined by the selected timing constants of the so established control circuit. However, by depressing the pedal 8—68 more or less series resistance is introduced in the circuit between the supply source 8—62 and the transducer 8—31, thereby delaying at the desired rate the build-up of the striking voltage for controlling in a desired manner the striking action. Various other modifications of the control circuits will suggest themselves to those skilled in the art.

The string striking mechanism may, for example, be of the momentarily actuated type conventionally used in piano constructions. In these forms, the string is struck by a hammer when the corresponding key is depressed and the hammer is immediately retracted whether or not the key is released. Fig. 45–B shows in a simplified form a similar construction in which the switch 8—61 is momentarily closed when the key 8—63 is operated. One-way operating link 8—69 pivotally depending from the key is shown as positioned above the switching lever 8—70 movably supported as at pivot 8—71 so that it can be brought into engagement with the blade of switch 8—61 to close the switch. The switching lever 8—70 is biased to the retracted position shown as by biasing spring 8—72 and when the key 8—63 is depressed the operating link 8—69 is brought down into engagement with the nose 8—73 of the lever 8—70 moving it to close the switch 8—61. In the downward motion of the operating link 8—69 the free pivoting permits it, after it engages the nose 8—73 of the switching lever 8—70 to ride over the right hand end of the upper surface of the nose thereby becoming disengaged from the nose 8—73 which is returned by its bias to the non-operated position shown. Retraction of the key 8—63 withdraws the link 8—69 over the nose to the upper position wherein it is free to assume the rest position illustrated. Spacing may be provided between the nose 8—73 and the link 8—69 as well as the movable blade of the switch 8—61 and the members so arranged that an exceedingly slow operation of key 8—63 will merely take up most of the slack provided by the spacing without causing switch 8—61 to close that circuit. A more rapid operation of the key will cause the inertia of the moving parts to actuate the blade of switch 6—61 sufficiently to bring about the desired switch operation. A stop 8—74 may be provided to properly guide the pivoted link 8—69. Other one-way momentarily operated control devices may also be used with similar results.

A feature of the invention is the fact that the dielectrostrictive transducer unit being very diminutive in comparison with prior art devices of a similar nature does not appreciably affect the vibration of the vibrating elastic mass, such as the tensioned spring, of Figs. 41 through 45–A. Accordingly, the tones produced by the musical instruments of the invention are essentially those produced by similar high quality musical instruments not equipped with the dielectrostrictive transducer unit. Furthermore, the simple application of a D. C. voltage pulse or surge to the electrodes of the transducer unit will initiate vibration of the elastic mass and the vibrations will be sustained and unappreciably affected by a maintenance of the surge potential across the electrodes. The switch operation of Fig. 45–B can accordingly be simplified by merely directly connecting the actuating key to the movable blade of the switch and permitting the switch to remain closed as long as the key is depressed. The desired note is generated when the switch is closed to strain the dielectric layer of the transducer unit, thereby effectively stroking the elastic mass into vibration. The vibrations will continue substantially unaffected even though the dielectric strain is maintained. A conventional damping pad arrangement may be provided for terminating the vibrations when the key is released according to the conventional manner. This modification of the invention provides an exceedingly simple, sturdy, inexpensive, fool-proof mechanism for a musical instrument.

Alternatively, organ type of note generating controls may be employed for producing sustained tones which may also be increased in intensity after the initial production. An electrical signal source providing a voltage output oscillating at a frequency corresponding to that at which the string is vibrated may be utilized to energize the transducers 8—25, 8—26, 8—28, and/or 8—29. The string may thereby be brought into prolonged vibration the amplitude of which may be intensified without actuation of a key control as by merely operating an attenuator connected for varying the amplitude of the oscillating voltages supplied.

Two or more electrical voltages oscillating at different frequencies may be simultaneously supplied for inducing the vibration of the string in the various modes to produce the desired overtones. The different signal frequencies may be applied to different transducers or they may be mixed and simultaneously applied to one or more of them.

According to a further phase of the invention, the dielectrostrictive random oriented titanate transducer is used in combination with the vibrating reed type of tone generator. In this form, the transducer unit may be linked to a vibratory reed element in such manner that vibration of the reed generates an oscillating signal voltage at the transducer electrodes, or the application of a voltage to the transducer electrodes may be utilized to commence or maintain vibration of the reed.

Figs. 46 and 46–A show in simplified manner the essential elements of one form of vibrating reed type tone apparatus of the invention. The reed tone at 8—80 has an enlarged end 8—81 anchored so that the body of the reed projects across a slot-shaped passage 8—82. A gas, such as air, from suitable sources is supplied as by means of conduit 8—83 to one side of the slot 8—82 and from the other side is discharged through passageway 8—84. The reed 8—80 which may have its free end suitably weighted as indicated at 8—85 is arranged to vibrate in the slot 8—82 in a conventional manner so that the air 8—84 carries corresponding sound signals as is well known.

In the form shown, the mechano-electric transducer

8—86 is secured to the vibratory reed 8—80 adjacent the anchored end 8—81 and its electrodes are connected in suitable amplifier circuits as described above in connection with Figs. 41 through 45–A. A plurality of reeds arranged to vibrate at different frequencies as by varying their length are included in the complete apparatus as shown by the additional reed 8—87 in Fig. 46–A. The air supply for the various reeds may be a common manifold passageway or individual passageways as indicated at 8—83 in which the air is injected at an angle to the direction of its passage through the slots 8—82 or the air may be blown in the direction it takes in passing through slots as indicated by the air inlets 8—88 shown in dotted lines. Air valves may be arranged to supply the air to and thereby actuate the desired reed or reeds.

Fig. 46–B shows a modification of the reed structure of Figs. 46 and 46–A in which the reed 8—89 has a body portion of substantially the same width as the anchored portion 8—90. The transducer unit 8—86 in this form is mounted similarly to that shown above.

Other forms of sound or music generators may also be combined with the mechano-electric dielectrostrictive transducer unit in accordance with the invention. As a further example the tuning fork type of sound generator may also be arranged to co-act with one or more transducer units in a manner similar to those described above.

Fig. 47 shows a vibrating reed type of instrument in which the vibratory element 9—12 is similar to that of a conventional tuning fork, being bent around in U shape and suspended at its center so that the arms, 9—14, 9—16 depend. The suspension may be in the form of one or more knife edges 9—18 or felt pads held against the portion connecting the arms 9—14, 9—16. The generation of sound by the tuning fork arrangement of Fig. 47 does not require special air passageways but transmits vibrations directly from the oscillating arms 9—14, 9—16 through the surrounding air. The arm connected portion including the region of suspension exhibits very little oscillation during operation and one or more mechano-electric dielectrostrictive transducers 9—20 may be held on the vibrating arm portion adjacent the connecting zone, as shown. In this form the transducer units 9—20 may be used to initiate vibrations or to supply outputs for amplifying the sounds produced by the vibrations in a manner similar to those shown in connection with Figs. 41 to 45–B.

In the constructions of Figs. 41 to 47 resonators of either the acoustic or electrical types may be used in the conventional manner to emphasize and amplify some of the signals generated to produce the desired tonal effects.

Fig. 48 is a circuit diagram showing one form of operating connections for supplying a composite vibrating structure operating with a polarized titanate transducer condenser of the invention for producing vibratory energy of large magnitude. A source of oscillating energy 9—30 is shown connected through a transformer 9—31 having secondary windings connected in a push-pull circuit to two polarized condenser units 9—32, 9—34 of such composite vibrating structure.

Although such polarized titanate condenser of the invention will remain polarized even though subjected to relatively large alternating voltages of opposite polarity, it may be necessary, when they are excited to the extreme, to have them connected to a source of polarizing potential. The polarizing potential may be supplied by providing the transformer 9—31 with an additional secondary winding 9—36 which is connected in series with a rectifier 9—38 and is loaded by a resistance 9—40 to charge a filter condenser 9—42.

Filter action may be provided for the polarizing voltage by the parallel capacitance of condenser 9—42 acting in conjunction with the series impedance of each half of the push-pull output winding so that the polarizing potential applied to the transducer units 9—32, 9—34 is substantially constant when a constant driving frequency is utilized.

A driving circuit of the type described in connection with Fig. 48 may be used in connection with vibrating structures which are designed for operation with only a single condenser structure, in which case one of the electrode surfaces of the condenser structure is sub-divided into two sections, in the manner described above, so as to make it possible to utilize it in such push-pull circuit.

The polarized titanate condenser driving unit arrangement of Fig. 48 may be modified by providing only one pair of electrical leads from the source of oscillations to drive the transducer units in parallel or to drive only a single transducer unit.

Polarized titanate energy transducer structures may be also utilized as resonators for controlling the frequency of oscillating circuits in lieu of piezoelectric quartz crystal resonators, and also as filter elements in electromechanical filter systems. Fig. 49 shows diagrammatically one manner in which polarized titanate condenser energy transducers may be utilized as in electro-mechanical energy transducer and resonate in conjunction with an electrical oscillating circuit. A conventional vacuum amplifier tube 9—50 is shown provided with an output circuit including a source of plate potential indicated by B± and an oscillating tank circuit having an inductance 9—51 and a condenser 9—52. The output circuit is shown coupled to the input grid of the amplifier tube through a feedback circuit 9—53. The feedback circuit includes a transmission line element shown formed by a metal rod 9—54, to the two ends of which are shown mechanically connected two polarized transducer units of the invention 9—55, 9—55.

Each of the polarized titanate condenser units has one of its electrodes united as by soldering to one end of the metallic transmission line rod. With this arrangement the operating circuits are completed by connecting the metallic coupling rod to the ground as shown at 9—56. With such arrangement the oscillatory energy of the output circuit will excite the polarized condenser transducer connected thereto and energize it into vibrations which it will transmit through the transmission line rod to the polarized condenser transducer unit connected to the input side. As a result, oscillatory energy will be fed back from the output side to the input side at a frequency determined by the frequency characteristics of the composite transmission line structure formed by the metal rod and the two condenser units united to its end.

Fig. 49–A shows another form of oscillating circuit, the oscillating frequency of which is stabilized by a polarized titanate mechano-electric transducer. An amplifier tube 9—50' has an output circuit similar to that of Fig. 49. The feedback coupling to the input circuit of the amplifier is in this modification through a single polarized titanate condenser which operates as an electro-mechanical transducer at a frequency determined by its mechanical parameters. The polarized transducer unit may be formed of a simple condenser or a condenser having united thereto, as by solder, a metal member of given resonant characteristics so as to constitute with the condenser unit a composite electro-mechanical vibrating structure of desired resonant frequency. With such circuit arrangement the polarized titanate condenser may be given such polarization as to feed back from the output circuit to the input circuit an energy component which will sustain the oscillations of the circuit at a given frequency. The arrangement of Fig. 49–A will oscillate when the tank circuit is tuned to a frequency near the resonant frequency of the electro-mechanical polarized energy transducer.

As in other forms of prior art oscillating circuits which are stabilized by an electro-mechanical resonator, the oscillating circuit of Figs. 48A and 48B will operate at many mechanical harmonics of the feedback circuit, and the tank circuit may accordingly be tuned to frequencies corresponding to the higher mechanical harmonics of the electro-mechanical resonator structure.

For use at high frequencies such as those in the radio frequency range of the oscillator of Fig. 49–A the feedback resonance of which has smaller vibrating mass, is especially suited.

A further modification of electro-mechanical filter action of the invention utilizes the resonance of fluid media in combination with dielectrostrictive transducer units in a manner similar to that shown in Figs. 49, 49–A. Operation of such modification is obvious from the above description.

In the oscillating circuits described in connection with Figs. 49 and 49A, the polarized condenser units operate essentially as filters, which permit only an energy frequency of a determined frequency band to be fed back from the output circuit to the input circuit. This phase of the invention can therefore be considered analagous to the filter construction described in connection with Figs. 40 and 40A.

In ceramic titanate transducers of the invention, the titanates need not be pure but may contain small amounts of other ingredients. In some instances as when the added materials include the fluorides of metals of group II of the periodic table such as calcium and magnesium fluorides, the additions actually increase the dielectric constants of the dielectric transducer body and may improve its operation.

Lead titanate makes a highly-effective particle for use in the transducer of the invention. Calcium titanate is also suitable although its response is not as large. In general, however, barium titanates are most suitable for piezoelectric ceramic transducers of the invention.

It is understood, however, that where the dielectrostrictive titanate composition is recited in the specification or in the claims, the presence of minor amounts of ingredients in addition to the titanates is contemplated.

Fig. 49–B shows a further form of oscillator embodying the invention. In this construction, a conventional oscillator including vacuum tube 9—50, oscillating tank circuit 9—60 and a feedback supplied from the tank circuit through a condenser 9—62, has its tank circuit frequency stabilized by the incorporation of a dielectrostrictive random oriented mechano-electric transducer unit 9—64. The electrodes of the transducer unit are shown as connected in parallel to the inductance 9—66, the capacitance of the transducer unit 9—64 forming part of the tank circuit capacitance. An additional variable capacitor 9—68 may be used for fine adjustment.

When the tank circuit 9—60 is tuned to a frequency approximating that of the mechano-electrical resonance of the transducer unit 9—64 the construction of Fig. 49–B oscillates at a frequency in which it is maintained locked by the transducer unit in a manner similar to that described in connection with Figs. 49 and 49–A. The current that oscillates in the tank circuit 8—60 is interconnected between the inductance 9—66 and the capacitance elements through the mechanical vibration of the mass elements in the transducer and since these mass elements inherently show very little drift in physical properties during oscillation, the oscillating frequency is considerably stabilized.

In those cases where larger masses in the mechanical vibratory circuit are desirable as, for example, in the lower range of frequencies the stabilizing unit 9—64 may incorporate additional mass elements such as the transmission line filter arrangement such as that shown in Fig. 49.

This application is a continuation-in-part of our copending applications Ser. No. 694,386, filed August 31, 1946, and Ser. No. 727,152, filed February 7, 1947.

It will be apparent to those skilled in the art that the novel principles of the invention disclosed herein in connection with specific exemplifications thereof will suggest various other modifications and applications of the same. It is accordingly desired that in construing the breadth of the appended claim they shall not be limited to the specific exemplifications of the invention described above.

We claim:

In a piezoelectric signal transducing device for transducing mechanical signals into electric signals or vice versa; at least two solid dielectric ceramic bodies, each body having a thickness of at most about one-hundredth of an inch and being composed essentially of ceramically joined titanate particles consisting predominantly of barium titanate, two metallic surface electrodes fused at elevated temperature to opposite surfaces of each body, a strong flexible elastic sheet metal member having opposite surfaces facing body surfaces of said two bodies, and means including a junction stratum of solidified solder having a melting temperature above normal temperature uniting the facing surfaces of said metal member to the facing surfaces of said two bodies, and causing at least the adjacent surface strata of said two bodies to be maintained by said metal member under compressive strain, said two bodies being electrically unidirectionally permanently polarized to near piezoelectric saturation, said two bodies being polarized in opposite directions for causing said two bodies to conjointly transduce in aiding relation upon deflection thereof.

References Cited in the file of this patent

UNITED STATES PATENTS

| | | |
|---|---|---|
| Re. 17,246 | Cady | Mar. 26, 1929 |
| 1,803,273 | Sawyer | Apr. 28, 1931 |
| 1,804,364 | Parker | May 5, 1931 |
| 1,806,871 | Bower | May 26, 1931 |
| 1,886,234 | Meissner | Nov. 1, 1932 |
| 1,886,814 | Hund | Nov. 8, 1932 |
| 2,137,852 | Nicolson | Nov. 22, 1938 |
| 2,145,389 | Dally | Jan. 31, 1939 |
| 2,242,756 | Pope | May 20, 1941 |
| 2,276,013 | Bohannon | Mar. 10, 1942 |
| 2,305,369 | Williams | Dec. 15, 1942 |
| 2,326,280 | Bauer | Aug. 10, 1943 |
| 2,367,726 | Lybarger | Jan. 23, 1945 |
| 2,387,108 | Arendt | Oct. 16, 1946 |
| 2,399,513 | Shapiro | Apr. 30, 1946 |
| 2,402,515 | Wainer | June 18, 1946 |
| 2,411,765 | Usselman | Nov. 26, 1946 |
| 2,423,867 | Zener | July 15, 1947 |
| 2,443,471 | Mason | June 15, 1948 |
| 2,452,532 | Wainer | Oct. 26, 1948 |
| 2,486,560 | Gray | Nov. 1, 1949 |
| 2,640,165 | Howatt | May 26, 1953 |

OTHER REFERENCES

"Physical Review," vol. 71, No. 12, Roberts, pages 890–895, June 15, 1947.

"Barium Titanate and Barium Strontium Titanate as Nonlinear Dielectrics," by Shepard Roberts, Massachusetts Institute of Technology Library, March 10, 1947, page 14.